United States Patent
Shim

(10) Patent No.: US 9,112,395 B2
(45) Date of Patent: Aug. 18, 2015

(54) ELECTROMAGNETICALLY-COUNTERED ACTUATOR SYSTEMS AND METHODS

(76) Inventor: Youngtack Shim, Seoul (KR)

(*) Notice: Subject to any disclaimer, the term of this patent is extended or adjusted under 35 U.S.C. 154(b) by 803 days.

(21) Appl. No.: 13/408,557

(22) Filed: Feb. 29, 2012

(65) Prior Publication Data

US 2012/0161572 A1 Jun. 28, 2012

Related U.S. Application Data

(63) Continuation-in-part of application No. 12/318,539, filed on Dec. 31, 2008, now Pat. No. 8,148,872, and a continuation-in-part of application No. 12/985,042, filed on Jan. 5, 2011, now abandoned, said application No. 12/318,539 is a continuation-in-part of application No. 11/510,667, filed on Aug. 28, 2006, now Pat. No. 7,876,917.

(51) Int. Cl.
  *H02K 16/00* (2006.01)
  *H02K 11/00* (2006.01)
  *H02K 11/02* (2006.01)
  *H02K 21/12* (2006.01)
  *H02K 23/40* (2006.01)

(52) U.S. Cl.
  CPC .......... *H02K 11/0005* (2013.01); *H02K 11/02* (2013.01); *H02K 16/00* (2013.01); *H02K 21/12* (2013.01); *H02K 23/40* (2013.01)

(58) Field of Classification Search
  USPC ........................................ 310/112–114, 266
  IPC ..................................................... H02K 16/00
  See application file for complete search history.

(56) References Cited

U.S. PATENT DOCUMENTS

| | | |
|---|---|---|
| 3,973,066 A | 8/1976 | Smith, II et al. |
| 4,263,500 A | 4/1981 | Springer et al. |
| 4,271,350 A | 6/1981 | Crowley |
| 4,309,597 A | 1/1982 | Crowley |
| 4,323,761 A | 4/1982 | Hubner et al. |
| 4,382,174 A | 5/1983 | Barns |
| 4,436,986 A | 3/1984 | Carlson |
| 4,459,461 A | 7/1984 | Spencer |

(Continued)

FOREIGN PATENT DOCUMENTS

WO  WO 2007/139318  12/2007

OTHER PUBLICATIONS

U.S. Appl. No. 12/318,539, filed Dec. 31, 2008, Shim.

(Continued)

*Primary Examiner* — Dang Le
(74) *Attorney, Agent, or Firm* — Stein IP, LLC

(57) ABSTRACT

Various electric motor systems are provided to minimize irradiation of harmful (or first) electromagnetic waves. More particularly, an electric motor system is provided with one or more counter units which minimize irradiation of such harmful (or first) waves by suppressing such waves to (or toward) their sources and/or by emitting counter (or second) electromagnetic waves capable of canceling a desired portion of the harmful (or first) waves. Such counter units may then be incorporated into various locations for opposing magnetic poles of basic rotor units and/or basic stator units of the system. Various methods are also provided to minimize irradiation of such harmful (or first) waves by suppressing the harmful (or first) waves toward their sources and/or by canceling such harmful (or first) waves with the counter (or second) waves.

20 Claims, 10 Drawing Sheets

(56) References Cited

U.S. PATENT DOCUMENTS

| | | | |
|---|---|---|---|
| 4,585,922 A | 4/1986 | Berenson | |
| 4,595,838 A | 6/1986 | Kerschgens | |
| 4,659,905 A | 4/1987 | Gabrosek et al. | |
| 4,684,785 A | 8/1987 | Cole | |
| 4,908,497 A | 3/1990 | Hjortsberg | |
| 5,081,341 A | 1/1992 | Rowe | |
| 5,218,185 A | 6/1993 | Gross | |
| 5,403,992 A | 4/1995 | Cole | |
| 5,410,127 A | 4/1995 | LaRue et al. | |
| 5,448,677 A | 9/1995 | Fell et al. | |
| 5,495,131 A * | 2/1996 | Goldie et al. | 310/12.15 |
| 5,628,123 A | 5/1997 | Chan | |
| 5,701,681 A | 12/1997 | Wonka et al. | |
| 5,784,800 A | 7/1998 | Santhouse et al. | |
| 5,787,601 A | 8/1998 | Stelly | |
| 5,805,406 A | 9/1998 | Mailand | |
| 5,810,911 A | 9/1998 | Behrendt et al. | |
| 5,837,971 A | 11/1998 | Lee | |
| 5,841,943 A | 11/1998 | Nosenchuck | |
| 5,875,562 A | 3/1999 | Fogarty | |
| 5,884,008 A | 3/1999 | Goldberg | |
| 5,912,811 A | 6/1999 | Mackta | |
| 5,966,833 A | 10/1999 | Andis et al. | |
| 5,996,243 A | 12/1999 | Chang et al. | |
| 6,003,239 A | 12/1999 | Liebenthal et al. | |
| 6,011,903 A | 1/2000 | Nosenchuck | |
| 6,052,915 A | 4/2000 | Turner | |
| 6,067,724 A | 5/2000 | Depoyian | |
| 6,085,435 A | 7/2000 | Russi | |
| 6,097,009 A | 8/2000 | Cole | |
| 6,147,415 A * | 11/2000 | Fukada | 290/55 |
| 6,148,537 A | 11/2000 | Altamore | |
| 6,153,856 A | 11/2000 | Lee | |
| 6,177,658 B1 | 1/2001 | White et al. | |
| 6,188,837 B1 | 2/2001 | Kwan | |
| 6,191,930 B1 | 2/2001 | Ramchandani | |
| 6,205,674 B1 | 3/2001 | Kaizuka | |
| 6,205,677 B1 | 3/2001 | Yune | |
| 6,222,162 B1 | 4/2001 | Keane | |
| 6,222,988 B1 | 4/2001 | Behrendt et al. | |
| 6,226,450 B1 | 5/2001 | Lee | |
| 6,269,549 B1 | 8/2001 | Carlucci et al. | |
| 6,285,828 B1 | 9/2001 | Cafaro | |
| 6,300,597 B1 | 10/2001 | Lee | |
| 6,310,332 B1 | 10/2001 | Gerrard | |
| 6,314,236 B1 | 11/2001 | Taylor | |
| 6,363,215 B1 | 3/2002 | Cafaro | |
| 6,378,225 B1 | 4/2002 | Slingo | |
| 6,393,718 B1 | 5/2002 | Harris et al. | |
| 6,408,533 B2 | 6/2002 | Sakamoto | |
| 6,449,870 B1 | 9/2002 | Perez et al. | |
| 6,466,679 B1 | 10/2002 | Husung | |
| 6,481,116 B1 | 11/2002 | Slingo | |
| 6,601,316 B2 | 8/2003 | Shaw, II | |
| 6,640,049 B1 | 10/2003 | Lee et al. | |
| 6,689,989 B2 | 2/2004 | Irwin, Sr. et al. | |
| 6,713,724 B1 | 3/2004 | Carr et al. | |
| 6,718,651 B2 | 4/2004 | Perez et al. | |
| 6,725,562 B2 | 4/2004 | Nakagawa et al. | |
| 6,732,449 B2 | 5/2004 | Evanyk | |
| 6,732,450 B1 | 5/2004 | Chen | |
| 6,756,572 B2 | 6/2004 | Lee | |
| 6,770,854 B1 | 8/2004 | Keane | |
| 6,798,982 B2 | 9/2004 | Ryu et al. | |
| 6,885,810 B2 | 4/2005 | Allwohn et al. | |
| 6,889,445 B1 | 5/2005 | Varona et al. | |
| 6,891,102 B2 | 5/2005 | Rashid | |
| 6,907,678 B2 | 6/2005 | Cruz | |
| 6,966,125 B2 | 11/2005 | Rago et al. | |
| 7,400,077 B2 * | 7/2008 | Caroon | 310/266 |
| 8,148,872 B2 * | 4/2012 | Shim | 310/261.1 |
| 2004/0047620 A1 | 3/2004 | Ruben | |
| 2004/0168337 A1 | 9/2004 | Curtin | |
| 2004/0169969 A1 | 9/2004 | Takeda | |
| 2004/0172847 A1 | 9/2004 | Saida et al. | |
| 2004/0195235 A1 | 10/2004 | Kim et al. | |
| 2004/0208337 A1 | 10/2004 | Anciant | |
| 2005/0069303 A1 | 3/2005 | Maione et al. | |
| 2005/0091866 A1 | 5/2005 | Attaway et al. | |
| 2005/0108889 A1 | 5/2005 | Leventhal | |
| 2005/0108890 A1 | 5/2005 | Park | |
| 2005/0150501 A1 | 7/2005 | Opitz | |
| 2005/0229422 A1 | 10/2005 | Mattinger et al. | |
| 2005/0229424 A1 | 10/2005 | Hur | |

OTHER PUBLICATIONS

U.S. Appl. No. 12/985,042, filed Jan. 5, 2011, Shim.
U.S. Appl. No. 11/510,667, filed Aug. 28, 2006, Shim.

* cited by examiner (c)

(a)

(d)

(b)

(e)

(a)

(b)

(c)

(d)

(e)

ELECTROMAGNETICALLY-COUNTERED ACTUATOR SYSTEMS AND METHODS

CROSS-REFERENCE TO RELATED APPLICATIONS

The present application is a continuation-in-part of U.S. Utility patent application Ser. No. 11/510,667, filed on Aug. 28, 2006, which issued on Jan. 25, 2011 as U.S. Pat. No. 7,876,917, the entire portion of which is incorporated herein by reference. The present application is also a continuation-in-part of U.S. Utility patent application Ser. No. 12/318,539 filed on Dec. 31, 2008, the entire portion of which is incorporated herein by reference. The present application is also a continuation-in-part of U.S. Utility patent application Ser. No. 12/985,042 filed on Jan. 5, 2011, the entire portion of which is incorporated herein by reference.

BACKGROUND OF THE INVENTION

1. Field of the Invention

The present invention generally relates to electric motor systems which minimize irradiation of harmful (or first) electromagnetic waves by countering said harmful (or first) waves through various means. More particularly, the present invention relates to an electric motor system with one or more counter units which minimize the irradiation of such harmful (or first) waves by suppressing the harmful (or first) waves to their sources and/or by emitting counter (or second) electromagnetic waves capable of canceling a desired portion of the harmful (or first) waves. Such counter units may then be incorporated into various locations for opposing magnetic poles of basic rotor units and/or basic stator units of the system. The present invention also relates to various methods of minimizing irradiation of such harmful (or first) waves by various electric motor systems, various methods of suppressing the harmful (or first) waves toward their sources, and various methods of canceling such harmful (or first) waves by the counter (or second) waves. The present invention further relates to various processes for providing such electric motor systems, various processes for making such counter units for the suppressing and/or canceling, and various processes for incorporating such counter units into various locations of the systems.

2. Description of the Related Art

Various motors have been used during the last century in order to convert electric energy into mechanical energy. Some motors run on DC currents, others are to operate on AC currents, whereas others may run on both the DC and AC currents, where examples of such motors may include, but not be limited to, DC motors including movable rotors (which are generally electromagnets) and stationary stators (which are permanent magnets), universal motors with rotors (which are electromagnets) and stators (which are electromagnets), single-phase or three-phase synchronous AC motors with rotors (which are permanent magnets) and stators (which are electromagnets), single-phase or three-phase induction AC motors including rotors (which are neither permanent magnets, nor electromagnets, but conductive metals) and stators (which are electromagnets), stepping motors having rotors (which are permanent magnets) and stators (which are electromagnets), linear motors having rotors (which are permanent magnets or electromagnets) and stators (which are electromagnets), advanced AC motors based upon inverter or converter technology such as, e.g., switch reluctance motors and brushless DC motor, and other motors such as, e.g., torque motors, servo motors, coreless DC motors, printed circuit motors, and the like.

Although such motors may generate desired torque, they invariably irradiate a massive amount of undesirable or harmful electromagnetic waves (to be abbreviated as "harmful EM waves" or simply "harmful waves" hereinafter). For example, an electromagnet-type rotor irradiates the harmful waves as the AC current flows therein. Even when such a rotor runs on the DC current, rotation of the rotor inevitably bends and twists static magnetic fluxes, thereby irradiating the harmful EM waves of which characteristics may be determined by a speed of rotation. Similarly, an electromagnet-type stator also emits the harmful waves as the AC current flows therein. Even when the stator is an electromagnet running on the DC current or when the stator is a permanent magnet, the harmful waves irradiated by the stator tend to propagate to the stator which then disperse such waves away therefrom. In short, every motor which invariably includes at least one electromagnet irradiates the harmful EM waves due to either the AC current flowing therein or the movement of the rotor.

Numerous attempts have been made to reduce the harmful EM waves irradiated from different portions of conventional motors. For example, electrically conductive articles have been incorporated into various locations in and around the motors as have been exemplified in U.S. Pat. No. 6,888,062 B1 to S. Erikson, U.S. Pat. No. 6,858,955 B2 to J. C. S. Lau, U.S. Pat. No. 6,530,757 B1 to W. Soyer et al., U.S. Pat. No. 6,528,915 B1 to F. Moskob, U.S. Pat. Nos. 6,522,516 B2 and 6,509,807 B1 to A. Anthony et al., U.S. Pat. No. 6,321,563 B1 to H. Ikeda, U.S. Pat. No. 6,302,747 B1 to Bui, U.S. Pat. No. 6,129,948 to H. Plummer et al., U.S. Pat. No. 6,129,074 to K. Frank, U.S. Pat. No. 6,099,757 to V. C. KulKarni, U.S. Pat. No. 6,078,117 to R. L. Perrin et al., U.S. Pat. No. 5,973,906 to R. A. Stevenson et al., U.S. Pat. No. 5,646,498 to T. A. Lipo et al., U.S. Pat. No. 5,313,126 to J. A. Forsythe et al., U.S. Pat. No. 5,038,088 to G. E. Arends et al., U.S. Pat. No. 4,753,169 to M. W. Shores, and the like.

In other attempts, varistors, resistors, capacitors, and choke circuits with such elements have also been incorporated in or around the motors individually or as printed circuit boards as exemplified in U.S. Pat. No. 7,038,337 B2 to K. S. Thomson, U.S. Pat. No. 6,992,414 B2 to K. S. Thomson et al., U.S. Pat. Nos. 6,603,646 B2 and 6,594,128 B2 to A. A. Anthony, U.S. Pat. No. 6,583,682 B1 to A. Dubhashi et al., U.S. Pat. No. 6,580,931 B1 to S. Shiotsu et al., U.S. Pat. Nos. 6,580,595 B2 and 6,549,389 B2 to A. A. Anthony et al., U.S. Pat. No. 6,529,103 B1 to R. L. Brendl et al., U.S. Pat. No. 6,498,710 B1 to A. A. Anthony, U.S. Pat. No. 6,469,595 B2 to A. A. Anthony et al., U.S. Pat. No. 6,400,058 B1 to B. Liau, U.S. Pat. Nos. 6,388,856 B1, 6,373,673 B1, 6,331,926 B1, 6,282,074 B1, and 6,097,581 to A. Anthony, U.S. Pat. No. 6,008,980 to R. A. Stevenson et al., U.S. Pat. No. 5,995,347 to J. P. Rudd, U.S. Pat. No. 5,905,627 to R. Brendl et al., U.S. Pat. No. 5,880,937 to K. Schadhauser et al., U.S. Pat. No. 5,661,390 to T. A. Lipo et al., U.S. Pat. No. 5,396,214 to A. K. Kumar, U.S. Pat. No. 5,208,499 to H. C. Barber, U.S. Pat. No. 4,814,687 to C. S. Walker, and the like.

Others have attempted to reduce arcing and radiation of the harmful EM waves as exemplified in U.S. Pat. Nos. 7,051,420 B2, 7,000,307 B2, 6,930,429 B2, and 6,566,782 B1 to R. H. Wang, U.S. Pat. No. 6,400,058 B1 to B. L. Liau, U.S. Pat. No. 5,694,798 to P. Nunez et al., U.S. Pat. No. 5,208,499 to H. C. Barber et al., U.S. Pat. No. 4,329,610 to H. Klein, and U.S. 2006/0082244 A1 to T. Kuechen et al. In other attempts, voltages and/or currents have been regulated by various means as also exemplified in U.S. Pat. No. 7,053,571 B1 to P.

J. VanDrunen et al., U.S. Pat. No. 7,042,198 B2 to N. Mutoh, U.S. Pat. No. 6,975,459 B2 to Y. Kokami et al., U.S. Pat. No. 6,943,510 B2 to B. Got, U.S. Pat. No. 6,903,894 B2 to Y. Kokami et al., U.S. Pat. No. 6,819,076 B2 to T. Takahashi, U.S. Pat. No. 6,150,789 to R. Pulford, Jr., U.S. Pat. No. 6,049,184 to D. Uggla, U.S. Pat. No. 6,008,560 to R. Becerra, U.S. Pat. Nos. 5,859,511 and 5,668,449 to F. Carobolante, U.S. Pat. No. 5,838,515 to S. Mortazavi et al., U.S. Pat. No. 4,728,866 to D. Capewell et al., U.S. Pat. No. 4,504,779 to D. J. Haman, and the like. In other attempts, various provisions have been made to motor and/or pump assemblies as exemplified in U.S. Pat. No. 6,580,610 B2 to T. L. Morris et al., U.S. Pat. No. 6,507,492 B2 to T. L. Morris et al., U.S. Pat. No. 6,232,684 B1 to R. H. Haag et al., U.S. Pat. No. 6,107,716 to D. M. Penketh, U.S. Pat. No. 4,829,207 to J. J. Hovorka, and the like.

In addition to the foregoing, other minor implementations or modifications have been proposed to reduce the irradiation of the harmful waves examples of which may include U.S. Pat. No. 6,765,711 B2 to Y. H. Min et al., U.S. Pat. No. 6,753,629 B2 to Doi et al., U.S. Pat. No. 6,606,011 B2 to A. Anthony et al., U.S. Pat. No. 6,501,609 B2 to T. Saito et al., U.S. Pat. No. 6,021,015 to E. Jeffrey et al., U.S. Pat. No. 5,879,785 to H. J. Shin, U.S. Pat. No. 5,780,952 to Lau, U.S. Pat. No. 5,757,628 to Kamata, U.S. Pat. No. 5,723,924 to Blanchet, U.S. Pat. No. 5,718,259 to Miyake et al., U.S. Pat. No. 5,697,769 to Kobman et al., U.S. Pat. No. 5,610,467 to K. S. Shiah et al., U.S. Pat. No. 5,605,129 to Strombeck et al., U.S. Pat. No. 5,586,613 to M. Ehsani, U.S. Pat. No. 5,415,906 to T. Miyakawa et al., U.S. Pat. No. 5,409,399 to F. L. Geoghegan et al., U.S. Pat. No. 5,360,353 to Kinoshita, U.S. Pat. No. 5,345,124 to Lang, U.S. Pat. No. 5,329,788 to J. L. Caillat et al., U.S. Pat. No. 5,313,126 to J. Forsythe et al., U.S. Pat. No. 5,311,398 to Schirmer et al., U.S. Pat. No. 5,298,903 to Janos, U.S. Pat. No. 5,287,028 to Suzuki et al., U.S. Pat. No. 5,281,876 to Sato, U.S. Pat. No. 5,196,750 to G. Strobl, U.S. Pat. No. 5,196,747 to W. Kress et al., U.S. Pat. No. 5,072,358 to Lankford, U.S. Pat. No. 4,933,586 to Gotou, U.S. Pat. No. 4,895,536 to Ginferich et al., U.S. Pat. No. 4,746,829 to Strobl, U.S. Pat. No. 4,728,835 to R. F. Baines, U.S. Pat. No. 4,727,274 to Adam et al., U.S. Pat. No. 4,699,466 to Brandstetter et al., U.S. Pat. No. 4,600,971 to Rose et al., U.S. Pat. No. 4,596,519 to C. Tuckey, U.S. Pat. No. 4,494,024 to Braun, U.S. Pat. No. 4,465,331 to 1. Masuda et al., U.S. Pat. No. 4,417,388 to Major, U.S. Pat. No. 4,384,223 to Zelt, U.S. Pat. No. 4,329,610 to Klein, U.S. Pat. No. 4,329,605 to Angi et al., U.S. Pat. No. 4,292,559 to Auinger et al., U.S. Pat. No. 4,157,483 to C. H. Frimley, U.S. Pat. No. 3,924,147 to Tarnow et al., U.S. Pat. No. 3,913,346 to H. W. Moody, Jr. et al., U.S. Pat. No. 3,631,278 to Snively, U.S. Pat. No. 2,921,207 to Fletcher, U.S. Pat. No. 2,103,166 to Morrill, U.S. Pat. No. 841,545 to Latour, and the like.

Although all of the above conventional techniques are at best marginally effective in shielding electric components (to be abbreviated as "electric waves" hereinafter) of such harmful waves, they do not constitute any defense at all in shielding magnetic components (to be abbreviated as "magnetic waves" hereinafter) of the harmful waves, for the magnetic waves of the harmful waves propagate through the conductive electric shields as if there exists nothing inbetween. The magnetic waves of the harmful waves may only be effectively shielded by either of two following mechanisms such as, e.g., by absorbing, rerouting, and optionally terminating such magnetic waves in a magnetic pole or by emitting counter electromagnetic waves (to be abbreviated as "counter EM waves" or simply "counter waves" hereinafter) and canceling a desired portion of the magnetic waves by the counter waves.

Therefore, there is a need for an electric motor system which irradiates only a minimal amount of the harmful waves. There also is a need for various mechanisms for minimizing such irradiation of the harmful waves by the electric motor system. Such mechanisms are preferably implementable into various electric motor systems without requiring severe changes in its design and/or size. In addition, such mechanisms are preferably at least benign to normal operation of such systems without causing any adverse effects on their capability of generating electromotive force and/or torque. There also is a need for various counter units which may be incorporated into various locations of the systems and minimize such irradiation through various mechanisms.

SUMMARY OF THE INVENTION

The present invention generally relates to electric motor systems that minimize irradiation of harmful (or first) electromagnetic waves by countering a desired portion of said harmful (or first) waves through various means. More particularly, the present invention relates to an electromagnetically-countered electric motor system having one or more counter units which may minimize such irradiation of the harmful (or first) waves by suppressing such harmful (or first) waves to their sources and/or by emitting counter (or second) electromagnetic waves which are capable of canceling a desired portion of the harmful (or first) waves, where the counter units may be incorporated in various locations of the system for opposing magnetic poles of basic rotor units and/or basic stator units by like magnetic poles of the counter units. The present invention relates to such counter units defining various configurations, disposed in various arrangements, and performing various functions for minimizing such irradiation of the harmful (or first) waves by the system. The present invention also relates to various counter units which cooperate with the basic rotor and/or stator units to contribute to generating electromotive force or, in the alternative, relates to other counter units which may not contribute to generating such force and, therefore, may be disposed in different locations and/or arrangements. The present invention relates to various electric motor systems operating in different mechanisms and to various counter units for each of such motor systems.

The present invention also relates to various methods of minimizing irradiation of such harmful (or first) waves by countering a desired portion of said harmful (or first) waves with various electric motor systems. Thus, the present invention relates to various methods of suppressing the harmful (or first) waves to their sources while preventing such waves from propagating to a user and various methods of canceling a desired portion of the harmful (or first) waves by the counter waves which have amplitudes and phase angles desirable therefor. The present invention relates to various methods of performing the minimizing while preserving a capability of providing electromotive force by the system, various methods of performing such minimizing while reducing adverse effects on such force-generating capability of the system, and various methods of fabricating such a system without unreasonably changing and/or increasing its size. The present invention relates to various methods of modifying conventional electric motors into the electromagnetically-countered motor system of this invention, various methods of incorporating such counter units into each of the conventional motors, and the like.

The present invention also relates to various processes for providing the electromagnetically-countered electric motor systems and various processes for providing members and/or units of such systems. More particularly, the present invention relates to various processes for making the counter units capable of suppressing the harmful (or first) waves closer to their sources and/or of emitting the counter (or second) waves which are capable of canceling the desired portion of the harmful (or first) waves, various processes for incorporating such counter units into various locations of the systems, and various processes for electromagnetically coupling the counter units with various units of the system. The present invention further relates to various processes for cooperating the counter units with other units of the system and contributing to generating the force and various processes for reducing the adverse effects of the counter units upon such force-generating capability of the system. The present invention further relates to various processes for modifying or converting the conventional electric motors into such an electromagnetically-countered electric motor system of the present invention, and various processes for incorporating such counter units into each of the conventional motors.

Accordingly, a primary objective of the present invention is to provide electric motor systems capable of minimizing irradiation of harmful electromagnetic waves (or "harmful waves") by canceling a desired portion thereof, thereby reducing an amount of the harmful waves reaching an user of such systems. Therefore, a related objective of this invention is to provide the electric motor system which emits by its counter unit counter electromagnetic waves (or "counter waves") propagating toward the user with such harmful waves while canceling such a portion of the harmful waves. Another related objective of this invention is to provide the electric motor system which emits the counter waves while manipulating amplitudes and/or phase angles thereof for canceling the portion of such harmful waves.

Another primary objective of the present invention is to provide electric motor systems capable of minimizing irradiation of harmful waves by suppressing the desired portion of the harmful waves to a source thereof, thereby reducing an amount of the harmful waves reaching an user of the systems. Therefore, a related objective of this invention is to provide the electric motor system which includes at least one counter unit capable of magnetically opposing the harmful waves from propagating away from their source. Another related objective of this invention is to provide the system with the counter unit which forms magnetic poles and is disposed in an orientation for opposing a like magnetic pole of the source of the harmful waves. Another related objective of this invention is to provide the electric motor system with the counter unit which is disposed near a basic rotor unit and/or a basic stator unit of the system and opposes at least one magnetic pole of the basic rotor and/or stator units by at least one of its like magnetic poles. Another related objective of this invention is to provide the system with one or more counter units opposing a preset number of poles of the basic rotor (or stator) unit by the same number of like poles thereof. Another related objective of this invention is to provide the system with one or more counter units opposing the preset number of poles of the basic rotor (or stator) unit by the greater or less number of its like poles.

Another objective of the present invention is to form the electromagnetically-countered electric motor system including multiple rotor units at least one of which serves as the counter rotor unit and at least another of which serves as a basic rotor unit for generating the torque or force with a basic stator unit, while minimizing irradiation of the harmful waves by the counter rotor unit by either or both of the above canceling and/or suppressing mechanisms. Thus, a related objective of this invention is to provide the counter rotor unit which is disposed in a radial direction and emits such counter waves which are then automatically aligned with the harmful waves for the canceling mechanism and/or to provide the counter rotor unit which is similarly disposed and thus repels such harmful waves along a direction which is also away from the user for the suppressing mechanism. Another related objective of this invention is to provide the counter rotor unit which is aligned with the basic rotor and/or stator units and emits the counter waves which are aligned with the harmful waves for the above canceling mechanism and/or to provide the counter rotor unit which repels the harmful waves along a direction which is also away from the user for the suppressing mechanism. Another related objective of this invention is to provide the system including both of the basic and counter rotor units inside the basic stator unit such that the counter rotor unit may minimize the irradiation of the harmful waves inside the basic stator unit by either or both of such mechanisms. Another related objective of this invention is to provide the system including, inside the basic stator unit, multiple counter rotor units which not only minimize such irradiation by either or both of such mechanisms but also cooperate to generate such force. Another related objective of this invention is to provide the system including the counter rotor unit which is disposed outside the basic stator unit and emits the counter waves for such canceling mechanism and/or including the counter rotor unit which is similarly disposed and repels the harmful waves for the suppressing mechanism.

Another objective of the present invention is to form the electromagnetically-countered electric motor system also including multiple rotor units at least one of which serves as the basic rotor unit for generating such force with the basic stator unit and at least another of which serves as the counter rotor unit capable of not only minimizing such irradiation of the harmful waves by either or both of the above canceling and/or suppressing mechanisms but also cooperating with such basic rotor and/or stator units for adding at least a portion to such force. Thus, a related objective of this invention is to provide the counter rotor unit which is disposed inside the basic stator unit, arranged in an orientation for opposing a magnetic pole of the basic rotor unit by its like pole for either or both of such canceling and/or suppressing mechanisms, and further arranged in another orientation for cooperating with the basic stator unit for contributing the portion to such force. Another related objective of this invention is to provide another counter rotor unit which is disposed outside the basic stator unit, arranged in an orientation for opposing a magnetic pole of the basic rotor unit by a like pole thereof for either or both of the above canceling and/or suppressing mechanisms, and further arranged in another orientation for cooperating with the basic stator unit for contributing such a portion to the force.

Another objective of the present invention is to form the electromagnetically-countered electric motor system including multiple stator units at least one of which serves as the counter stator unit and at least another of which serves as a basic stator unit for providing the force with the basic rotor unit, while minimizing the irradiation of the harmful waves by the counter stator unit by either or both of the above canceling and/or suppressing mechanisms. Therefore, a related objective of this invention is to provide the counter stator unit which is disposed in a radial direction and emits such counter waves which are then automatically aligned with the harmful waves for the canceling mechanism and/or to provide the counter stator unit which is similarly disposed and thus repels the harmful waves along a direction which is also away from the user for the suppressing mechanism. Another related objective of this invention is to provide the counter stator unit which is aligned with the basic rotor and/or stator units and emits the counter waves which are aligned with the harmful waves for the above canceling mechanism and/or to provide the counter stator unit which repels the harmful waves along a direction which is also away from the user for the suppressing mechanism. Another related objective of this invention is to provide the system including such a counter stator unit disposed inside the basic stator unit such that the counter rotor unit may minimize the irradiation of the harmful waves inside the basic stator unit by either or both of the above mechanisms. Another related objective of this invention is to provide the system including multiple counter stator units which not only minimize such irradiation by either or both of the above mechanisms but also cooperate to generate such force.

Another objective of the present invention is to form the electromagnetically-countered electric motor system including therein multiple counter units at least two of which serve different functions. Therefore, a related objective of this invention is to provide multiple counter units at least one of which preferentially serves for minimizing the irradiation of the harmful waves and at least another of which preferentially serves for cooperating with one or more basic units and for adding such a portion to the electromotive force. Another related objective of this invention is to also provide multiple counter units at least one of which serves not only for minimizing the irradiation of the harmful waves but also for cooperating with the basic units and adding the portion to the force. Another related objective of this invention is to provide one or more counter units each of which is shaped, sized, and/or arranged for minimizing such irradiation and/or for cooperating with such basic units.

Another objective of the present invention is to form the electromagnetically-countered electric motor system including one or multiple counter units for minimizing the irradiation of the harmful waves by various arrangements. Therefore, a related objective of this invention is to provide one or multiple counter units each of which cancels the desired portion of such harmful waves irradiated by each of multiple wave sources and/or suppresses the harmful waves irradiated by each thereof, where such an arrangement will now be referred to as "local canceling and suppressing" or, in the alternative, as "local minimizing." Another related objective of this invention is to provide another counter unit which cancels such a portion of the harmful waves irradiated by two or more wave sources and/or which suppresses the harmful waves irradiated by two or more thereof, where such an arrangement will be referred to as "global canceling and suppressing" or, in the alternative, as "global minimizing."

Another objective of the present invention is to form the electromagnetically-countered electric motor system which includes at least one counter unit for one or more basic rotor and/or stator units. Therefore, a related objective of this invention is to provide the system with at least one counter rotor unit for one or more basic rotor units whether each of such basic rotor units may include therein one or multiple permanent magnets and/or electromagnets. Another related objective of this invention is to provide the system with at least one counter stator unit for one or more basic stator units when such basic stator units include therein the electromagnets. Another related objective of this invention is to provide such a system with at least one counter stator unit for one or more basic stator units whether each of the basic stator units may include therein one or more permanent magnets or electromagnets. Another related objective of this invention is to fabricate the system by first selecting the counter rotor unit and then determining a suitable counter stator unit. Another related objective of this invention is to fabricate the system by first designing the counter stator unit and then determining a suitable counter rotor unit. Another related objective of this invention is to fabricate the system by first designing one or more counter units for minimizing the irradiation of the harmful waves and then determining one or more counter units for cooperating with the basic units and adding the portion to the force. Another related objective of this invention is to fabricate such a system by first designing one or more counter units for cooperating with the basic units and adding the portion to the force and then determining one or more counter units for minimizing the irradiation of the harmful waves.

Another objective of the present invention is to form the electromagnetically-countered electric motor system by incorporating one or more counter rotor and/or stator units into various conventional or prior art electric motors. Accordingly, a related objective of this invention is to provide an EMC DC electric motor system which includes at least one counter rotor unit and at least one optional counter stator unit in addition to at least one basic rotor unit and stator unit of its prior art counterpart. Another related objective of this invention is to provide an EMC universal electric motor system which includes at least one counter rotor unit and at least one counter stator unit in addition to such basic rotor and stator units of its prior art counterpart. Another related objective of this invention is to provide an EMC synchronous AC electric motor system which includes at least one counter rotor unit and at least one counter stator units in addition to such basic rotor and stator units of its prior art counterpart. Another related objective of this invention is to provide an EMC induction AC electric motor which also includes at least one counter rotor unit and at least one counter stator unit in addition to such basic rotor and stator units of its prior art counterpart.

Another objective of the present invention is to form the electromagnetically-countered electric motor system capable of generating electromotive forces of varying amplitudes while minimizing such irradiation of the harmful waves in varying extents. Accordingly, a related objective of this invention is to manipulate amplitudes and/or directions of electric voltage applied to the system and to generate the forces defining different amplitudes and/or directions. Another related objective of this invention is to manipulate amplitudes and/or directions of electric current flowing through the system and to emit the counter waves having different amplitude and/or phase characteristics. Another related objective of this invention is to configure the system to vary the voltage and current in a preset relation so that the counter unit increases the extent of minimizing the irradiation of the harmful waves as the system generates greater force and vice versa.

Another objective of the present invention is to form the electromagnetically-countered electric motor system which includes multiple counter units but does not include the basic rotor and/or stator units as commonly arranged in the prior art electric motor or, in the alternative, which includes at least one counter unit. Accordingly, a related objective of this invention is to provide the system including multiple inner counter rotor units each of which is movably disposed off the center of the system but neither of which is disposed in the center. Another related objective of this invention is to provide another system including multiple outer counter rotor units each of which is movably disposed outside the basic stator unit while neither of which is disposed therein. Another related objective of this invention is to provide the system with multiple counter rotor units at least one of which is disposed inside the basic stator unit and at least another of which is disposed outside the basic stator unit. Another related objective of this invention is to provide the system with the counter stator unit which defines the magnetic poles of the same polarity in an alternating mode. Another related objective of this invention is to provide the system with multiple stator units between which at least one counter rotor unit is movably disposed.

Another objective of the present invention is to form the electromagnetically-countered electric motor system including at least one electric shield and/or at least one magnetic shield for minimizing the irradiation of the harmful waves. Therefore, a related objective of this invention is to provide the system with one or more electric shields each of which is capable of absorbing the electric waves of the harmful waves thereinto. Another related objective of this invention is to provide another system with one or more magnetic shields each of which is capable of absorbing the magnetic waves of the harmful waves thereinto and rerouting such magnetic waves therealong and, when desirable, sinking or terminating the rerouted magnetic waves in one or more magnetic poles of such magnetic shields. Another related objective of this invention is to provide the system with at least one composite shield which incorporates therein both of the above electric and magnetic shields. Another related objective of this invention is to provide the system with at least one of such shields as well as at least one of the above counter units, thereby canceling or suppressing the harmful waves and then absorbing and rerouting the remaining portions of such harmful waves by the shield.

It is appreciated in all of such objectives that the systems are preferably arranged to minimize the irradiation of the harmful waves while maintaining their sizes comparable to those of conventional electric motors of comparable power. It is also appreciated in all of such objectives that the systems are preferably arranged to minimize the irradiation of the harmful waves without adversely affecting their capability of generating electromotive forces and/or torques.

A variety of apparatus, method, and/or process aspects of the electromagnetically-countered electric motor systems and various embodiments thereof are now enumerated. It is to be understood, however, that following system, method, and/or process aspects of the present invention may further be embodied in many other different forms and, therefore, should not be limited only to such aspects and/or their embodiments which are to be set forth herein. Rather, various exemplary aspects and/or their embodiments described hereinafter are provided such that this disclosure will be thorough and complete, and fully convey the scope of this invention to one of ordinary skill in the relevant art.

In one aspect of the present invention, an electric motor system may be provided to generate electromotive force using an electric energy while minimizing irradiation of harmful waves irradiated by at least one wave source such as, e.g., at least one of a basic rotor unit and/or a basic stator unit thereof, by canceling a desired portion of such harmful waves by counter waves. More particularly, the basic rotor unit may be arranged to be rotatably disposed in the basic stator unit, the basic rotor and stator units may be arranged to generate magnetic fields therearound when the electric energy is supplied to the basic rotor and/or stator units, and dynamic interactions between such magnetic fields manipulate the basic rotor unit to angularly rotate about the basic stator unit while producing the force, where such basic rotor and stator units will be referred to as "standard basic units" hereinafter.

In one exemplary embodiment of this aspect of the invention, a system may include at least one counter unit which may be arranged to be aligned along a line connecting such basic rotor and stator units and to emit the counter waves also aligned with the harmful waves and capable of canceling the portion of such harmful waves. In the alternative, the counter unit may be arranged to be operatively coupled to the basic rotor and/or stator units, to emit the counter waves, and to manipulate amplitudes and/or phase angles of such counter waves for canceling the portion of such harmful waves. In one example for either counter unit, the basic rotor unit serves as the wave source, includes a permanent magnet, and irradiates the harmful waves during its angular movement in and around the basic stator unit, while the counter unit is another permanent magnet which is arranged to mechanically couple to the basic rotor unit and to angularly move with the basic rotor unit. The counter unit is also arranged in an orientation to oppose at least one like magnetic pole of the basic rotor unit, thereby emitting such counter waves during its angular movement around the basic stator unit. Such a structure will now be referred to as the "standard structure of the first type" or the "first standard structure" hereinafter. In another example therefor, such a basic rotor unit serves as the wave source, includes therein an electromagnet, and irradiates such harmful waves as the energy is supplied thereto along alternating directions, while the counter unit is another electromagnet which is arranged to mechanically couple with the basic rotor unit and to angularly move with the basic rotor unit. The counter unit is arranged in an orientation to oppose at least one like magnetic pole of the basic rotor unit while such energy is supplied in the alternating directions, thereby emitting the counter waves using the alternating energy. Such a structure will be referred to as the "standard structure of the second type" or the "second standard structure" hereinafter. In another example therefor, the basic stator unit instead serves as the wave source, includes therein an electromagnet, and irradiates the harmful waves as the energy is supplied thereto along alternating directions, while the counter unit is another electromagnet which is arranged to be disposed stationarily in a preset relation to the basic stator unit. The counter unit is arranged in an orientation to oppose at least one like magnetic pole of the basic stator unit when such energy is supplied along the alternating directions, thereby emitting such counter waves using such alternating energy. Such a structure will be referred to as the "standard structure of the third type" or the "third standard structure" hereinafter.

In another exemplary embodiment of this aspect of the invention, a system may include multiple counter units each of which may be capable of emitting such counter waves. The system includes such multiple wave sources, while each of the counter units is aligned along a radial direction pointing straight and outward from a center of the stator unit and arranged to emit the counter waves capable of canceling the portion of the harmful waves emitted by each of the sources.

In another exemplary embodiment of this aspect of the invention, a system may include at least one counter unit capable of irradiating the counter waves. When the system includes multiple wave sources, such a counter unit may be arranged to be aligned along at least two radial directions which point straight and outward from a center of the system, and to irradiate the counter waves capable of canceling the portion of the harmful waves emitted by at least two of such sources. In the alternative, the system includes multiple counter units each capable of emitting the counter waves. When such a system has multiple wave sources, at least one of such counter units may be arranged to be aligned in a radial direction pointing straight and outward from a center of the system and to emit the counter waves capable of canceling the portion of the harmful waves irradiated by at least two of the wave sources.

In another exemplary embodiment of this aspect of the invention, a system may include at least one counter unit which is arranged to be disposed along a line connecting such basic rotor and stator units, to irradiate the counter waves which are accordingly aligned with the harmful waves and also capable of canceling the portion of the harmful waves. Alternatively, the system may include at least one counter unit which is arranged to be operatively coupled to the basic rotor and/or stator units, to emit the counter waves, and to manipulate amplitudes and/or phase angles of the counter waves for canceling the portion of the harmful waves thereby. In one example for either counter units, the basic rotor unit is the wave source, while the counter unit is arranged in an orientation for opposing at least one like magnetic pole of the basic rotor unit and for operatively cooperating with the basic stator unit, thereby emitting the counter waves capable of canceling such a portion of the harmful waves while adding at least a portion to such force. In another example therefor, the basic stator unit operates as the wave source, and the counter unit is arranged in an orientation for opposing at least one like pole of the basic stator unit and for operatively cooperating with the basic stator unit, thereby emitting the counter waves for canceling the portion of the harmful waves while adding at least a portion to such force.

In another aspect of the present invention, another electric motor system may be provided for generating electromotive force using an electric energy while minimizing irradiation of harmful waves irradiated from at least one wave source which may be a basic rotor unit and/or a basic stator unit of the system by suppressing the harmful waves closer to the wave source, where the basic rotor and stator units are the aforementioned standard basic units.

In one exemplary embodiment of this aspect of the invention, a system may include at least one counter unit which is arranged to be disposed closer to (or to enclose at least a portion of) the wave source and to be arranged in an orientation for opposing a like magnetic pole of the source, thereby suppressing such harmful waves closer to the source. Alternatively, the system may include at least one counter unit including a permanent magnet (or an electromagnet) therein. When the wave source includes another permanent magnet (or electromagnet), the counter unit is arranged to orient at least one of its magnetic poles for opposing a like magnetic pole of the wave source, thereby suppressing the harmful waves closer to the source. In one example for either counter unit, such units have the first standard structure, where the counter unit is arranged to oppose the like magnetic pole of such a basic rotor unit with a like pole thereof, thereby suppressing the harmful waves. In another example therefor, such units define the second standard structure, where the counter is arranged to oppose the like magnetic pole of the basic rotor unit by a like pole thereof when the energy is supplied in the alternating directions, thereby suppressing the harmful waves. In another example therefor, the units have the third standard structure, where the counter unit is arranged to oppose the like magnetic pole of the basic stator unit by a like pole thereof when the energy is supplied in the alternating directions, thereby suppressing the harmful waves.

In another exemplary embodiment of this aspect of the invention, a system may include at least one counter unit which is arranged to be disposed closer to (or to enclose at least a portion of) such a wave source and to be arranged in an orientation for opposing a like magnetic pole of such a wave source and for cooperating with a magnetic pole of the basic rotor unit or stator unit which is not the above wave source, thereby suppressing the harmful waves closer to the source while contributing to generating the force. In the alternatively, the system may include at least one counter unit having a permanent magnet (or an electromagnet) therein, while the wave source includes another permanent magnet (or an electromagnet). The counter unit is then arranged to orient at least one of its magnetic poles for opposing a like magnetic pole of the source and to orient another of its magnetic poles so as to cooperate with a magnetic pole of the basic rotor unit or stator unit which is not the above wave source, thereby suppressing the harmful waves closer to the source while contributing to generating the force. In one example for either counter unit, such units have the first standard structure, and the counter unit is arranged to oppose the like magnetic pole of the basic rotor unit by a like pole thereof and to cooperate with the basic stator unit by another magnetic pole thereof, thereby suppressing the harmful waves and adding at least a portion to the force. In another example therefor, the units have the second standard structure, where the counter is arranged to oppose the like magnetic pole of the basic rotor unit with a like pole thereof and to cooperate with the basic stator unit by another magnetic pole thereof when the energy is supplied in the alternating directions, thereby suppressing the harmful waves and adding at least a portion to the force. In another example therefor, the units have the third standard structure, where the counter unit is further arranged to oppose the like magnetic pole of the basic stator unit with a like pole thereof and to cooperate with the basic rotor unit by another magnetic pole thereof when the energy is supplied in the alternating directions, thereby suppressing the harmful waves and adding at least a portion to the force.

In another exemplary embodiment of this aspect of the invention, a system may include at least one counter unit which is arranged to mechanically couple with the basic rotor unit, to angularly move with the basic rotor unit, and to be arranged in an orientation for opposing a preset number of poles of the basic rotor unit by the preset number (or a greater or less number) of like magnetic poles thereof, thereby suppressing the harmful waves closer to the source.

In another exemplary embodiment of this aspect of the invention, a system may include at least one counter unit which is arranged to be stationarily disposed in a preset relation to the basic stator unit and to be arranged in an orientation for opposing a preset number of magnetic poles of the basic stator unit by the preset number (or a greater or less number) of like magnetic poles thereof, thereby suppressing the harmful waves closer to the source.

In another aspect of the present invention, another electric motor system may be provided for generating electromotive force in response to an electric energy while minimizing irradiation of harmful waves irradiated by at least one wave source which includes at least one of a basic rotor unit and a basic stator unit of the system, where the basic rotor and stator units are such standard basic units.

In one exemplary embodiment of this aspect of the invention, a system may include at least one counter unit which is arranged to enclose therein at least a portion of the basic rotor unit which is the wave source, to be mechanically coupled to the wave source, to irradiate counter waves capable of canceling a desired portion of such harmful waves, and to angularly rotate about the basic stator unit with the basic rotor unit while emitting such counter waves, thereby minimizing the irradiation during rotation of the basic rotor unit.

In another exemplary embodiment of this aspect of the invention, a system may include at least one counter unit which is arranged to enclose therein at least a portion of such a wave source and to emit counter waves capable of canceling a desired portion of the harmful waves during a supply of the energy to the counter unit and/or source, thereby minimizing the irradiation during the supply.

In another exemplary embodiment of this aspect of the invention, a system may include at least one counter unit which is arranged to enclose therein at least a portion of the wave source and to be arranged in an orientation capable of emitting counter waves for canceling a desired portion of such harmful waves and capable of cooperating with the other of the basic rotor and stator units which is not the above enclosed wave source for contributing to the force. In one example, such units define the first standard structure, where the counter unit is arranged to oppose the like magnetic pole of the basic rotor unit with a like pole thereof and to cooperate with the basic stator unit by another magnetic pole thereof, thereby canceling the portion of the harmful waves while adding at least a portion to the force. In another example, the units have the second standard structure, and the counter is arranged to oppose the like magnetic pole of the basic rotor unit by a like pole thereof and to cooperate with the basic stator unit by another magnetic pole thereof when such energy is supplied along the alternating directions, thereby canceling the portion of the harmful waves while adding at least a portion to such force. In another example, such units define the third standard structure, where the counter unit is arranged to oppose the like magnetic pole of the basic stator unit by its like pole and to cooperate with the basic rotor unit by another magnetic pole thereof when the energy is supplied along the alternating directions, thereby canceling the portion of the harmful waves while adding at least a portion to such force.

In another exemplary embodiment of this aspect of the invention, a system may include at least one counter unit which is arranged to enclose therein at least a portion of the basic rotor unit which is the wave source, to be mechanically coupled to the wave source, to be arranged in an orientation for opposing a magnetic pole of the basic rotor unit by its like magnetic pole for suppressing the harmful waves closer to the basic rotor unit, and to angularly rotate about the basic stator unit along with the basic rotor unit while maintaining the orientation, thereby minimizing the irradiation during rotation of the basic rotor unit.

In another exemplary embodiment of this aspect of the invention, a system may include at least one counter unit which is arranged to enclose therein at least a portion of such a wave source, to be arranged in an orientation for opposing a magnetic pole of the source by a like magnetic pole thereof during a supply of the energy to the counter unit and/or wave source, and to maintain the orientation while the energy is supplied thereinto, thereby minimizing such irradiation by suppressing the harmful waves closer to the source.

In another exemplary embodiment of this aspect of the invention, a system may include at least one counter unit which is arranged to enclose therein at least a portion of the wave source and to be arranged in an orientation capable of suppressing the harmful waves closer to the wave source and also capable of cooperating with the other of the basic rotor and stator units which is not the above enclosed source for contributing to such force. In one example, such units define the first standard structure, where the counter unit is arranged to oppose the like magnetic pole of the basic rotor unit by a like pole thereof and to cooperate with the basic stator unit by its another magnetic pole, thereby suppressing the harmful waves while adding at least a portion to such force. In another example, the units have the second standard structure, where the counter is arranged to oppose the like magnetic pole of the basic rotor unit with its like pole and to cooperate with the basic stator unit by another magnetic pole as the energy is supplied in the alternating directions, thereby suppressing the harmful waves while adding at least a portion to the force. In yet another example, such units define the third standard structure, where the counter unit is arranged to oppose the like magnetic pole of the basic stator unit by its like pole and to cooperate with the basic rotor unit by its another magnetic pole when the energy is supplied along the alternating directions, thereby suppressing the harmful waves while adding at least a portion to the force.

In another aspect of the present invention, another electric motor system may be provided for generating electromotive force in response to an electric energy while minimizing irradiation of harmful waves irradiated by at least one of a basic rotor unit as well as a basic stator unit thereof, where the basic rotor and stator units operate as the above standard basic units.

In one exemplary embodiment of this aspect of the invention, a system may include at least one counter unit which is arranged to define at least two magnetic poles thereon, to be movably disposed outside (or inside) the basic stator unit, to be mechanically coupled to the basic rotor unit for rotating therewith, and to oppose one magnetic pole of the basic rotor unit by its like pole for suppressing the harmful waves closer to the basic rotor unit and/or for emitting counter waves capable of canceling a desired portion of the harmful waves.

In another exemplary embodiment of this aspect of the invention, a system may include multiple counter units each of which is arranged to define at least two magnetic poles thereon, to be movably disposed outside (or inside) the basic stator unit, and to mechanically couple with the basic rotor unit for rotating therewith. The counter units are also arranged to oppose each pole of the basic rotor unit with its like pole for suppressing such harmful waves closer to the basic rotor unit and/or for emitting counter waves capable of canceling a desired portion of the harmful waves.

In another exemplary embodiment of this aspect of the invention, a system may include at least one counter unit which is arranged to mechanically couple with the basic rotor unit to rotate therewith and to be aligned along a line connecting such basic rotor and stator units while directly or indirectly opposing at least one magnetic pole of the basic rotor unit with at least one like magnetic pole defined along the counter unit, thereby suppressing such harmful waves closer to the basic rotor unit and/or emitting counter waves capable of canceling a desired portion of the harmful waves.

In another exemplary embodiment of this aspect of the invention, a system may include at least one counter unit which is arranged to form at least two magnetic poles therein, to be disposed outside the basic stator unit, and then to oppose one magnetic pole of the basic stator unit by its like pole for suppressing the harmful waves closer to the basic stator unit and/or emitting counter waves capable of canceling a desired portion of the harmful waves.

In another exemplary embodiment of this aspect of the invention, a system may include multiple counter units each of which is arranged to define thereon at least two magnetic poles and to be also disposed outside the basic stator unit. Such counter units are also arranged to oppose each pole of the basic stator unit by its like pole for suppressing the harmful waves closer to the basic stator unit and/or emitting counter waves capable of canceling a desired portion of the harmful waves.

In another aspect of the present invention, another electric motor system may be provided for generating electromotive force using an electric energy while minimizing irradiation of harmful waves irradiated by a basic rotor unit and/or a basic stator unit thereof and also for adding at least a portion to the force, where the basic rotor and stator units are such standard basic units.

In one exemplary embodiment of this aspect of the invention, a system may include at least one counter unit which is arranged to define at least two magnetic poles thereon, to be movably disposed outside (or inside) the basic stator unit, to be mechanically coupled to the basic rotor unit for rotating therewith, to oppose one magnetic pole of the basic rotor unit with a like pole thereof for suppressing the harmful waves closer to the basic rotor unit and irradiating counter waves capable of canceling a desired portion of the harmful waves, and to orient another magnetic pole thereof for cooperating with at least one magnetic pole of the basic stator unit for adding the portion to the force.

In another exemplary embodiment of this aspect of the invention, a system may include at least one counter unit and at least one counter stator unit. The counter rotor unit is then arranged to form at least two magnetic poles therein, to be movably disposed outside the basic stator unit, to mechanically couple to the basic rotor unit for rotating therewith, and to oppose one magnetic pole of the basic rotor unit by its like pole for suppressing the harmful waves closer to such a basic rotor unit and/or emitting counter waves capable of canceling a desired portion of the harmful waves. The counter stator unit is arranged to be disposed outside the counter rotor unit, to define at least two magnetic poles therein, and to cooperate with at least one magnetic pole of the counter rotor unit by its like pole for adding the portion to the force.

In another aspect of the present invention, another electric motor system may be provided for generating electromotive force in response to an electric energy while minimizing irradiation of harmful waves irradiated by a basic rotor unit and/or a basic stator unit thereof while maintaining capability of generating the force, where the basic rotor and stator units are such standard basic units.

In one exemplary embodiment of this aspect of the invention, a system may include at least one counter unit which is arranged to define at least two magnetic poles thereon, to be movably disposed outside (or inside) the basic stator unit, to be mechanically coupled to the basic rotor unit for rotating therewith, to oppose one magnetic pole of the basic rotor unit by a like pole thereof for suppressing the harmful waves closer to the basic rotor unit and/or emitting counter waves capable of canceling a desired portion of the harmful waves, and to orient another magnetic pole thereof so as to oppose the basic stator unit as farther away from the basic stator unit for maintaining such capability.

In another exemplary embodiment of this aspect of the invention, a system may include at least one counter rotor unit and at least one counter stator unit. Such a counter rotor unit is then arranged to form at least two magnetic poles thereon, to be movably disposed outside the basic stator unit, to mechanically couple with the basic rotor unit for rotating therewith, and to oppose one magnetic pole of the basic rotor unit by its like pole for suppressing the harmful waves closer to the basic rotor unit and/or emitting counter waves capable of canceling a desired portion of the harmful waves. Such a counter stator unit is arranged to be disposed outside the counter rotor unit, to form thereon at least two magnetic poles, and to dispose one magnetic pole thereof as farther away from a like magnetic pole of the basic stator unit for the purpose of maintaining the capability for generating the force.

In another aspect of the present invention, another electric motor system may be provided for generating electromotive force using an electric energy while minimizing irradiation of harmful waves irradiated by at least one wave source which includes at least one basic rotor unit and/or at least one basic stator unit thereof by suppressing the harmful waves closer to the wave source and/or emitting counter waves capable of canceling a desired portion of the harmful waves, where such basic rotor and stator units are such standard basic units.

In one exemplary embodiment of this aspect of the invention, a system may include at least one counter rotor unit which is arranged to form at least two magnetic poles therein, to be disposed inside (or outside) the basic stator unit, to be aligned with the basic rotor unit, to be mechanically coupled to the basic rotor unit for rotating about and inside the basic stator unit, and then to oppose at least one magnetic pole of the basic rotor unit for suppressing the harmful waves closer to the basic rotor unit and/or emitting counter waves capable of canceling the portion of the harmful waves.

In another exemplary embodiment of this aspect of the invention, a system may include multiple counter rotor units each of which is arranged to define at least two magnetic poles thereon, to be also disposed inside (or outside) such a basic stator unit, to be aligned with such a basic rotor unit, and to be mechanically coupled to the basic rotor unit for rotating about and inside the basic stator unit. The counter rotor units are also arranged to oppose at least two magnetic poles of the basic rotor unit for suppressing the harmful waves closer to the basic rotor unit and/or emitting counter waves capable of canceling the portion of the harmful waves.

In another exemplary embodiment of this aspect of the invention, a system may include first multiple counter rotor units each having at least two magnetic poles thereon and second multiple basic rotor units, where the second multiple is equal to (or greater or less than) a twice of the first multiple. The counter rotor units are arranged to be disposed inside (or outside) such a basic stator unit, to be aligned with the basic rotor unit, and to be mechanically coupled to the basic rotor units for rotating inside the basic stator units, and to oppose at least one magnetic pole of each of the basic rotor units for suppressing such harmful waves closer to the basic rotor unit and/or emitting counter waves for canceling the portion of the harmful waves.

In another exemplary embodiment of this aspect of the invention, a system may also include at least one counter stator unit and at least one counter rotor unit. The counter stator unit is arranged to be stationarily disposed outside the basic stator unit and to form at least two magnetic poles thereon. The counter rotor unit is then arranged to form at least two magnetic poles thereon, to be disposed between the basic and counter stator units, to be aligned with the basic rotor unit, to be mechanically coupled to the basic rotor unit for rotating about and inside the basic stator unit, and to oppose at least one magnetic pole of the basic rotor unit for suppressing the harmful waves closer to the basic rotor unit and/or emitting counter waves capable of canceling the portion of the harmful waves.

In another exemplary embodiment of this aspect of the invention, a system may also include at least one counter stator unit and at least one counter rotor unit. The counter stator unit is arranged to be stationarily incorporated outside (or inside) the basic stator unit and to define at least two magnetic poles thereon. The counter rotor unit is arranged to be movably disposed inside (or outside) the basic (or counter) stator unit, to form at least two magnetic poles thereon, to be mechanically coupled to the basic rotor unit for rotating about and inside the basic (or counter) rotor unit, and to oppose at least one magnetic pole of the basic rotor unit for suppressing the harmful waves closer to the basic rotor unit and/or emitting counter waves for canceling the portion of the harmful waves.

In another exemplary embodiment of this aspect of the invention, a system may include at least one counter stator unit and first multiple counter rotor units. The counter stator unit is arranged to be stationarily disposed outside (or inside) the basic stator unit and to define at least two magnetic poles thereon. Each of the counter rotor units forms at least two magnetic poles thereon. The system may also include second multiple basic rotor units which are arranged to be disposed outside the basic (or counter) stator unit, where the second multiple may be equal to, greater than or less than a twice of such first multiple. The counter rotor units are arranged to be disposed outside the basic (or counter) stator units, to be aligned with the basic rotor units, and to mechanically couple with such basic rotor units to rotate about and outside the basic (or counter) stator units and to further oppose at least one magnetic pole of each of the basic rotor units for suppressing the harmful waves closer to the basic rotor units and/or emitting counter waves capable of canceling the portion of the harmful waves.

In another exemplary embodiment of this aspect of the invention, a system may include at least one counter stator unit and at least one counter rotor unit. The counter stator unit may be arranged to be stationarily disposed outside (or inside) such a basic stator unit and to define at least two magnetic poles thereon. The counter rotor unit is arranged to form at least two magnetic poles thereon. Such a system also includes multiple basic rotor units which are arranged to be disposed between the basic stator units and counter stator units, to be aligned with the basic rotor unit, to be mechanically coupled to the counter rotor unit to rotate about and outside the basic (or counter) stator unit, and to oppose at least one magnetic pole of the counter rotor unit for suppressing the harmful waves closer to such a basic rotor unit and/or emitting counter waves capable of canceling the portion of the harmful waves.

In another aspect of the present invention, a DC motor system may include at least one basic rotor unit and at least one basic stator unit and may also be capable of generating electromotive force using a DC electric energy while minimizing irradiation of harmful waves irradiated by the basic rotor unit by suppressing such harmful waves closer to a wave source such as the basic rotor unit and/or emitting counter waves capable of canceling a desired portion of the harmful waves, where the basic rotor and stator units are such standard basic units.

In one exemplary embodiment of this aspect of the invention, a system may include at least one counter rotor unit which is arranged to include an electromagnet forming at least two magnetic poles thereon, to be disposed in the basic stator unit, to be aligned with the basic rotor unit, to mechanically couple with the basic rotor unit for rotating about and inside the basic stator unit, and to also oppose at least one magnetic pole of the basic rotor unit for suppressing the harmful waves closer to such a basic rotor unit and/or emitting counter waves capable of canceling the portion of the harmful waves, where such a counter rotor unit will now be referred to as the "counter rotor unit of the first type" or the "first counter rotor unit" hereinafter.

In another exemplary embodiment of this aspect of the invention, a system may include multiple counter rotor units each of which is arranged to include an electromagnet with at least two magnetic poles therein, to be disposed inside the basic stator unit, to be radially aligned with the basic rotor unit, and to mechanically couple with the basic rotor unit for rotating about and inside the basic stator unit. At least two of such counter rotor units are arranged to oppose all magnetic poles of the basic rotor unit by like magnetic poles thereof for suppressing such harmful waves closer to the basic rotor unit and/or emitting counter waves capable of canceling the portion of the harmful waves, where such counter rotor units will be referred to as the "counter rotor units of the second type" or the "second counter rotor units" hereinafter.

In another exemplary embodiment of this aspect of the invention, a system may include multiple counter rotor units each of which is arranged to include the electromagnet with at least two magnetic poles thereon, to be disposed outside the basic stator unit, to be radially aligned with the basic rotor unit, and to be mechanically coupled to the basic rotor unit to rotate about and outside the basic stator unit. Such counter rotor units are further arranged to oppose all magnetic poles of the basic rotor unit with like magnetic poles of at least two thereof for suppressing the harmful waves closer to the basic rotor unit and/or emitting counter waves capable of canceling such a portion of the harmful waves, where such counter rotor units will be referred to as the "counter rotor units of the third type" or the "third counter rotor units" hereinafter.

In another exemplary embodiment of this aspect of the invention, a system may also have first multiple counter rotor units each of which is arranged to include the electromagnet having at least two magnetic poles thereon. As the system includes second multiple basic rotor units where the second multiple is equal to, greater than or less than the first multiple, each of the counter rotor units is then arranged to be disposed out of the basic stator unit, to be aligned with at least one of the basic rotor units, and to mechanically couple with at least one of the basic rotor units for rotating about and out of the basic stator unit. The counter rotor units are arranged to oppose all magnetic poles of such basic rotor units by like magnetic poles of at least two thereof for suppressing the harmful waves closer to the basic rotor unit and/or emitting counter waves to cancel the portion of the harmful waves, where such counter rotor units will be referred to as the "counter rotor units of the fourth type" or the "fourth counter rotor units" hereinafter.

In another exemplary embodiment of this aspect of the invention, a system may include at least one counter stator unit which is arranged to include a permanent magnet having at least two magnetic poles thereon, to be disposed outside the basic stator unit, and to oppose at least one magnetic pole of such a basic stator unit for suppressing such harmful waves closer to the basic stator unit and/or emitting counter waves capable of canceling the portion of the harmful waves, where such a counter stator unit is to be referred to as the "counter stator unit of the first type" or the "first counter stator unit" hereinafter.

In another exemplary embodiment of this aspect of the invention, a system may also have first multiple counter stator units each of which is arranged to have a permanent magnet defining at least two magnetic poles thereon. When the system includes second multiple basic stator units, where the second multiple is equal to, greater than or less than the first multiple, each of the counter stator units is arranged to be disposed outside the basic stator units, to be radially aligned with at least one of the basic stator units, and to oppose all magnetic poles of the basic stator units with like magnetic poles of at least two thereof for suppressing such harmful waves closer to the basic rotor unit and/or emitting counter waves for canceling the portion of the harmful waves, where such a counter stator unit will now be referred to as the "counter stator unit of the second type" or the "second counter stator unit" hereinafter.

In another aspect of the present invention, a DC motor system may include at least one basic rotor unit and at least one basic stator unit and may also be capable of generating electromotive force using a DC electric energy while minimizing irradiation of harmful waves irradiated by the basic rotor unit, where the basic rotor and stator units are such standard basic units.

In one exemplary embodiment of this aspect of the invention, a system may include at least one electric shield which is arranged to be electrically conductive, to operatively couple to the basic rotor and/or stator units, and to absorb therein electric waves of the harmful waves, thereby minimizing the irradiation, where this electric shield will be referred to as the "standard electric shield" hereinafter.

In another exemplary embodiment of this aspect of the invention, a system may include at least one of various magnetic shields of various types. In one example, the magnetic shield is arranged to operatively couple with the basic rotor and/or stator units, to absorb magnetic waves of the harmful waves therein, and to reroute the magnetic waves away from an user therealong, thereby minimizing the irradiation, where this magnetic shield will be referred to as the "magnetic shield of the first type" or the "first magnetic shield" hereinafter. In another example, the magnetic shield is rather arranged to operatively couple with the basic rotor and/or stator units, to include therein at least one magnetically permeable path member and at least one magnet member forming at least one magnetic pole thereon and also directly or indirectly coupling with the path member, to absorb magnetic waves of the harmful waves along the path member, and then to terminate the magnetic waves in the magnetic pole of the magnet member, thereby minimizing the irradiation, where such a magnetic shield will be referred to as the "magnetic shield of the second type" or the "second magnetic shield" hereinafter. In yet another example, the magnetic shield is arranged to operatively couple with the basic rotor and/or stator units and to include a magnetically permeable path member, a magnet member forming at least one magnetic pole thereon and directly or indirectly coupling with the path member, and a shunt member, where the path member may be arranged to absorb magnetic waves of the harmful waves thereinto, where the magnet member is arranged to terminate the magnetic waves by the pole while generating magnetic fields therearound, while the shunt member is arranged to be magnetically permeable and to confine the magnetic fields from the magnet member closer thereto, thereby minimizing the irradiation. Such a magnetic shield will now be referred to as the "magnetic shield of the third type" or the "third magnetic shield" hereinafter.

In another exemplary embodiment of this aspect of the invention, a system may include such a standard electric shield and at least one of the first, second, and third magnetic shields.

In another aspect of the present invention, an universal motor system may include at least one basic rotor unit and at least one basic stator unit and may also be capable of generating electromotive force by either of a DC electric energy or an AC electric energy while minimizing irradiation of harmful waves irradiated by the basic rotor and stator units by suppressing such harmful waves closer to the wave source and/or emitting counter waves which are capable of canceling a desired portion of the harmful waves, where the basic rotor and stator units are such standard basic units.

In one exemplary embodiment of this aspect of the invention, a system may include the above first counter rotor unit. In another exemplary embodiment of such an aspect of the invention, a system may include the second counter rotor units. In another exemplary embodiment of the same aspect of the invention, a system may include the third counter rotor units. In another exemplary embodiment of this aspect of the invention, a system may include the fourth counter rotor units.

In another exemplary embodiment of this aspect of the invention, a system may include at least one counter stator unit which is arranged to have an electromagnet with at least two magnetic poles, to be disposed outside the basic stator unit, and to also oppose at least one magnetic pole of the basic stator unit for suppressing such harmful waves closer to the basic stator unit and/or emitting counter waves capable of canceling the portion of the harmful waves, where such a counter stator unit will be referred to as the "counter stator unit of the third type" or the "third counter stator unit" hereinafter.

In another exemplary embodiment of this aspect of the invention, a system may also have first multiple counter stator units each of which is arranged to include an electromagnet having at least two magnetic poles thereon. As the system includes second multiple basic stator units where the second multiple is equal to, greater than or less than the first multiple, each of the counter stator units is then arranged to be disposed outside the basic stator units, to be radially aligned with at least one of such basic stator units, and to oppose all magnetic poles of the basic stator units with like magnetic poles of at least two thereof for suppressing the harmful waves closer to the basic rotor unit and/or emitting counter waves for canceling the portion of the harmful waves, where such counter stator units will now be referred to as the "counter stator units of the fourth type" or the "fourth counter stator units" hereinafter.

In another aspect of the present invention, an universal motor system may include at least one basic rotor unit and at least one basic stator unit and may be also capable of generating electromotive force using either a DC electric energy or an AC electric energy while minimizing irradiation of harmful waves irradiated by the basic rotor and stator units, where the basic rotor and stator units are such standard basic units.

In one exemplary embodiment of this aspect of the invention, a system may include the above standard electric shield. In another exemplary embodiment of this aspect of the invention, a system may include at least one of the above first, second, and third magnetic shields. In another exemplary embodiment of this aspect of the invention, a system may include the standard electric shield and at least one of the first, second, and third magnetic shields.

In another aspect of the present invention, a synchronous motor system may include at least one basic rotor unit and at least one basic stator unit and may be capable of generating electromotive force using an AC electric energy while minimizing irradiation of harmful waves irradiated by both of the basic rotor and stator units by suppressing the harmful waves closer to the wave source and/or emitting counter waves capable of canceling a desired portion of the harmful waves, where the basic rotor and stator units are such standard basic units.

In one exemplary embodiment of this aspect of the invention, a system may include at least one counter rotor unit which is arranged to have a permanent magnet forming at least two magnetic poles thereon, to be disposed in the basic stator unit, to be aligned with the basic rotor unit, to mechanically couple with the basic rotor unit for rotating about and inside the basic stator unit, and to also oppose at least one magnetic pole of such a basic rotor unit for suppressing the harmful waves closer to the basic rotor unit and/or emitting counter waves capable of canceling the portion of the harmful waves.

In another exemplary embodiment of this aspect of the invention, a system may include multiple counter rotor units each of which is arranged to have a permanent magnet with at least two magnetic poles thereon, to be disposed inside the basic stator unit, to be radially aligned with such a basic rotor unit, and to mechanically couple with the basic rotor unit for rotating about and inside the basic stator unit. At least two of such counter rotor units are also arranged to oppose all magnetic poles of such a basic rotor unit by like magnetic poles of at least two thereof for suppressing such harmful waves closer to the basic rotor unit and/or emitting counter waves capable of canceling such a portion of the harmful waves.

In another exemplary embodiment of this aspect of the invention, a system may include multiple counter rotor units each of which is arranged to have a permanent magnet with at least two magnetic poles thereon, to be disposed out of the basic stator unit, to be radially aligned with such a basic rotor unit, and to be mechanically coupled to the basic rotor unit to rotate about and outside the basic stator unit. The counter rotor units are further arranged to oppose all magnetic poles of the basic rotor unit with like magnetic poles of at least two thereof for suppressing the harmful waves closer to the basic rotor unit and/or emitting counter waves to cancel the portion of the harmful waves.

In another exemplary embodiment of this aspect of the invention, a system may also have first multiple counter rotor units each of which is arranged to have a permanent magnet having at least two magnetic poles thereon. When the system also includes second multiple basic rotor units where such second multiple is equal to, greater than or less than the first multiple, each of the counter rotor units is arranged to be disposed outside such a basic stator unit, to be radially aligned with at least one of the basic rotor units, and to mechanically couple with at least one of the basic rotor units to rotate about and out of the basic stator unit. The counter rotor units are arranged to oppose all magnetic poles of the basic rotor units by like magnetic poles of at least two thereof for suppressing the harmful waves closer to the basic rotor unit and/or emitting counter waves for canceling such a portion of the harmful waves.

In another exemplary embodiment of this aspect of the invention, a system may also have the third counter stator unit. In another exemplary embodiment of this aspect of the invention, a system may include the fourth counter stator units.

In another aspect of the present invention, a synchronous motor system may include at least one basic rotor unit and at least one basic stator unit and may be capable of generating electromotive force using an AC electric energy while minimizing irradiation of harmful waves irradiated by both of the basic rotor and stator units, where the basic rotor and stator units are such standard basic units.

In one exemplary embodiment of this aspect of the invention, a system may include the above standard electric shield. In another exemplary embodiment of the same aspect of the invention, such a system may have at least one of the first, second, and third magnetic shields. In another exemplary embodiment of this aspect of the invention, a system may also include the standard electric shield and at least one of the first, second, and third magnetic shields.

In another aspect of the present invention, an induction motor system may include at least one basic rotor unit and at least one basic stator unit and may also be capable of generating electromotive force using an AC electric energy while minimizing irradiation of harmful waves irradiated by both of the basic rotor and stator units by suppressing the harmful waves closer to the wave source and/or emitting counter waves capable of canceling a desired portion of the harmful waves, where the basic rotor unit is arranged to be mainly made of at least one electric conductor, while such basic rotor and stator units are such standard basic units.

In one exemplary embodiment of this aspect of the invention, a system may include the above first counter rotor unit. In another exemplary embodiment of the same aspect of the invention, such a system may include the second counter rotor units. In another exemplary embodiment of this aspect of the invention, a system may include the third counter rotor units. In another exemplary embodiment of this aspect of the invention, such a system may include the fourth counter rotor units. In another exemplary embodiment of this aspect of the invention, a system may include the third counter stator unit. In another exemplary embodiment of this aspect of the invention, a system may include the fourth counter stator units.

In another aspect of the present invention, an induction motor system may include at least one basic rotor unit and at least one basic stator unit and may also be capable of generating electromotive force using an AC electric energy while minimizing irradiation of harmful waves irradiated by the basic rotor and stator units, where the basic rotor unit is arranged to include at least one electric conductor, while the basic rotor and stator units are such standard basic units.

In one exemplary embodiment of this aspect of the invention, a system may include the above the standard electric shield. In another exemplary embodiment of the same aspect of the invention, a system may include at least one of the first, second, and third magnetic shields. In another exemplary embodiment of this aspect of the invention, a system may include the standard electric shield and at least one of the first, second, and third magnetic shields.

In another aspect of the present invention, an electromagnetically countered electric motor system includes at least one basic rotor unit and at least one basic stator unit. The basic rotor unit is arranged to be rotatably disposed with respect to the basic stator unit, where the basic units are arranged to generate first dynamic magnetic fields therearound when first electric energy is supplied to at least one of the basic units in a first direction, and where the basic rotor unit is arranged to rotate due to the first magnetic fields while producing first electromotive force and while irradiating from at least one of said base units first electromagnetic waves defining first characteristics. Such a system may comprise at least one counter rotor unit and at least one counter stator unit each of which is disposed in a preset arrangement with respect to each of the basic rotor unit and basic stator unit, respectively. Such counter rotor unit is arranged to be rotatably disposed with respect to the counter stator unit, where the counter units are arranged to generate second dynamic magnetic fields therearound when second electric energy is supplied to at least one of the counter units in a second direction, and where the counter rotor unit is arranged to rotate due to the second magnetic fields while emitting from at least one of the counter units second electromagnetic waves defining second characteristics. Accordingly, such a system is arranged to minimize an intensity of the first waves irradiating onto a user of the system by suppressing a preset portion of the first waves from propagating toward the user due to such an arrangement, direction, and/or characteristics and/or by canceling the portion of the first waves with the second waves around the user due to at least one of such an arrangement, directions, and/or characteristics.

In one exemplary embodiment of this aspect of the invention, a system may be arranged to cancel such a portion of the first waves by concentrating such a portion of the first waves around the system and away from the user. In another exemplary embodiment of this aspect of the invention, the first and second directions may be at least substantially similar to each other, the first and second characteristics may be at least substantially similar to each other, and the basic rotor unit and counter rotor unit may be aligned at least partially side by side, whereby the system is arranged to minimize the intensity preferentially by such suppressing. In another exemplary embodiment of this aspect of the invention, the first and second directions may be at least substantially similar to each other, the first and second characteristics may be at least substantially similar to each other, and the basic rotor unit and counter rotor unit may be aligned to at least partially abut each other, whereby the system is arranged to minimize the intensity preferentially by such canceling. In another exemplary embodiment of this aspect of the invention, the first and second directions may be at least substantially opposite to each other, the first and second characteristics may be at least substantially similar to each other, and the basic rotor unit and counter rotor unit may be aligned at least partially side by side, whereby the system is arranged to minimize the intensity preferentially by such canceling. In another exemplary embodiment of this aspect of the invention, the first and second directions may be at least substantially opposite to each other, the first and second characteristics may be at least substantially similar to each other, and the basic rotor unit and counter rotor unit may be aligned to at least partially abut each other, whereby the system is arranged to minimize the intensity preferentially by such suppressing. In another exemplary embodiment of this aspect of the invention, the first and second directions may be at least substantially similar to each other, the first and second characteristics may be at least substantially opposite to each other, and the basic rotor unit and counter rotor unit may be aligned at least partially side by side, whereby the system is arranged to minimize said intensity preferentially by such canceling. In another exemplary embodiment of this aspect of the invention, the first and second directions may be at least substantially similar to each other, the first and second characteristics may be at least substantially opposite to each other, and the basic rotor unit and counter rotor unit may be aligned to at least partially abut each other, whereby the system is arranged to minimize said intensity preferentially by such suppressing. In another exemplary embodiment of this aspect of the invention, the first and second directions may be at least substantially opposite to each other, the first and second characteristics may be at least substantially opposite to each other, and the basic rotor unit and counter rotor unit may be aligned at least partially side by side, whereby the system is arranged to minimize the intensity preferentially by such suppressing. In another exemplary embodiment of this aspect of the invention, the first and second directions may be at least substantially opposite to each other, the first and second characteristics may be at least substantially opposite to each other, and the basic rotor unit and counter rotor unit may be aligned to at least partially abut each other, whereby the system is arranged to minimize the intensity preferentially by such canceling. In another exemplary embodiment of this aspect of the invention, the first energy and said second energy may be at least substantially similar to each other, the rotor units may be at least substantially similar to each other, and/or the stator units may be at least substantially similar to each other. In another exemplary embodiment of this aspect of the invention, the counter rotor unit may be arranged to produce second electromotive force, where the second force is configured to be added to the first force or where the second force is configured to be independent from said first force.

In another aspect of the present invention, an electromagnetically countered electric motor system includes at least one basic stator unit and at least one basic rotor unit which is arranged to rotate with respect to the basic stator unit when first electric energy is supplied to at least one of the basic units while irradiating from at least one of the base units first electromagnetic waves. Such a system comprises at least one counter stator unit and at least one counter rotor unit which is arranged to rotate with respect to the counter stator unit when second electric energy is supplied to at least one of such counter units while emitting from at least one of such counter units second electromagnetic waves, where the system is arranged to minimize an intensity of the first waves irradiating onto a user of the system due to at least one of an arrangement between the basic units and counter units, directions of the first and second energies, and/or characteristics of the first and second waves.

In one exemplary embodiment of this aspect of the invention, a system may be arranged to minimize the intensity by suppressing a preset portion of the first waves from propagating toward the user due to at least one of said arrangement, directions, and characteristics. In another exemplary embodiment of this aspect of the invention, a system may be arranged to minimize the intensity by canceling such a portion of the first waves with the second waves around the user while concentrating such a portion of the first waves around the system and away from the user due to at least one of said arrangement, directions, and characteristics.

In another aspect of the present invention, an electromagnetically countered electric motor system includes at least one basic stator unit and at least one basic rotor unit which is arranged to rotate with respect to the basic stator unit when first electric energy is supplied to at least one of the basic units while irradiating from at least one of said base units first electromagnetic waves and at least one counter stator unit and at least one counter rotor unit which is arranged to rotate with respect to the counter stator unit when second electric energy is supplied to at least one of such counter units while emitting from at least one of the counter units second electromagnetic waves, where the system is configured to minimize an intensity of the first waves irradiating onto a user of the system due to at least one of an arrangement between the basic units and counter units, directions of the first and second energies, and characteristics of said first and second waves.

Embodiments of such system aspects of the present invention may include one or more of the following features, and configurational and/or operational variations and/or modifications of the above systems also fall within the scope of the present invention.

Such another multiple for the sources may be equal to, greater than or less than the multiple of the counter units. Such a wave source may be the basic stator unit which may be an electromagnet, may be the basic rotor unit which may be either a permanent magnet or an electromagnet, or may be both. The counter unit may be a stationary counter stator unit or a rotatable counter rotor unit. Such a counter unit may be the counter rotor (or stator) unit with a shape and/or size which may be identical to, similar to or different from those of the basic rotor (or stator) unit. The counter unit may conform to at least one of the basic rotor and stator units. The counter unit may be the counter rotor (or stator) unit having a profile which may be less (or greater) than that of the basic rotor (or stator) unit along the radial direction, having a curvilinear length which may be less (or greater) than that of the basic rotor unit along an angular direction, and the like. The counter units may have an arrangement which may be equal to, similar to or different from an arrangement between multiple basic rotor units, from an arrangement between multiple basic stator units, and so on, where such an arrangement may include disposition, orientation, and numbers. The counter unit may have a composition which may be equal to, similar to or different from a composition of the basic rotor and/or stator units. At least one of the counter units may have a composition which may be equal to, similar to or different from a composition of at least another of the counter units.

The counter unit may form therearound static or dynamic magnetic fields defining amplitudes equal to, greater than or less than one of the basic rotor and stator units to oppose with its magnetic pole when measured at a preset distance therefrom. The counter unit may be the electromagnet and include a counter coil which may include an equal, greater or less number of turns per a unit length than the electromagnet of at least one of the basic rotor and stator units.

At least one (or all) of the counter units may be disposed inside the basic stator unit or, in the alternative, at least one (or all) of the counter units may be interposed between two of multiple basic rotor units radially or angularly. At least one (or all) of the counter units may be disposed outside the basic stator unit or, alternatively, at least one (or all) of the counter units may be interposed between two of multiple basic stator units radially or angularly.

The counter unit may be the permanent magnet which may define at least two magnetic poles one of which may be arranged in the orientation, two of which may be arranged in the orientation or all of which may be arranged in the orientation. Multiple counter units may be the permanent magnets at least two of which may couple with each other magnetically and may define the poles accordingly or, in the alternative, may be the permanent magnets which may individually define the magnetic poles thereon. The basic stator unit may be the permanent magnet, while the counter unit may be another permanent magnet disposed radially or concentrically and outside (or inside) such a basic stator unit. Multiple counter units may be the electromagnets at least two of which may electrically couple to each other in a series mode, parallel mode, or hybrid mode directly or indirectly or, in the alternative, may be electromagnets which may individually receive the energy. The counter unit may be the electromagnet and include at least one insert which may include at least one ferromagnetic or paramagnetic material therein. Multiple counter units may be disposed concentrically and radially aligned (or misaligned), may be disposed angularly at an identical distance, similar distances or different distances from a center of the basic stator unit. The counter unit and wave source may be the electromagnets which electrically couple with each other in a series mode, in a parallel mode, or in a hybrid mode directly or indirectly or, alternatively, may be electromagnets which may individually receive the energy.

The counter unit may be misaligned from the line connecting such basic rotor and stator units. The counter unit may be disposed between two of multiple basic rotor units, between two of multiple basic stator units, between the basic rotor and stator units, and so on. The counter unit may enclose therein at least a portion of the basic rotor and/or stator units. The counter unit may also be disposed between a gap formed angularly between two basic rotor or stator units. The counter rotor unit may be disposed closer to the basic stator unit when the magnetic pole opposing the magnetic pole of the rotor unit may cooperate with the basic stator unit for adding the portion to the force, may be disposed farther away from the basic stator unit as the magnetic pole opposing the magnetic pole of the rotor unit may adversely affect the capability of generating the force.

Such a system may control the supply of electric voltage to the basic rotor and stator units for manipulating magnitudes of the force and may control supply of the electric current to the basic rotor and stator units for manipulating the amplitudes and/or direction of such harmful waves. The system may further control the supply of electric voltage to the counter unit for manipulating its contribution to generating the force and may control supply of the electric current to the counter unit for manipulating the amplitudes and/or direction of the counter waves.

The system may have multiple basic rotor units arranged in a preset disposition, where at least one of such counter units may be incorporated for each of the basic rotor units in another disposition which may be similar to the preset disposition, where one of such counter units may be incorporated for at least two of the basic rotor units, where multiple counter units may also be incorporated for one of the basic rotor units, and the like. The system may include multiple stator rotor units arranged in a preset disposition, where at least one of the counter units may be incorporated for each of the basic stator units in a different disposition which may be similar to the preset disposition, where one of the counter units may be incorporated for at least two of such basic stator units, where multiple counter units may also be incorporated for one of the basic stator units, and the like. The system may have at least one of the counter units as well as at least one of the electric and magnetic shields. At least one of the electric and magnetic shields may be disposed around (inside or outside) the counter unit, may be incorporated into the counter unit, and the like.

The system may be a modification of a conventional DC motor, a conventional universal motor, a conventional synchronous AC motor, a conventional induction AC motor, a conventional stepping or stepper motor, a conventional linear motor, a conventional switch reluctance motors, a conventional brushless DC motor, a conventional torque motor, a conventional servo motor, a conventional coreless DC motor, and a conventional printed circuit motor, where the modification may be incorporation of at least one of the counter units for suppressing the harmful waves and/or emitting such counter waves capable of canceling the portion of the harmful waves. Such a system may be a novel assembly of at least one of the counter units and at least one of the basic rotor unit and basic stator unit, where the counter unit may be used as one of the counter stator unit and counter rotor unit, respectively. Such a system may instead be a novel assembly of at least two of such counter units at least one of which may be one of the counter rotor units, while at least another of which may then be one of the counter stator units. The system may be another novel assembly of at least two of the counter units and at least one of the basic rotor and stator units, where at least two of the counter units may be used as one of the counter rotor units and counter stator units, while the assembly may then have one of the basic stator unit and basic rotor unit, respectively.

In another aspect of the present invention, a method may be provided for minimizing harmful waves irradiated from an electric motor system by canceling a desired portion thereof, where such a system generates electromotive force using an electric energy and includes at least one basic rotor unit and at least one basic stator unit at least one of which is a source of the harmful waves, where the basic rotor and stator units are such standard basic units.

In one exemplary embodiment of this aspect of the invention, a method may include the steps of: irradiating the harmful waves by the wave source; aligning at least one counter unit with the wave source in a preset relation; and emitting by the counter unit counter waves capable of canceling such a portion of the harmful waves at least partially due to such a relation, thereby minimizing the harmful waves. The above emitting may be replaced by the steps of: aligning the counter unit with the basic rotor and/or stator units which is not the above wave source in another preset relation; emitting by the counter unit counter waves capable of canceling the portion of such harmful waves at least partially due to the relation, thereby minimizing the harmful waves; and cooperating the counter unit with such basic rotor and/or stator units, thereby adding at least a portion to the force during the irradiating.

In another exemplary embodiment of this aspect of the invention, such a method may include the steps of: aligning at least one counter unit with the basic units; forming at least one magnetic pole in the basic rotor unit; irradiating the harmful waves by angularly rotating the basic rotor unit; defining at least one like magnetic pole in the counter unit; mechanically coupling the counter unit with the basic rotor unit while opposing the pole of the basic rotor unit with the like pole of the counter unit; and then angularly moving the counter unit with the basic rotor unit while maintaining the coupling, where such steps from such forming to moving will now be referred to as the "first steps" hereinafter. Thus, the counter unit may emit counter waves capable of canceling the portion of such harmful waves during such moving for such minimizing. The first steps may then be replaced by the steps of: supplying the energy to the basic rotor unit, thereby forming at least one magnetic pole while irradiating the harmful waves; supplying the energy to the counter unit, thereby forming thereon at least one like magnetic pole; mechanically coupling the counter unit with the basic rotor unit while opposing the magnetic pole of the basic rotor unit by the like magnetic pole of the counter unit; and angularly moving the counter unit with the basic rotor unit while maintaining the coupling, where the steps from such supplying to moving will be referred to as the "second steps" hereinafter. Accordingly, the counter unit may emit counter waves capable of canceling such a portion of the harmful waves during such supplyings for such minimizing. The above first steps may also be replaced by the steps of: supplying such energy to the basic stator unit, thereby forming at least one magnetic pole while irradiating the harmful waves; supplying the energy to the counter unit, thereby forming at least one like magnetic pole; and opposing the magnetic pole of the basic stator unit by the like magnetic pole of the counter unit, where the steps from such supplying to opposing will be referred to as the "third steps" hereinafter. Accordingly, the counter unit may emit counter waves capable of canceling the portion of such harmful waves during the supplyings for the minimizing.

In another exemplary embodiment of this aspect of the invention, such a method may include the steps of: providing the system with multiple wave sources; irradiating the harmful waves by each wave source; providing such multiple counter units; aligning each counter unit in a preset relation with each wave source; and emitting by each of the counter units counter waves aligned with the harmful waves at least partially due to the relation and capable of canceling the portion of the harmful waves irradiated by each of the wave sources, thereby minimizing the harmful waves.

In another exemplary embodiment of this aspect of the invention, such a method may include the steps of: providing the system with multiple wave sources; irradiating the harmful waves by each of the wave sources; aligning at least one counter unit with at least two of such wave sources in at least two preset relations; and emitting by the counter unit counter waves aligned with such harmful waves at least partially due to the relations and capable of canceling the portion of the harmful waves irradiated by such at least two wave sources, thereby minimizing the harmful waves. Such aligning and emitting may be replaced by the steps of: aligning at least one of multiple counter units to at least two of the wave sources in a preset relation; and emitting from such at least one of the counter units counter waves aligned with the harmful waves at least partially due to the relation and also capable of canceling the portion of the harmful waves irradiated by such at least two of the wave sources, thereby minimizing the harmful waves.

In another exemplary embodiment of this aspect of the invention, such a method may include the steps of: aligning at least one counter unit with the basic units in a preset relation; irradiating the harmful waves by the basic rotor unit; opposing at least one magnetic pole of the basic rotor unit by at least one like magnetic pole of the counter unit; angularly rotating the counter unit with the basic rotor unit while emitting by the counter unit counter waves capable of canceling the portion of the harmful waves for the minimizing; and cooperating the counter unit with the basic stator unit during the above rotating, thereby adding at least a portion to the force. The method may instead include the steps of: aligning at least one counter unit with the basic units in a preset relation; irradiating the harmful waves by the basic stator unit; disposing at least one counter unit in a preset stationary relation to the basic stator unit; opposing at least one magnetic pole of the basic stator unit by at least one like magnetic pole of the counter unit, thereby emitting from the counter unit the counter waves which are capable of canceling the portion of the harmful waves for the minimizing; and cooperating the counter unit with the basic rotor unit during the opposing, thereby adding at least a portion to the force.

In another aspect of the present invention, a method may be provided for minimizing harmful waves irradiated by an electric motor system by suppressing the harmful waves closer to a source of the waves, where the system generates electromotive force using an electric energy and includes at least one basic rotor unit and at least one basic stator unit at least one of which may be the wave source, and where the basic rotor and stator units are such standard basic units.

In one exemplary embodiment of this aspect of the invention, a method may include the steps irradiating such harmful waves by the wave source; disposing at least one counter unit close to the wave source; and opposing at least one magnetic pole of the source by at least one like magnetic pole of the counter unit, thereby suppressing such harmful waves closer to the wave source during such irradiating. Such disposing and opposing may be replaced by the steps of: disposing one end of the counter unit close to the wave source; opposing at least one magnetic pole of the wave source by at least one like magnetic pole of the counter unit, thereby suppressing the harmful waves closer to the wave source during the irradiating; disposing an opposing end of the counter unit close to the basic rotor or stator units which is not the above wave source; and cooperating the opposing end of such a counter unit with such one of the basic rotor and stator units, thereby adding at least a portion to the force during the irradiating.

In another exemplary embodiment of this aspect of the invention, such a method may include the steps of: disposing at least one counter unit close to the wave source; and then opposing at least one magnetic pole of the wave source by at least one like magnetic pole of the counter unit, thereby suppressing the harmful waves closer to the wave source. The disposing and opposing may also be replaced by the steps of: forming at least one magnetic pole in one end the wave source by including a permanent magnet (or electromagnet); forming at least another magnetic pole in one end of at least one counter unit by including a permanent magnet (or electromagnet); and then opposing at least one magnetic pole of the wave source by at least one like magnetic pole of such a counter unit, thereby suppressing such harmful waves closer to the wave source. The method may optionally include the first steps, thereby suppressing the harmful waves during the moving for the minimizing, include the second steps, thereby suppressing such harmful waves during the supplyings for the minimizing, or include the third steps, thereby suppressing the harmful waves during the above supplyings for the minimizing.

In another exemplary embodiment of this aspect of the invention, such a method may include the steps of: disposing at least one counter unit close to such a wave source; opposing at least one magnetic pole of the wave source by at least one like magnetic pole of such a counter unit, thereby suppressing the harmful waves closer to the wave source; and cooperating at least another magnetic pole of the counter unit with the basic rotor or stator unit which is not the above wave source during the suppressing, thereby adding at least a portion to the force. Alternatively, the method may include the steps of: forming at least one magnetic pole in one end the wave source by including a permanent magnet (or electromagnet); forming at least another magnetic pole in one end of at least one counter unit by including a permanent magnet (or electromagnet); opposing at least one magnetic pole of the wave source by at least one like magnetic pole of the counter unit, thereby suppressing the harmful waves closer to the wave source; and cooperating at least another magnetic pole of the counter unit with the basic rotor unit or basic stator unit which is not the wave source during such suppressing, thereby adding at least a portion to such force. Either method may optionally include such first steps, thereby suppressing the harmful waves during the moving for the minimizing and adding the portion to the force, include the second steps, thereby suppressing the harmful waves during such supplyings for the minimizing while adding the portion to the force, and/or the third steps, thereby suppressing the harmful waves during such supplyings for the minimizing while adding the portion to the force.

In another exemplary embodiment of this aspect of the invention, such a method may include the steps of: aligning at least one counter unit with the basic rotor unit; mechanically coupling such a counter unit with the basic rotor unit; rotating the basic rotor unit with the counter unit while irradiating the harmful waves by the basic rotor unit; and opposing a preset number of magnetic poles of such a basic rotor unit by another number of like magnetic poles of the counter unit, where such an another number is equal to, greater than or less than the preset number, thereby suppressing such harmful waves during the rotating for the minimizing.

In another exemplary embodiment of this aspect of the invention, such a method may include the steps of: aligning at least one counter unit with the basic stator unit; disposing such a counter unit close to the basic stator unit while irradiating the harmful waves by the basic stator unit; and opposing a preset number of magnetic poles of the basic stator unit by another number of like magnetic poles of the counter unit, where the another number is equal to, greater than or less than the number, thereby suppressing the harmful waves during the irradiating for the minimizing.

In another aspect of the present invention, a method may be provided for minimizing harmful waves irradiated by an electric motor system which generates electromotive force using an electric energy and also includes at least one basic rotor unit and at least one basic stator unit at least one of which is the wave source, where the basic rotor and stator units are such standard basic units.

In one exemplary embodiment of this aspect of the invention, a method may include the steps of: irradiating the harmful waves by the wave source; enclosing at least a portion of the wave source with at least one counter unit; and emitting by the counter unit counter waves capable of canceling the portion of the harmful waves at least partially due to the enclosing for the minimizing. The emitting may be replaced by the steps of: aligning the counter unit with the basic rotor unit or basic stator unit which is not the above wave source in another preset relation; emitting by the counter unit counter waves capable of canceling the portion of the harmful waves at least partially due to the enclosing for the minimizing; and cooperating the counter unit with the basic rotor or stator units, thereby adding at least a portion to the force during the irradiating. Such emitting may also be replaced by the steps of: opposing at least one magnetic pole of the wave source by at least one like magnetic pole of such a counter unit, thereby suppressing the harmful waves closer to the wave source during the enclosing for the minimizing. The emitting may be replaced by the steps of: opposing at least one magnetic pole of the wave source by at least one like magnetic pole of the counter unit, thereby suppressing such harmful waves closer to the wave source during the above enclosing for the minimizing; disposing an opposing end of the counter unit close to one of the basic rotor and stator units which is not the wave source; and cooperating the opposing end of the counter unit with the basic rotor unit or basic stator unit, thereby adding at least a portion to the force during the enclosing.

In another exemplary embodiment of this aspect of the invention, such a method may include the steps of: irradiating the harmful waves from the basic rotor unit; enclosing at least a portion of the basic rotor unit with at least one counter unit; mechanically coupling the counter unit with the basic rotor unit; rotating the basic rotor unit with the counter unit while irradiating the harmful waves by the basic rotor unit; and emitting by the counter unit counter waves capable of canceling a desired portion of the harmful waves at least partially due to the enclosing during the rotating for the minimizing.

In another exemplary embodiment of this aspect of the invention, such a method may include the steps of: enclosing at least a portion of the wave source with at least one counter unit; supplying the energy to the wave source, thereby irradiating such harmful waves from the wave source; and emitting by the counter unit counter waves which are capable of canceling a desired portion of such harmful waves at least partially due to the enclosing during the supplying for the minimizing.

In another exemplary embodiment of this aspect of the invention, such a method may include the steps of: irradiating the harmful waves by the wave source; enclosing at least a portion of such a wave source with at least one counter unit; emitting from the counter unit counter waves capable of canceling a desired portion of such harmful waves at least partially due to such enclosing during the irradiating for the minimizing; and cooperating the counter unit with the basic rotor unit or basic stator unit which is not the above wave source, thereby adding at least a portion to the force during such irradiating. The method may optionally include the first steps, thereby emitting such counter waves during the moving while adding the portion to the force, the second steps, thereby emitting the counter waves during such supplyings while adding the portion to such force, and/or the third steps, thereby emitting the counter waves during the supplyings and adding the portion to the force.

In another exemplary embodiment of this aspect of the invention, such a method may include the steps of: irradiating the harmful waves from the basic rotor unit; enclosing at least a portion of the basic rotor unit with at least one counter unit; mechanically coupling the counter unit with the basic rotor unit; rotating the basic rotor unit with the counter unit while irradiating the harmful waves by the basic rotor unit; and opposing at least one magnetic pole of the basic rotor unit with at least one like magnetic pole of the counter unit for suppressing such harmful waves closer to the basic rotor unit during the rotating for the minimizing.

In another exemplary embodiment of this aspect of the invention, such a method may include the steps of: supplying the wave source with the energy, thereby forming at least one magnetic pole while irradiating the harmful waves; enclosing at least a portion of the wave source with at least one counter unit; supplying the energy to the counter unit, thereby forming at least one like magnetic pole; and opposing the magnetic pole of the basic rotor unit by the like magnetic pole of such a counter unit, thereby suppressing the harmful waves closer to the wave source during such supplyings for the minimizing.

In another exemplary embodiment of this aspect of the invention, such a method may include the steps of: irradiating the harmful waves from the basic rotor unit; enclosing at least a portion of the wave source with at least one counter unit; opposing the magnetic pole of the basic rotor unit by the like magnetic pole of the counter unit, thereby suppressing such harmful waves closer to the wave source during the supplyings for the minimizing; and cooperating the counter unit with the basic rotor unit or basic stator unit which is not the above wave source, thereby adding at least a portion to the force during the irradiating. The method may optionally include the first steps, thereby performing the suppressing while adding at least a portion to the force, include the second steps, thereby performing such suppressing while adding at least a portion to the force, and/or include the third steps, thereby performing the suppressing while adding at least a portion to the force.

In another aspect of the present invention, a method may be provided for minimizing harmful waves irradiated by an electric motor system which generates electromotive force using an electric energy and also includes at least one basic rotor unit and at least one basic stator unit at least one of which is the wave source, where the basic rotor and stator units are such standard basic units.

In one exemplary embodiment of this aspect of the invention, a method may include the steps of: forming at least two magnetic poles on the basic rotor unit as well as on at least one counter unit; mechanically coupling the counter unit to an outside (or an inside) the basic rotor unit while opposing at least one of the poles of the basic rotor unit by at least one like pole of the counter unit; rotating the basic rotor unit with the counter unit, thereby irradiating the harmful waves by the basic rotor unit; and maintaining the above opposing during the rotating, thereby emitting by the counter unit counter waves to cancel a desired portion of the harmful waves and/or suppressing the harmful waves closer to the basic rotor unit for the minimizing.

In another exemplary embodiment of this aspect of the invention, such a method may include the steps of: forming at least two magnetic poles both on the basic rotor unit and on each of multiple counter units; mechanically coupling at least two of the counter units to an outside (or an inside) the basic rotor unit while opposing each of the poles of the basic rotor unit with at least one like pole of the coupled counter units; rotating the basic rotor unit with the counter units, thereby irradiating such harmful waves from the basic rotor unit; and maintaining such opposing during such rotating, thereby emitting from the counter units counter waves capable of canceling a desired portion of the harmful waves and/or suppressing the harmful waves closer to the basic rotor unit for the minimizing.

In another exemplary embodiment of this aspect of the invention, such a method may include the steps of: aligning at least one counter unit with such basic rotor and stator units; mechanically coupling the counter unit with the basic rotor unit to rotate the units together while opposing at least one magnetic pole of the basic rotor unit by at least one like magnetic pole of the counter unit; and maintaining such opposing during the rotating, thereby emitting by the counter units counter waves for canceling a desired portion of the harmful waves and/or suppressing the harmful waves closer to the basic rotor unit for the minimizing.

In another exemplary embodiment of this aspect of the invention, such a method may include the steps of: forming at least two magnetic poles on the basic stator unit and on at least one counter unit; disposing the counter unit outside the basic stator unit while opposing at least one pole of such a basic stator unit by at least one like pole of the counter unit; and maintaining such opposing during the rotating, thereby emitting by the counter units counter waves capable of canceling a desired portion of the harmful waves and/or suppressing the harmful waves closer to the basic rotor unit for such minimizing.

In another exemplary embodiment of this aspect of the invention, such a method may include the steps of: forming at least two magnetic poles both on the basic stator unit and on each of multiple counter units; and disposing the counter units outside the basic stator unit while opposing each pole of the basic stator unit by at least one like pole of at least two of such counter units, thereby emitting from such counter units counter waves capable of canceling a desired portion of the harmful waves and/or suppressing the harmful waves closer to the basic stator unit for the minimizing.

In another aspect of the present invention, a method may be provided for minimizing harmful waves irradiated by an electric motor system which generates electromotive force using an electric energy and also includes at least one basic rotor unit and at least one basic stator unit at least one of which is the wave source, where the system is arranged to add at least a portion to the force during the minimizing and where the basic rotor and stator units are such standard basic units.

In one exemplary embodiment of this aspect of the invention, a method may include the steps of: forming at least two magnetic poles both on the basic stator unit and on at least one counter unit; mechanically coupling the counter unit with an outside (or inside) of the basic stator unit for rotating the basic stator and counter units together; opposing at least one pole of such a basic rotor unit by at least one like pole of the counter unit, thereby suppressing such harmful waves closer to the basic rotor unit and/or emitting by the counter unit counter waves capable of canceling a desired portion of the harmful waves; and cooperating another magnetic pole of the counter unit with the basic stator unit so as to add the portion to the force.

In another exemplary embodiment of this aspect of the invention, such a method may include the steps of: forming at least two magnetic poles on the basic stator unit and on at least one counter unit; disposing the counter unit in an outside (or an inside) of the basic stator unit; opposing at least one pole of the basic stator unit by at least one like pole of the counter unit, thereby suppressing such harmful waves closer to the basic stator unit and/or emitting by the counter unit counter waves for canceling a desired portion of the harmful waves; and then cooperating another magnetic pole of the counter unit with the basic rotor unit so as to add the portion to the force.

In another aspect of the present invention, a method may be provided for minimizing harmful waves irradiated by an electric motor system which generates electromotive force using an electric energy and also includes at least one basic rotor unit and at least one basic stator unit at least one of which is the wave source, where the system is arranged to maintain its capability of generating the force during the minimizing and where the basic rotor and stator units are such standard basic units.

In one exemplary embodiment of this aspect of the invention, a method may include the steps of: forming at least two magnetic poles both on the basic rotor unit and on at least one counter unit; mechanically coupling the counter unit with an outside (or inside) of the basic stator unit for rotating the basic stator and counter units together; opposing at least one pole of the basic rotor unit with at least one like pole of such a counter unit, thereby suppressing the harmful waves closer to the basic rotor unit and/or emitting by the counter unit counter waves capable of canceling a desired portion of the harmful waves; and disposing another magnetic pole of the counter unit away from such a basic stator unit for the maintaining the capability.

In another exemplary embodiment of this aspect of the invention, such a method may include the steps of: forming at least two magnetic poles on the basic stator unit and on at least one counter unit; disposing the counter unit in an outside (or an inside) of the basic stator unit; opposing at least one pole of the basic stator unit by at least one like pole of the counter unit, thereby suppressing the harmful waves closer to the basic stator unit and/or emitting by the counter unit counter waves for canceling a desired portion of the harmful waves; and disposing another magnetic pole of the counter unit away from the basic rotor unit for the maintaining the capability.

In another aspect of the present invention, a method may be provided for minimizing harmful waves irradiated by an electric motor system by canceling a desired portion of such harmful waves by counter waves and/or suppressing the harmful waves closer to a source of the harmful waves, where the system generates electromotive force using an electric energy and includes at least one basic rotor unit and at least one basic stator unit at least one of which is the wave source, where the basic rotor and stator units are such standard basic units.

In one exemplary embodiment of this aspect of the invention, a method may include the steps of: forming at least two magnetic poles on the basic rotor unit and on at least one counter unit; aligning the counter unit with the basic rotor unit; mechanically coupling the counter unit with an outside (or an inside) of the basic stator unit for rotating the basic stator unit and counter unit together; and opposing at least one pole of the basic rotor unit by at least one like pole of the counter unit, thereby emitting by the counter units the counter waves capable of canceling the portion of such harmful waves and/or suppressing the harmful waves closer to the basic rotor unit.

In another exemplary embodiment of this aspect of the invention, such a method may include the steps of: forming at least two magnetic poles on the basic stator unit, on basic rotor units, and on each of multiple counter units; aligning the counter units to the basic rotor unit; mechanically coupling the counter units in an outside (or an inside) of the basic stator unit for rotating the basic stator units and counter units together; and opposing at least two poles of the basic rotor unit with at least one like pole of at least one of the counter units, thereby suppressing the harmful waves closer to such a basic rotor unit and/or emitting the counter waves for canceling the portion of the harmful waves.

In another exemplary embodiment of this aspect of the invention, such a method may include the steps of: forming at least two magnetic poles on each of first multiple counter units and on each of second multiple the basic rotor units, where the second multiple is equal to, greater than or less than a twice of the first plurality; aligning each of the counter units with at least one of the basic rotor units; mechanically coupling the counter units to an outside (or inside) of at least one of the basic rotor units for rotating the units together; and opposing at least one pole of each of the basic rotor units with at least one like pole of at least one of the counter units, thereby suppressing the harmful waves closer to the basic rotor unit and/or emitting with the counter units the counter waves capable of canceling the portion of the harmful waves.

In another exemplary embodiment of this aspect of the invention, such a method may include the steps of: forming at least two magnetic poles on at least one counter stator unit and on at least one counter rotor unit; disposing the counter stator unit in an outside (or an inside) of the basic stator unit; disposing the counter rotor unit between the basic and counter stator units; aligning the counter rotor unit with the basic rotor unit; mechanically coupling the counter rotor unit into an outside (or an inside) of the basic rotor unit for rotating the basic rotor unit and counter rotor unit together inside the basic stator unit; and opposing at least one pole of the basic rotor unit by at least one like pole of the counter rotor unit, thereby emitting by the counter rotor unit the counter waves capable of canceling the portion of the harmful waves and/or suppressing the harmful waves closer to the basic rotor unit.

In another exemplary embodiment of this aspect of the invention, such a method may include the steps of: forming at least two magnetic poles on at least one counter stator unit; disposing such a counter stator unit into an outside (or an inside) of the basic stator unit; movably disposing at least one counter rotor unit forming at least two magnetic poles thereon in an inside (or an outside) of the basic (or counter) stator unit; mechanically coupling the counter rotor unit to an outside (or an inside) of the basic rotor unit for rotating the basic rotor unit and counter rotor unit together; and opposing at least one pole of the basic rotor unit by at least one like pole of the counter rotor unit, thereby suppressing the harmful waves closer to the basic rotor unit and/or emitting by the counter rotor (or stator) unit counter waves capable of canceling the portion of the harmful waves.

In another exemplary embodiment of this aspect of the invention, such a method may include the steps of: forming at least two magnetic poles on at least one counter stator unit; disposing such a counter stator unit into an outside (or inside) of the basic stator unit; movably disposing first multiple counter rotor units each forming at least two magnetic poles thereon in an outside (or inside) of the basic (or counter) stator units; providing second multiple basic rotor units where the second multiple is equal to, greater than or less than a twice of the first plurality; mechanically coupling the counter rotor units into an outside (or an inside) of the basic rotor units for rotating the basic rotor unit and counter rotor unit together; and opposing at least one pole of each of the basic rotor units by at least one like pole of at least one of the counter rotor units, thereby emitting from the counter rotor (or stator) unit counter waves capable of canceling the portion of the harmful waves and/or suppressing the harmful waves closer to the basic rotor unit.

In another exemplary embodiment of this aspect of the invention, such a method may include the steps of: forming at least two magnetic poles on at least one counter stator unit; disposing such a counter stator unit into an outside (or an inside) of the basic stator unit; movably disposing at least one counter rotor unit forming at least two magnetic poles thereon; disposing multiple the basic rotor units between the basic and counter stator units; mechanically coupling the counter rotor unit to an outside (or inside) of the basic rotor units for rotating the basic rotor unit and counter rotor unit together; and opposing at least one pole of each of the basic rotor units by at least one like pole of at least one of the counter rotor unit, thereby suppressing the harmful waves closer to the basic rotor units and/or emitting by the counter rotor (or stator) unit counter waves capable of canceling the portion of such harmful waves.

In another aspect of the present invention, a method may be provided for minimizing harmful waves irradiated by a DC motor system through canceling a desired portion of the harmful waves by counter waves and/or suppressing the harmful waves closer to a source of such harmful waves, where the system generates electromotive force using an electric energy and includes at least one basic rotor unit and at least one basic stator unit at least one of which is the wave source, where the basic rotor and stator units are such standard basic units.

In one exemplary embodiment of this aspect of the invention, a method may include the steps of: including at least one electromagnet in at least one counter rotor unit; aligning the counter rotor unit with the basic rotor unit while defining at least two magnetic poles on each of the counter and basic rotor units; disposing such a counter rotor unit inside the basic stator unit; mechanically coupling the counter and basic rotor units for rotating together; and opposing at least one pole of the basic rotor unit by at least one like pole of the counter rotor unit, thereby performing the above canceling and/or suppressing for the minimizing, where such steps is now to be referred to as the "first rotor steps" hereinafter.

In another exemplary embodiment of this aspect of the invention, such a method may include the steps of: including at least one electromagnet in each of multiple counter rotor units; aligning each of the counter rotor units with the basic rotor unit while defining at least two magnetic poles on each of the counter rotor units; disposing the counter rotor units inside the basic stator unit; mechanically coupling the counter and basic rotor units for rotating together; and opposing such poles of the basic rotor unit by like poles of at least two of the counter rotor units, thereby performing the emitting and/or suppressing for the minimizing, where such steps will now be referred to as the "second rotor steps" hereinafter.

In another exemplary embodiment of this aspect of the invention, such a method may include the steps of: including at least one electromagnet in each of multiple counter rotor units; aligning each of the counter rotor units with the basic rotor unit while defining at least two magnetic poles on each of the counter rotor units; disposing the counter rotor units inside the basic stator unit; mechanically coupling the counter and basic rotor units for rotating together; and opposing each of the poles of the basic rotor unit with at least one like poles of the counter rotor units, thereby performing the emitting and/or suppressing for the minimizing, where such steps will be referred to as the "third rotor steps" hereinafter.

In another exemplary embodiment of this aspect of the invention, such a method may include the steps of: including at least one electromagnet in each of first multiple counter rotor units; providing second multiple the basic rotor units, where the second multiple is equal to, greater than or less than the first multiple; aligning each of the counter rotor units to at least one of the basic rotor units while forming at least two magnetic poles on each of the counter rotor units; disposing such a counter rotor units outside the basic stator unit; mechanically coupling each of the counter rotor units with at least one of the basic rotor unit for rotating together; and opposing each of the poles of the basic rotor units by at least one like poles of at least two of the counter rotor units, thereby performing the suppressing and/or emitting for the minimizing, where such steps is now be referred to as the "fourth rotor steps" hereinafter.

In another exemplary embodiment of this aspect of the invention, such a method may include the steps of: including at least one permanent magnet into at least one counter stator unit; forming at least two magnetic poles on the counter stator unit; disposing the counter stator unit outside the basic stator unit; and then opposing at least one pole of the basic stator unit with at least one like pole of the counter stator unit, thereby performing the canceling and/or suppressing for such minimizing, where such steps will be referred to as the "first stator steps" hereinafter.

In another exemplary embodiment of this aspect of the invention, such a method may include the steps of: including at least one permanent magnet in first multiple counter stator units; forming at least two magnetic poles on each of the counter stator units; providing second multiple basic stator units, where the second multiple is equal to, greater than or less than the first multiple; disposing the counter stator units outside the basic stator units while aligning each of the counter stator units with at least one of the basic stator units; and opposing all of such poles of such basic stator units by like poles of at least two of the counter stator units, thereby performing the canceling and/or suppressing for the minimizing, where such steps will be referred to as the "second stator steps" hereinafter.

In another aspect of the present invention, a method may be provided for minimizing harmful waves irradiated by an universal motor system by canceling a desired portion of the harmful waves by counter waves and/or suppressing the harmful waves closer to a source of the harmful waves, where the system generates electromotive force using an electric energy and includes at least one basic rotor unit and at least one basic stator unit at least one of which is the wave source, where the basic rotor and stator units are such standard basic units.

In one exemplary embodiment of this aspect of the invention, a method may include the steps of the first rotor steps. In another exemplary embodiment of the same aspect of the invention, such a method may include the steps of the second rotor steps. In another exemplary embodiment of such an aspect of the invention, a method may also include the steps of the third rotor steps. In yet another exemplary embodiment of the same aspect of the invention, a method may also include the steps of the fourth rotor steps.

In another exemplary embodiment of this aspect of the invention, such a method may include the steps of: including at least one electromagnet in at least one counter stator unit; forming at least two magnetic poles on the counter stator unit; disposing the counter stator unit outside such a basic stator unit; and opposing at least one pole of the basic stator unit with at least one like pole of such a counter stator unit, thereby performing the canceling and/or suppressing for such minimizing, where such steps will be referred to as the "third stator steps" hereinafter.

In another exemplary embodiment of this aspect of the invention, such a method may include the steps of: including at least one electromagnet in first multiple counter stator units; forming at least two magnetic poles on each of the counter stator units; providing second multiple basic stator units, where the second multiple is equal to, greater than or less than the first multiple; disposing the counter stator units outside the basic stator units while aligning each counter stator unit to at least one of the basic stator units; and opposing all of the poles of the basic stator units by like poles of at least two of the counter stator units, thereby performing the canceling the harmful waves and/or suppressing the harmful waves for such minimizing, where such steps will be referred to as the "fourth stator steps" hereinafter.

In another aspect of the present invention, a method may be provided for minimizing harmful waves irradiated by a synchronous motor system through canceling a desired portion of the harmful waves with counter waves and/or suppressing the harmful waves closer to a source of the harmful waves, where the system generates electromotive force using an AC electric energy and includes at least one basic rotor unit and at least one basic stator unit at least one of which is the wave source, where the basic rotor and stator units are such standard basic units.

In one exemplary embodiment of this aspect of the invention, a method may include the steps of: including at least one permanent magnet in at least one counter rotor unit; aligning the counter rotor unit to the basic rotor unit while forming at least two magnetic poles on each of the counter rotor unit and basic rotor units; disposing the counter rotor unit in the basic stator unit; mechanically coupling the counter and basic rotor units for rotating together; and opposing at least one pole of the basic rotor unit by at least one like pole of the counter rotor unit, thereby performing at least one of the canceling and suppressing for the minimizing.

In another exemplary embodiment of this aspect of the invention, such a method may include the steps of: including at least one permanent magnet in each of multiple counter rotor units; aligning each of the counter rotor units with the basic rotor unit while defining at least two magnetic poles on each of the counter rotor units; disposing the counter rotor units in the basic stator unit; mechanically coupling the counter and basic rotor units for rotating together; and opposing all of the poles of the basic rotor unit by like poles of at least two of the counter rotor units, thereby performing suppressing and/or emitting for the minimizing.

In another exemplary embodiment of this aspect of the invention, such a method may include the steps of: including at least one permanent magnet in each of multiple counter rotor units; aligning each counter rotor unit with the basic rotor unit while defining at least two magnetic poles on each of the counter rotor units; disposing the counter rotor units outside the basic stator unit; mechanically coupling the counter and basic rotor units for rotating together outside the basic stator unit; and then opposing all of the poles of the basic rotor unit with like poles of at least two of the counter rotor units, thereby performing the emitting and/or suppressing for the minimizing.

In another exemplary embodiment of this aspect of the invention, such a method may include the steps of: including at least one permanent magnet into each of first multiple counter rotor units; providing second multiple the basic rotor units, where the second multiple is equal to, greater than or less than the first multiple; aligning each of the counter rotor units with at least one of the basic rotor units while forming at least two magnetic poles on each counter rotor unit; disposing the counter rotor units outside the basic stator unit; mechanically coupling each of the counter rotor units with at least one of the basic rotor units for rotating together; and opposing the poles of the basic rotor units by like poles of at least two of the counter rotor units, thereby performing the emitting and/or suppressing for the minimizing.

In another exemplary embodiment of this aspect of the invention, such a method may include the steps of the third stator steps. In another exemplary embodiment of this aspect of the invention, such a method may include the fourth stator steps.

In another aspect of the present invention, a method may be provided for minimizing harmful waves irradiated by an induction motor system by canceling a desired portion of the harmful waves by counter waves and/or suppressing the harmful waves closer to a source of the harmful waves, where the system generates electromotive force using an AC electric energy and includes at least one basic rotor unit and at least one basic stator unit at least one of which is the wave source, where the basic rotor unit is arranged to be primarily made of at least one electric conductor and where the basic rotor and stator units are such standard basic units.

In one exemplary embodiment of this aspect of the invention, a method may include the steps of the first rotor steps. In another exemplary embodiment of the same aspect of the invention, such a method may include the second rotor steps. In another exemplary embodiment of this aspect of the invention, a method may include the third rotor steps. In another exemplary embodiment of this aspect of the invention, such a method may include the fourth rotor steps. In another exemplary embodiment of this aspect of the invention, a method may include the steps of the third stator steps. In yet another exemplary embodiment of the same aspect of the invention, such a method may include the steps of the fourth stator steps.

Embodiments of such method aspects of the present invention may include one or more of the following features, and configurational and/or operational variations and/or modifications of the above methods also fall within the scope of the present invention.

The minimizing may include at least one of the steps of: decreasing amplitudes of the harmful waves regardless of frequency ranges thereof; removing only a portion of the harmful waves within a preset frequency range; and retaining at least a portion of the harmful waves within another preset frequency range. The minimizing may include at least one the steps of: canceling the harmful waves to a preset extent near (or on) the wave source; canceling the harmful waves to the preset extent at a preset distance from the wave source; suppressing such harmful waves closer toward the wave source; containing the harmful waves near the wave source; and deflecting the harmful waves away from an user of the system.

The irradiating or emitting the harmful waves may include at least one of the steps of: rotating the basic rotor and/or stator unit with the permanent magnet; rotating the basic rotor and/or stator unit with the electromagnet; supplying the energy to the basic rotor unit and/or stator unit including such an electromagnet, and the like. The irradiating or emitting the harmful waves may include at least one of the steps of: propagating the harmful waves oscillating in constant directions while changing their amplitudes; and propagating the harmful waves along time-varying directions based on the rotating the basic and/or counter rotor units.

The providing the wave sources may also include at least one of the steps of: disposing the wave sources in an angular arrangement; disposing the wave sources in a concentric arrangement; disposing the wave sources symmetrically (or asymmetrically), and the like. Such providing may be followed by one of the steps of: including at least one counter unit for each of such wave sources; including only one counter unit for at least two of such wave sources; including first multiple counter units for second multiple wave sources where the first and second multiples are different numbers.

The aligning may include at least one of the steps of: disposing the counter unit on a preset line connecting the basic rotor and stator units; disposing the counter unit in a radial direction which points straight and outward from a center of the system; disposing the counter unit between the basic rotor and stator units, and the like. The aligning may also include at least one of the steps of: misaligning the counter unit off from a line which connects the basic rotor and stator units; disposing the counter unit between at least two of the basic rotor units (or basic stator units); and disposing such a counter unit between the basic rotor unit and stator unit. The aligning may also include at least one of the steps of: enclosing at least a portion (or entire portion) of the wave source therein; enclosing at least portions of at least two wave sources, and the like. The aligning may include one of the steps of: arranging the counter unit to define a shape, a size, and/or an arrangement which may conform to those of the basic rotor and/or stator units; arranging the counter unit to have the shape, size, and/or arrangement which may not conform to those of the basic rotor and/or stator units, and the like.

The arranging may include at least one of the steps of: forming such a counter unit to define a bigger, similar or smaller length, width, and/or height than the basic rotor and/or stator units; forming the counter unit to define the shape which may be identical to, similar to or different from ad shape of the basic rotor and/or stator units; and the like. The arranging may include at least one of the steps of: disposing the counter unit in a symmetric (or asymmetric) arrangement with respect to the basic rotor and/or stator units; disposing the counter unit in an angular (or concentric) arrangement relative to the basic rotor and/or stator units, and the like. The arranging may also include at least one of the steps of: forming an outer counter unit to have a profile which is lower than, similar to or higher than that of an inner counter unit; forming the outer counter unit to have an angular length which is similar to, less than or greater than that of the inner counter unit, and the like. The arranging may include one of the steps of: forming only one pole on at least one of the units; forming opposite poles on at least one of the units; forming at least three poles at least two of which may have the same polarity, and the like. The forming may include at least one of the steps of: forming such a pole on one end of at least one of the units; defining the opposite poles on opposite ends of at least one of the units; defining the pole on both ends of a body having a curvilinear shape; defining the pole on a side of the body; defining such opposite poles on opposite sides of the body, and the like. The forming may include at least one of the steps of: defining a single pole on at least one of the units; defining the opposite poles on at least one of the units; and defining at least three of the poles at least two of which may have the same polarity.

Such coupling may include at least one of the steps of: fabricating the basic and counter rotor units as an unitary article; fixedly coupling the counter rotor unit with the basic rotor unit; releasably coupling the counter rotor unit with the basic rotor unit; coupling the counter rotor unit with the basic rotor unit side by side; coupling the counter rotor unit between two of the basic rotor units; coupling the counter rotor unit to the basic rotor unit concentrically, and the like. The coupling may include one of the steps of: disposing the counter rotor unit flush with the basic rotor unit; disposing the counter unit to protrude above the basic rotor unit; and disposing the counter unit to have a lower profile than the basic rotor unit.

The opposing may include at least one of the steps of: disposing the like poles face to face or in parallel at a preset distance; disposing the like poles at a preset angle; and the like. The opposing may include at least one of the steps of: arranging the pole of the counter unit to have a larger, similar or smaller area than the like pole of at least one of the basic units; arranging the pole of the counter unit to enclose at least a (or an entire) portion of the like pole of at least one of the basic units therein; disposing one of the counter and basic units having greater (or less) amplitudes closer to (or farther from) a center of the system, and the like.

The supplying may include at least one of the steps of: providing electric current thereto; and applying electric voltage thereacross. Such supplying may also include at least one of the steps of: providing an AC or DC current to the basic rotor unit including the electromagnet; providing such AC current to the basic stator unit having the electromagnet, and the like. Such supplying may include at least one of the steps of: providing the energy to at least two of the units sequentially; providing the energy to at least two of the units simultaneously, and the like.

The emitting or irradiating the counter waves may include at least one of the steps of: rotating the counter unit including the permanent magnet; rotating the counter unit including the electromagnet; supplying the energy to the counter unit including the electromagnet, and the like. The emitting and/or irradiating the counter waves may further include at least one of the steps of: propagating the counter waves oscillating in constant directions while changing their amplitudes; and propagating the counter waves in time-varying directions based upon the rotating the basic and/or counter rotor units. Such emitting or irradiating the counter waves may further include at least one of the steps of: maintaining the amplitudes and/or directions thereof; and changing the amplitudes and/or directions thereof based on the signals and/or harmful waves.

Such canceling may include at least one of the steps of: manipulating the phase angles of the counter waves to reduce the amplitudes of the harmful waves; manipulating the phase angles as well as the amplitudes of the counter waves to offset the portion of the harmful and so on. The canceling may include one of the steps of: performing the above canceling regardless of the frequencies of the harmful waves; performing the canceling based on a preset frequency or a range of the frequencies of the harmful waves, and the like.

The suppressing may include at least one of the steps of: repelling the harmful waves back to the wave source; and attracting the harmful waves by the counter unit. The suppressing may include at least one of the steps of: containing the harmful waves within a preset distance from the system; containing the harmful waves mainly near (or toward) a center of the system; containing the harmful waves around the wave source, and the like.

The generating the force may include at least one of the steps of: angularly rotating a shaft to which the basic rotor may be coupled by the force; linearly translating a track to which at least one of the basic units is coupled by the force, and the like. The generating the force may include the step of: manipulating magnitudes of the force with the electric voltage of the energy. Such cooperating may include the steps of: disposing such a basic stator unit between the basic rotor unit and counter rotor unit; and arranging the like poles of the basic and counter rotor units to interact with the like pole of the basic stator unit, thereby keeping at least a similar dimension of a conventional electric motor including a stator unit similar to the basic stator unit and a rotor unit with a dimension at least similar to a sum of dimensions of the basic and counter rotor units while irradiating the harmful waves.

The method may further include the step of: incorporating at least one electric shield which is electrically conductive and also capable of absorbing electric waves of such harmful waves for the minimizing. The method may further include the step of: incorporating at least one magnetic shield which is magnetically permeable and capable of absorbing and rerouting therealong magnetic waves of the harmful waves for the minimizing. The rerouting may be followed by the steps of: magnetically coupling at least one permanent magnet (or electromagnet) with the magnetic shield; and terminating the magnetic waves by at least one pole of the permanent magnet (or electromagnet). The terminating may then be followed by the steps of: disposing a magnetically permeable shunt on (or around) the permanent magnet (or electromagnet); and containing static and/or dynamic magnetic fields generated by the permanent magnet (or electromagnet) therealong. The method may therefore include the step of: incorporating the electric shield and magnetic shield into at least one position of the system. Such incorporating may include the step of: disposing at least one of the electric and magnetic shields on or around an outermost unit of the basic and counter units.

In another aspect of the present invention, an electric motor system may also be provided for generating electromotive force in response to an electric energy while minimizing irradiation of harmful waves irradiated by at least one wave source including at least one of a basic rotor unit and a basic stator unit thereof by canceling a desired portion of the harmful waves by counter waves, where the basic rotor and stator units are such standard basic units.

In one exemplary embodiment of this aspect of the invention, such a system may be made by a process including the steps of: aligning at least one counter unit along a line connecting the basic rotor and stator units; arranging the counter unit to emit such counter waves which are accordingly aligned with the harmful waves; and manipulating the counter waves to cancel such a portion of the harmful waves. In the alternative, the system may be made by a process including the steps of: operatively coupling at least one counter unit to at least one of the basic units; arranging the counter unit to emit the counter waves; and manipulate at least one of amplitudes and phase angles of the counter waves to cancel the portion of such harmful waves. In one example for either of such systems, the process may optionally include the steps of: including a permanent magnet (or an electromagnet) in the basic rotor unit; angularly rotating the basic rotor unit inside and around the basic stator unit while irradiating the harmful waves; including another permanent magnet or another electromagnet in the counter unit; mechanically coupling the counter unit with the basic rotor unit while arranging at least one magnetic pole the counter unit to oppose a like magnetic pole of the basic rotor unit; and angularly moving such a counter unit along with the basic rotor unit while keeping the coupling, where these steps will now be referred to as the "first process steps" hereinafter. Accordingly, such a counter unit may emit the counter waves during the moving and minimizing the irradiation. In another example therefor, such a process may optionally have the steps of: including an electromagnet in the basic rotor unit; supplying the energy to such a basic rotor unit in alternating directions, thereby irradiating the harmful waves; including another electromagnet in the counter unit; mechanically coupling the counter unit to the basic rotor unit while arranging at least one magnetic pole the counter unit to oppose a like magnetic pole of the basic rotor unit; and angularly moving the counter unit with the basic rotor unit while supplying to the counter unit the energy defining preset amplitudes and flowing in preset directions, where such steps will be referred to as the "second process steps" hereinafter. Therefore, the counter unit may emit the counter waves in response to the energy and minimizing the irradiation. In another example therefor, the process may optionally include the steps of: including an electromagnet in such a basic stator unit; supplying the energy to the basic stator unit in alternating directions, thereby irradiating the harmful waves; including another electromagnet in the counter unit; arranging at least one magnetic pole of the counter unit based upon a preset relation to oppose at least one like magnetic pole of the basic stator unit; and supplying to the counter unit the energy defining preset amplitudes and flowing along preset directions, where such steps will be referred to as the "third process steps" hereinafter. Thus, the counter unit may emit the counter waves using the energy and minimizing the irradiation, In another exemplary embodiment of this aspect of the invention, such a system may be made by a process including the steps of: providing the system with multiple the wave sources; operating the system, thereby irradiating the harmful waves by each of the wave sources; aligning each of the plurality of counter units with each of the wave sources along a radial direction pointing straight and outward from a center of the system; arranging each of the counter unit to emit the counter waves which are accordingly aligned with the harmful waves irradiated by each of the wave sources; and emitting by each of the counter units the counter waves which are capable of canceling the portion of the harmful waves irradiated by each of the wave sources.

In another exemplary embodiment of this aspect of the invention, such a system may be made by a process including the steps of: providing the system with multiple wave sources; operating the system, thereby irradiating the harmful waves by each of the wave sources; aligning at least one counter unit with at least two of the wave sources along at least two radial directions pointing straight and outward from a center of the system; arranging the counter unit to emit the counter waves which are therefore aligned with the harmful waves irradiated by the at least two of the wave sources; and emitting by the counter unit the counter waves capable of canceling the portion of the harmful waves irradiated by the at least two of the wave sources. Such a system may be made by another process having the steps of: providing the system with multiple wave sources; operating the system, thereby irradiating the harmful waves by each of the wave sources; aligning at least one of another plurality of counter units to at least two of the wave sources in a radial direction pointing straight and outward from a center of such a system; arranging such at least one of the counter units to emit such counter waves which are therefore aligned with the harmful waves irradiated by the at least two of the wave sources; and emitting from such at least one of the counter units the above counter waves capable of canceling the portion of the harmful waves irradiated by such at least two wave sources.

In another exemplary embodiment of this aspect of the invention, such a system may be made by a process including the steps of: aligning at least one counter unit along a line connecting the basic rotor and stator units; arranging the counter unit to emit such counter waves which are thus aligned with the harmful waves; and manipulating the counter waves for canceling the portion of the harmful waves. The system may instead be made by a process including the steps of: operatively coupling at least one counter unit to at least one of the basic units; arranging the counter unit to emit the counter waves; and manipulating at least one of amplitudes and phase angles of the counter waves to cancel the portion of the harmful waves. Either process may optionally include the steps of: irradiating such harmful waves from the basic rotor unit; arranging at least one magnetic pole of such a counter unit based on a preset relation for opposing at least one like magnetic pole of the basic rotor unit, thereby minimizing the irradiation; arranging at least another magnetic pole of the counter unit in another preset relation for cooperating with at least one magnetic pole of the basic stator unit for the force, thereby adding at least a portion to the force; and arranging the system to maintain such arrangings during its operation. In the alternative, either process may optionally include the steps of: irradiating the harmful waves from the basic stator unit; arranging at least one magnetic pole of the counter unit based on a preset relation to oppose at least one like magnetic pole of the basic stator unit, thereby minimizing the irradiation; arranging at least another magnetic pole of the counter unit in another preset relation for cooperating with at least one magnetic pole of the basic rotor unit for such force, thereby adding at least a portion to the force; and arranging the system to maintain the arrangings during its operation.

In another aspect of the present invention, an electric motor system may also be provided for generating electromotive force in response to an electric energy while minimizing irradiation of harmful waves irradiated by at least one wave source which includes a basic rotor unit and/or a basic stator unit thereof by suppressing the harmful waves closer to the wave source, where the basic rotor and stator units are such standard basic units.

In one exemplary embodiment of this aspect of the invention, such a system may be made by a process including the steps of: disposing at least one counter unit close to such a wave source; and arranging at least one magnetic pole of the counter unit in a preset relation for opposing at least one like magnetic pole of the wave source, thereby suppressing such harmful waves closer to the wave source. The system may instead be made by a process including the steps of: including a permanent magnet or an electromagnet in the wave source; including respectively another permanent magnet or another electromagnet in at least one counter unit; and arranging at least one magnetic pole of such a counter unit based on a preset relation to oppose at least one like magnetic pole of the wave source, thereby suppressing the harmful waves closer to the wave source. Either of the above process may optionally include the first process steps, thereby irradiating the counter waves during the moving and minimizing the irradiation as well as suppressing the harmful waves, may include the second process steps, thereby emitting the counter waves in response to the energy and minimizing the irradiation as well as suppressing the harmful waves, and/or may have the third process steps, thereby irradiating the counter waves as a response to the energy and minimizing the irradiation as well as suppressing the harmful waves.

In another exemplary embodiment of this aspect of the invention, such a system may be made by a process including the steps of: disposing at least one counter unit close to such a wave source; arranging at least one magnetic pole of the counter unit based on a preset relation to oppose at least one like magnetic pole of the wave source, thereby suppressing the harmful waves closer to such a wave source; and arranging at least another magnetic pole of the counter unit based upon another preset relation for cooperating with at least one magnetic pole of such basic rotor and/or stator units which is not the above wave source for the force, thereby suppressing the harmful waves closer to the source as well as adding at least a portion to the force. Such a system may instead be made by another process including the steps of: including a permanent magnet or electromagnet in the wave source; including at least another permanent magnet (or electromagnet) in at least one counter unit; arranging at least one magnetic pole of the counter unit based on a preset relation to oppose at least one like magnetic pole of the wave source, thereby suppressing the harmful waves closer to such a wave source; and arranging at least another magnetic pole of the counter unit based upon another preset relation for cooperating with at least one magnetic pole of such basic rotor and/or stator units which is not the above wave source for the force, thereby suppressing the harmful waves closer to the source as well as adding at least a portion to the force. Either process may optionally include the steps of the first process steps, thereby irradiating the counter waves during the above moving and minimizing the irradiation as well as suppressing the harmful waves while adding at least a portion to the force, may include the second process steps, thereby emitting the counter waves in response to the energy and minimizing the irradiation as well as suppressing the harmful waves while adding at least a portion to the force, and/or may include the third process steps, thereby irradiating the counter waves using such energy and minimizing the irradiation and suppressing such harmful waves while adding at least a portion to the force.

In another exemplary embodiment of this aspect of the invention, such a system may be made by a process including the steps of: providing the system with at least one counter unit; mechanically coupling the counter unit to the basic rotor unit, thereby angularly rotating such a counter unit with the basic rotor unit; and arranging a preset number of magnetic poles of such a counter unit in a preset relation to oppose another number of like magnetic poles of the basic rotor unit, where such another number is equal to, greater than or less than the preset number, thereby suppressing such harmful waves closer to the basic rotor unit.

In another exemplary embodiment of this aspect of the invention, such a system may be made by a process including the steps of: providing the system with at least one counter unit; disposing the counter unit in a preset stationary relation to the basic stator unit; and arranging a preset number of magnetic poles of the counter unit in a preset relation to oppose another number of like magnetic poles of the basic stator unit, where such another number is equal to, greater than or less than the preset number, thereby suppressing the harmful waves closer to the basic rotor unit.

In another aspect of the present invention, another electric motor system may be provided for generating electromotive force using an electric energy while minimizing irradiation of harmful waves irradiated by at least one wave source which includes a basic rotor unit and/or a basic stator unit of the system, where the basic rotor and stator units are such standard basic units.

In one exemplary embodiment of this aspect of the invention, such a system may be made by a process including the steps of: irradiating the harmful waves by the basic rotor unit; enclosing at least a portion of the basic rotor unit with at least one counter unit; mechanically coupling the counter unit to the basic rotor unit, thereby angularly rotating the counter unit with the basic rotor unit; and arranging the counter unit in a preset relation to such a basic rotor unit for emitting counter waves capable of canceling a desired portion of the harmful waves, thereby minimizing the irradiation during the rotating.

In another exemplary embodiment of this aspect of the invention, such a system may be made by a process including the steps of: enclosing at least a portion of the wave source with at least one counter unit; arranging such a counter unit in a preset relation to the wave source for emitting counter waves capable of canceling a desired portion of the harmful waves as the energy is supplied thereto; and then supplying the energy to the wave source and counter unit, thereby minimizing the irradiation during the supplying.

In another exemplary embodiment of this aspect of the invention, such a system may be made by a process including the steps of: enclosing at least a portion of the wave source with at least one counter unit; arranging such a counter unit in a preset relation to the wave source for emitting counter waves capable of canceling a desired portion of the harmful waves; and arranging the counter unit in another preset relation to the basic rotor and/or stator units which is not the above wave source for cooperating therewith for the force. The process may optionally include the first process steps, thereby irradiating the counter waves during such moving while canceling the portion of the harmful waves and adding at least a portion to such force, may include the second process steps, thereby emitting the counter waves using the energy while canceling the portion of such harmful waves and adding at least a portion to the force, and/or may include the third process steps, thereby irradiating the counter waves as a response to the energy while canceling the portion of the harmful waves and adding at least a portion to the force.

In another exemplary embodiment of this aspect of the invention, such a system may be made by a process including the steps of: irradiating the harmful waves from the basic rotor unit; enclosing at least a portion of the basic rotor unit with at least one counter unit; mechanically coupling the above counter unit to the basic rotor unit, thereby angularly rotating the counter unit with the basic rotor unit; and arranging at least one magnetic pole of the counter unit in a preset relation to oppose at least one like magnetic pole of the basic rotor unit for suppressing the harmful waves closer to the basic rotor unit, thereby minimizing the irradiation during the rotating.

In another exemplary embodiment of this aspect of the invention, such a system may be made by a process including the steps of: supplying the energy to the wave source in alternating directions, thereby irradiating the harmful waves; enclosing at least a portion of the wave source by at least one counter unit; arranging at least one magnetic pole of the counter unit in a preset relation to oppose at least one like magnetic pole of the wave source; and supplying the energy to the counter unit while maintaining the arranging, thereby minimizing the irradiation by suppressing the harmful waves closer to the source.

In another exemplary embodiment of this aspect of the invention, such a system may be made by a process including the steps of: enclosing at least a portion of the wave source with at least one counter unit; arranging the counter unit in a preset relation to the wave source for suppressing such harmful waves closer to the wave source; and arranging the counter unit in another preset relation to the basic rotor and/or stator units which is not the above wave source for cooperating therewith for the force. The process may optionally include the above first process steps, thereby suppressing the harmful waves while adding at least a portion to the force, may include such second process steps, thereby suppressing the harmful waves while adding at least a portion to the force, and/or may also include the third process steps, thereby suppressing the harmful waves and adding at least a portion to the force.

More product-by-process claims may be constructed by modifying the foregoing preambles of the apparatus (or system) claims and/or method claims and by appending thereto such bodies of the apparatus (or system) claims and/or method claims. In addition, such process claims may include one or more of such features of the apparatus (or system) claims and/or method claims of this invention.

As used herein, the term "unit" generally and collectively refers to a "basic unit" and/or a "counter unit" of an electro-magnetically-countered electric motor system of the present invention, where such a system will now be abbreviated as the "EMC electric motor system," as the "EMC system" or simply as the "system" hereinafter. This classification is primarily based on an intended function of a specific "unit" or, more specifically, whether such a "unit" is intended to participate in generating electromotive force or only in minimizing the irradiation of the harmful waves. As will be described in greater detail below, the prior art electric motor also includes at least two "basic units" therein such as, e.g., a "basic rotor unit" and a "basic stator unit."

In concurrent with but independently of such a definition, the term "unit" collectively refers to a "rotor unit" and a "stator unit" both of which are present not only in the prior art electric motor but also in the EMC electric motor system. This classification is primarily based upon mobility of the "unit" such that the "rotor unit" represents a mobile part of the prior art motor or the EMC system which rotates or translate as the motor or system generates the electromotive force using electric energy, but that the "stator unit" refers to a stationary part of the prior art motor or the EMC system which does not move while the motor or system generates such force.

As used herein, the term "basic unit" collectively refers to various parts of the prior art electric motor. More specifically, the "basic unit" includes the "basic rotor unit" and "basic stator unit," and such "basic units" generate the electromotive force when the "basic rotor unit" generates an angular rotation or linear translation inside or with respect to the "basic stator unit" in response to dynamic interactions between static and/or dynamic magnetic fields which in turn are generated by one or multiple permanent magnets and/or electromagnets incorporated in the "basic units."

In contrary, the term "counter unit" collectively refers only to selected parts of the EMC electric motor system. More specifically, the "counter unit" includes the "counter rotor unit" and "counter stator unit," and such "counter units" participate in minimizing the irradiation of the harmful waves by the system. As have been briefly described above and will be described in greater detail below, such a "counter unit" may emit the counter waves capable of canceling the desired portion of the harmful waves, may suppress the harmful waves and containing such waves closer to a source of such waves. Similar to the "basic units" generating the electromotive force through dynamic and magnetic interactions, the "counter units" minimize the irradiation of the harmful waves through static and/or dynamic magnetic fields and/or waves created by one or multiple permanent magnets and/or electromagnets included in such "counter units." It is appreciated, however, that the "counter unit" may have a configuration which is identical to, similar to or different from the configuration of the "base unit" as long as such a "counter unit" can minimize the irradiation of the harmful waves as described herein. For example, when multiple identical or similar rotor units are used, one rotor unit may serve as the "base rotor unit," while another rotor unit may serve as the "counter rotor unit" with respect to that "base rotor unit." Similarly, when multiple identical or similar stator units are used, one stator unit may serve as the "base stator unit," while another stator unit may serve as the "counter stator unit" for that "base stator unit."

The "basic and counter units" as well as the "rotor and stator units" may further be classified based upon their dispositions with respect to each other or with respect to a preset reference such as, e.g., a center, a corner or other landmarks of the prior art electric motor or the EMC electric motor system of this invention. Accordingly, the term "inner unit" refers to a specific unit which is disposed inside the basic stator unit, while the term "outer unit" means another unit which is disposed outside the basic stator unit. In the alternative, the term "inner unit" may instead be employed to refer to a unit which is disposed closer to the center of the system than the "outer unit" when both of the "inner unit" and "outer unit" are disposed inside or outside the basic stator unit. As described hereinabove, such an "inner or outer unit" may be the rotor or stator unit, may be the basic or counter unit, and the like. In addition, the term "center unit" refers to a specific unit which is disposed in the center of the system, while the term "end unit" represents another unit which is disposed farther away from such a center than the "center unit," whether such "center and end units" are disposed inside or outside the basic stator unit. Similarly, the terms "right unit" and "left unit" may be employed to differentiate two or more units as shown in the accompanied drawings.

As used herein, the terms "axial," "radial," and "angular" will be used in reference to a center axis of the system, where the center axis corresponds to a shaft of the system which generates the electromotive force through rotation thereof. Accordingly, the center axis also corresponds to an axis which passes through a center of a basic stator unit of the system. Based hereupon, the term "axial direction" refers to a direction along such a center axis of the system, while the term "radial direction" means another direction which is normal to such an "axial direction" and, therefore, which represents a direction extending away and outwardly from the center of the system. It is appreciated that such a "radial direction" may be other directions which extend away and outwardly from the center of such a system and may be transverse but not necessarily perpendicular to the "axial direction." In addition, the term "angular direction" refers to yet another direction which revolves about the "axial direction" in a clockwise or counterclockwise manner.

It is appreciated that definitions related to various electric and magnetic shields of this invention are similar to those as have been provided in the aforementioned co-pending Applications. Therefore, such definitions are deleted herein for simplicity of illustration.

Unless otherwise defined in the following specification, all technical and scientific terms used herein have the same meaning as commonly understood by one of ordinary skill in the art to which the present invention belongs. Although the methods or materials equivalent or similar to those described herein can be used in the practice or in the testing of the present invention, the suitable methods and materials are described below. All publications, patent applications, patents, and/or other references mentioned herein are incorporated by reference in their entirety. In case of any conflict, the present specification, including definitions, will control. In addition, the materials, methods, and examples are illustrative only and not intended to be limiting.

Other features and advantages of the present invention will be apparent from the following detailed description, and from the claims.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
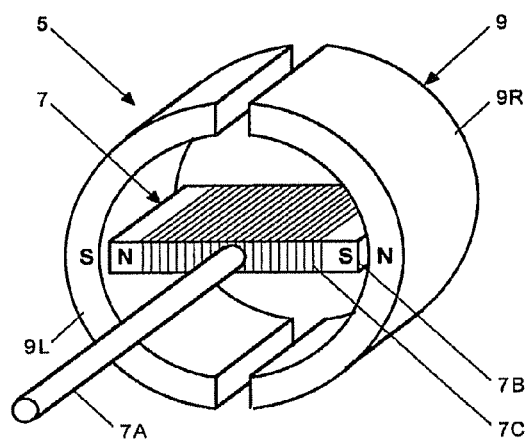
FIG. 1A is a schematic perspective view of a conventional DC motor.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The present invention generally relates to electric motor systems which minimize irradiation of harmful (or first) electromagnetic waves by countering a desired portion of said harmful (or first) waves through various means. More particularly, the present invention relates to an electromagnetically-countered electric motor system having one or more counter units which may minimize such irradiation of the harmful (or first) waves by suppressing such harmful (or first) waves to their sources and/or by emitting counter (or second)

electromagnetic waves which are capable of canceling a desired portion of the harmful (or first) waves, where the counter units may be incorporated in various locations of the system for opposing magnetic poles of basic rotor units and/or basic stator units by like magnetic poles of the counter units. The present invention relates to such counter units defining various configurations, disposed in various arrangements, and performing various functions for minimizing such irradiation of the harmful (or first) waves by the system. The present invention also relates to various counter units which cooperate with the basic rotor and/or stator units to contribute to generating electromotive force or, in the alternative, relates to other counter units which may not contribute to generating such force and, therefore, may be disposed in different locations and/or arrangements. The present invention relates to various electric motor systems operating in different mechanisms and to various counter units for each of such motor systems.

The present invention also relates to various methods of minimizing irradiation of such harmful (or first) waves by various electric motor systems. Thus, the present invention relates to various methods of suppressing the harmful (or first) waves to their sources while preventing such waves from propagating to an user and various methods of canceling a desired portion of the harmful (or first) waves by the counter (or second) waves which have amplitudes and phase-angles desirable therefor. The present invention relates to various methods of performing the minimizing while preserving a capability of providing electromotive force by the system, various methods of performing such minimizing while reducing adverse effects on such force-generating capability of the system, and various methods of fabricating such a system without unreasonably changing and/or increasing its size. The present invention relates to various methods of modifying conventional electric motors into the electromagnetically-countered motor system of this invention, various methods of incorporating such counter units into each of the conventional motors, and the like.

The present invention also relates to various processes for providing the electromagnetically-countered electric motor systems and various processes for providing members and/or units of such systems. More particularly, the present invention relates to various processes for making the counter units capable of suppressing the harmful (or first) waves closer to their sources and/or of emitting the counter (or second) waves which are capable of canceling the desired portion of the harmful (or first) waves, various processes for incorporating such counter units into various locations of the systems, and various processes for electromagnetically coupling the counter units with various units of the system. The present invention further relates to various processes for cooperating the counter units with other units of the system and contributing to generating the force and various processes for reducing the adverse effects of the counter units upon such force-generating capability of the system. The present invention further relates to various processes for modifying or converting the conventional electric motors into such an electromagnetically-countered electric motor system of the present invention, and various processes for incorporating such counter units into each of the conventional motor.

Various aspects and/or embodiments of various systems, methods, and/or processes of this invention will now be described more particularly with reference to the accompanying drawings and text, where such aspects and/or embodiments thereof only represent different forms. Such systems, methods, and/or processes of this invention, however, may also be embodied in many other different forms and, accordingly, should not be limited to such aspects and/or embodiments which are set forth herein. Rather, various exemplary aspects and/or embodiments described herein are provided so that this disclosure will be thorough and complete, and fully convey the scope of the present invention to one of ordinary skill in the relevant art.

Unless otherwise specified, it is to be understood that various members, units, elements, and parts of various systems of the present invention are not typically drawn to scales and/or proportions for ease of illustration. It is also to be understood that such members, units, elements, and/or parts of various systems of this invention designated by the same numerals may typically represent the same, similar, and/or functionally equivalent members, units, elements, and/or parts thereof, respectively.

FIG. 1A is a schematic perspective view of a conventional electric motor, where an example is taken from a DC motor 5 which includes a frame (not included in the figure), an electromagnet 7, and a pair of C-shaped (or semi-circular) permanent magnets 9 such as a right permanent magnet 9R and a left permanent magnet 9L. The electromagnet 7 is fabricated by winding a conductive wire around a body 7B and forming a coil 7C, where opposite ends of the coil 7C constitute lead wires (not included in the figure) supplying electric energy such as electric voltage and current through the electromagnet 7. An axle 7A is then attached to the body 7B of the electromagnet 7 which is then movably disposed in a center of the motor and aligned with a center axis (not included in the figure) of the motor as well. Thus, the electromagnet 7 forms a "basic rotor unit" of the motor 7, where the term "basic" connotes that such a unit is commonly used not only in the prior art electric motors but also in the EMS electric motor systems of this invention, and where the "rotor" means that such a unit generates a movement such as an angular rotation about the center axis of the motor 5 in a clockwise or counterclockwise direction. The right and left magnets 9R, 9L are arranged to face each other by their convex portions such that static magnetic fields are generated in a direction pointing from one to the other magnets 9R, 9L. Thereby, the permanent magnets 9 constitute a "basic stator unit" of the motor 7, where the term "basic" connotes the same meaning as that of the basic rotor unit, while the term "stator" means that such a unit is stationary while the basic rotor unit generates such an angular rotation. As the electric energy is supplied to the electromagnet 9 through its lead wire, dynamic magnetic fields are generated around the electromagnet 7 (i.e., the basic rotor unit) and then interact with the static magnetic fields generated between the permanent magnets 9 (i.e., the basic stator unit). Thus, dynamic interactions between such dynamic and static magnetic fields begin to angularly rotate the basic rotor unit 7 in the basic stator unit 9, and the motor 5 provides electromotive force or torque using such electric energy which in this example is the DC current. Further details of operational characteristics of the DC motor are well known in the art and, accordingly, omitted herein. It is appreciated that polarities of various magnetic poles marked around the basic rotor and/or stator units 7, 9 are taken immediately before the electric current reverses its direction through the basic rotor unit 7.

It is appreciated that the motor 5 irradiates the harmful waves by various mechanisms through various routes. For example, the motor 5 includes a single source of the harmful waves in the basic rotor unit 7 including the electromagnet therein. Because the electric energy supplied to such a basic rotor unit 7 is the DC current, the electromagnet of the basic rotor unit 7 would have generated static magnetic fields therearound. However, the dynamic interactions between the magnetic fields created by the basic rotor and stator units 7, 9 force the basic rotor unit 7 to angularly rotate about the center axis of the motor 5. Such rotation inevitably perturbs spatial patterns of the static magnetic fields and finally results in irradiating harmful waves which propagate into space away therefrom. In contrary to the basic rotor unit 7, the basic stator unit 9 includes only the permanent magnets 9R, 9L and is neither supplied with any electric energy. However, the basic stator unit 9 tends to serve as a conduit which receives the harmful waves from the basic rotor unit 7 and then passes them therethrough. Thus, the harmful waves irradiated by the basic rotor unit 7 may continue to propagate out of the motor 5 along diverse directions, including one to an user of the motor 5.

In one aspect of the present invention, an EMC electric motor system of the present invention may minimize the irradiation of the harmful waves by including at least one counter rotor unit movably disposed outside the basic stator unit.

Figure 1B:
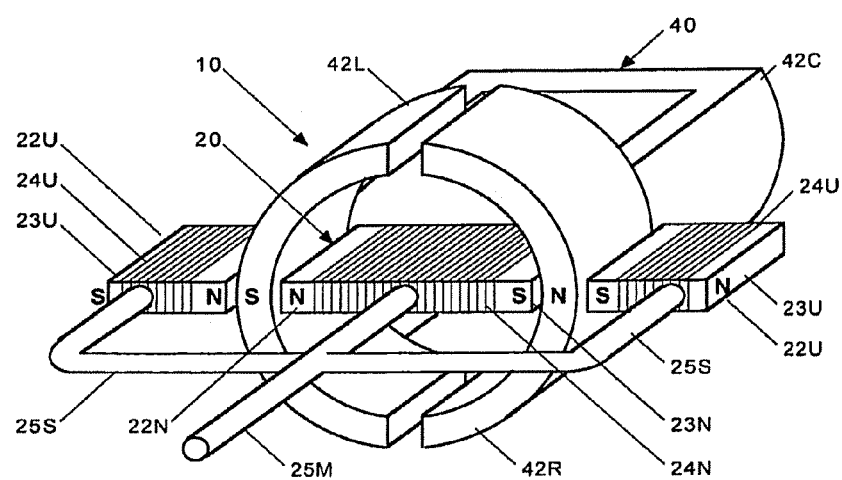
FIG. 1B is a schematic perspective view of an exemplary electric motor system including a pair of counter rotor units disposed outside a basic stator unit according to the present invention.

In one exemplary embodiment of this aspect of the present invention, a first EMC electric motor system includes at least one counter rotor unit which may be movably disposed outside a basic stator unit and may further be arranged to minimize the irradiation of such harmful waves from one or more wave sources of the EMC system. FIG. 1B describes a schematic perspective view of an exemplary electric motor system which includes a pair of counter rotor units disposed outside a basic stator unit according to the present invention, where the system 10 includes a frame (not included in the figure), a rotor member 20, and a stator member 40. The rotor member 20 includes a single inner basic rotor unit 22N and a pair of outer counter rotor units 22U. The inner basic rotor unit 22N is generally similar to that of FIG. 1A and formed by winding a coil 24N around a body 23N, while the outer counter rotor units 22U defining dimensions smaller than those of the basic rotor unit 22N are disposed outside the stator member 40 and formed by winding coils 24U around their bodies 23U. The outer counter rotor units 22U are also in an arrangement such that one magnetic pole of each outer counter rotor unit 22U may horizontally face one magnetic pole of the inner basic rotor unit 22N at a preset distance. In order to maintain this arrangement, such outer counter rotor units 22U are mechanically coupled to the inner basic rotor unit 22N through side shafts 25S which are fixedly coupled to a main shaft 25M. Through this coupling, the outer counter rotor units 22U may rotate with the inner basic rotor unit 22N about a center axis of the system 10. The stator member 40 includes a center permanent magnet 42C, a left C-shaped permanent magnet 42L, and a right C-shaped permanent magnet 42R. Both of the right and left magnets 42R, 42L are also magnetically coupled to the center magnet 42C so as to form an N pole on the right magnet 42R and a S pole on the left magnet 42L, similar to those of FIG. 1A. It is noted that such a stator member 40 may instead be formed by a single permanent magnet defining a horseshoe shape and forming the N and S poles as described in the figure.

Figure 1C:
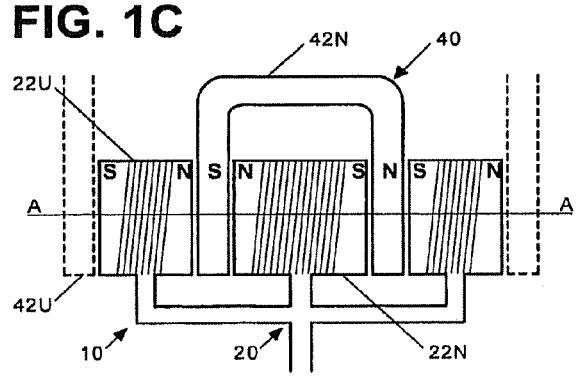
FIG. 1C is a schematic top view of the exemplary electric motor system of FIG. 1B and includes multiple panels illustrating operational characteristics of the system according to the present invention.
Figure 1C:
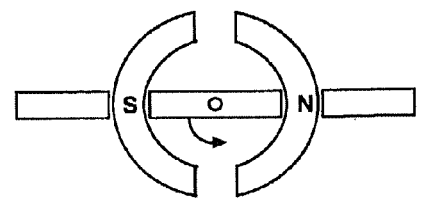
Figure 1C:
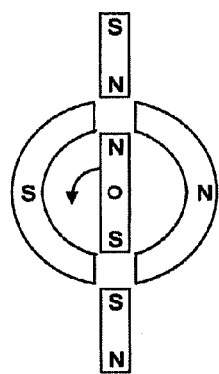
Figure 1C:
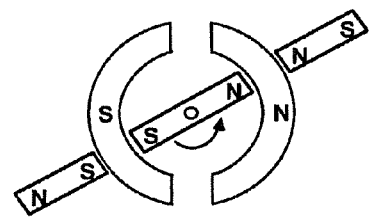
Figure 1C:
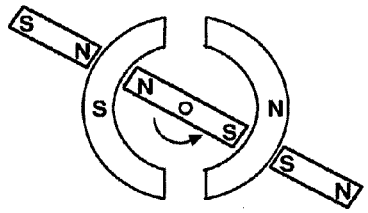
Figure 1C:
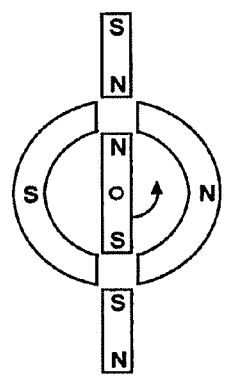

Operational characteristics of the EMC electric motor system 10 will be disclosed in reference to FIG. 1C which is a schematic top view of the exemplary system of FIG. 1B and which also includes multiple panels illustrating operational characteristics of the system according to the present invention. It is appreciated that FIG. 1C is a schematic top view of the system 10 of FIG. 1B but that panels (a) to (e) of FIG. 1C represent schematic cross-sectional views of such a system 10 obtained along the line AA. It is also appreciated that actual disposition of the system 10 of FIGS. 1B and 1C corresponds to that exemplified in the panel (c).

Still referring to FIG. 10, the first panel (a) describes the inner basic rotor unit 22N which is in the middle of its counterclockwise rotation and disposed right inside gaps defined between the right and left basic stator units 42R, 42L. In such a state, the electric current is supplied to the inner basic rotor unit 22N in such a direction to form a N pole on top and a S pole at bottom as shown in the figure. Due to magnetic attraction between opposite poles of the inner basic rotor unit 22N and those of the basic stator units 42R, 42L, the inner basic rotor unit 22N continues to rotate in the same counterclockwise angular direction inside the basic stator units 42R, 42L while converting the magnetic interactions into the electromotive force and then delivering such force through its main shaft 25M. The outer counter rotor units 22U which fixedly couple with the inner basic rotor unit 22N also angularly rotate outside and about the basic stator units 42R, 42L along with the inner basic rotor unit 22N. It is appreciated that the outer counter rotor units 22U are arranged to define N poles and S poles as described in the figure. Because such poles experience the same attraction from the basic stator units 42R, 42L, the outer counter rotor units 22U actively generate another electromotive force, thereby adding a preset portion to the force generated by the inner basic rotor unit 22N.

Both the inner basic rotor unit 22N and outer counter rotor units 22U continue to rotate inside and outside such basic stator units 42R, 42L, respectively, as described in the panel (b). When such rotor units 22N, 22U reach midpoints of the basic stator units 42R, 42L as shown in the panel (c), the system temporarily cuts off the supply of the electric current to the rotor units 22N, 22U. Due to their inertia, however, the basic and counter rotor units 22N, 22U still continue their angular rotation along the counterclockwise direction. Immediately thereafter, the system resumes to supply the current to the inner basic rotor unit 22N and outer counter rotor units 22U but in opposite directions. Therefore, the rotor units 22N, 22U form the N and S poles in an arrangement which is exactly opposite to those of the panels (a) and (b) as shown in the figure. It is appreciated that such magnetic poles formed in the inner basic rotor unit 22N and outer counter rotor unit 22U are the like magnetic poles formed on the basic stator units 42R, 42L. Due to magnetic repulsion between such like poles of such rotor and stator units, both of the inner basic rotor unit 22N and outer counter rotor units 22U continue to rotate along the counterclockwise angular direction, respectively, inside and outside such basic stator units 42R, 42L, while similarly converting the magnetic interactions caused by the electric current into such electromotive force and then delivering such force through its main shaft 25M. As is the cases in the panels (a) and (b), the outer counter rotor units 22U experience the same repulsive force exerted by the basic stator units 42R, 42L, and actively generates another electromotive force, thereby adding another preset portion to the force generated by the inner basic rotor unit 22N. As the rotor units 22N, 22U revolve 180.degree. and reach the gaps between the basic stator units 42R, 42L, both of the inner basic rotor unit 22N and outer counter rotor units 22U define the magnetic poles which are identical to those of the panels (a) and (b), thereby repeating the above force-generating steps.

Although various configurational and/or operational characteristics of the EMC electric motor system exemplified FIGS. 1B and 1C may seem to be identical or at least substantially similar to those of the prior art motor shown in FIG. 1A, fundamental differences exist between the EMC system and its conventional counterpart. First of all, the EMC system of this invention invariably includes at least one counter unit which is to be disposed in a head-to-head arrangement (or opposing arrangement) with at least one wave source of the system and which is to maintain such an arrangement whether the counter unit is to serve as a stationary counter stator unit or as a mobile counter rotor unit. More particularly, the counter unit is preferably arranged to orient at least one of its magnetic poles which is the like pole of a specific wave source to be opposed by the counter unit. In the embodiment of FIGS. 1B and 1C, the outer counter rotor units 22U are disposed in a head-to-head or opposing arrangement with respect to the wave source such as the inner counter rotor unit 22N, while defining the like poles on their inner ends. Such outer counter rotor units 22U are also arranged in such a manner to ensure that such magnetic poles always have the same or like polarity as the poles of the inner counter rotor unit 22N regardless of the current directions and, accordingly, that the magnetic poles of such outer counter rotor units 22U always oppose the abutting magnetic poles of the inner counter rotor unit 22N. Such an opposing arrangement by the like poles is the foremost feature of various EMC electric motor systems of this invention which further offers various benefits over the prior art electric motors, i.e., suppressing the harmful waves closer to their wave source, suppressing such harmful waves from escaping away from their source, canceling the desired portion of the harmful waves by emitting and propagating counter waves along with such harmful waves, and the like. For example, the opposing arrangement allows the like magnetic poles to repel each other and tends to skew the magnetic fields (whether static or dynamic) generated by such poles closer to or toward their destination pole (i.e., a S pole), thereby forcing the magnetic fluxes and/or waves to travel to their destination pole in shorter routes. Accordingly, the opposing arrangement compacts the magnetic fields and fluxes between the opposing like magnetic poles and thereby reduces amounts of the magnetic fields, fluxes, and waves emanating from the magnetic poles. In other words, such an opposing arrangement can suppress the harmful waves irradiated by various wave sources of the EMC system closer to such sources and/or system, can suppress the harmful waves from escaping and emanating farther away from the wave sources and/or system, and can also contain the harmful waves closer to the sources and/or system, thereby minimizing the irradiation of the harmful waves by the EMC system to an user of the system. In another example, the above opposing arrangement also allows the like magnetic poles to emit other, electromagnetic waves or, namely, counter electromagnetic waves or counter waves which are also automatically equipped with phase characteristics capable of canceling at least a desired portion of the harmful waves. As exemplified hereinabove, each of the outer counter rotor unit 22U includes at least one electromagnet which emits counter waves when the electric current flows therein, where characteristics of such counter waves are further complicated due to its angular rotation. However, such outer counter rotor units 22U are compelled to rotate at the same speed as the inner basic rotor unit 22N and the electric currents supplied to these rotor units 22N, 22U may be maintained to have the same phase characteristics. Because these inner basic rotor unit 22N and outer counter rotor units 22U are in the opposing head-to-head arrangement, the counter waves emitted by the outer counter rotor units 22U are automatically given the phase characteristics which are substantially (or at least partially) opposite to those of the harmful waves which are irradiated from the inner basic rotor unit 22N. In other words, such an opposing arrangement guarantees the electromagnetic waves emitted by various counter units of the EMC system to cancel a preset portion of the harmful waves irradiated from various wave sources which are to be opposed by such like magnetic poles of the counter units 22U. Thus, as long as a distance between the counter and basic rotor units 22U, 22N are maintained within a preset threshold, each of the outer counter rotor units 22U emits the counter waves capable of canceling a preset portion of the harmful waves while propagating along therewith, thereby further minimizing the irradiation of the harmful waves by the EMC system to its user.

Another difference between the EMC electric motor system of this invention and the prior art electric motors lies in the fact that the EMC system of the present invention invariably includes at least one counter unit which can utilize residual force-generating capability of the basic unit of the system which cannot be harnessed in the setting of the conventional electric motors. More particularly, such a counter unit is incorporated to oppose at least one additional magnetic pole of at least one basic unit and/or to abut at least one additional surface of the basic unit, and utilizes the magnetic fields and/or fluxes generated by or around the additional pole and/or side of the basic unit, thereby enhancing the force-generating capability of the system as a whole. As depicted in the prior art example of FIG. 1A, inner surfaces of the basic stator units 9R, 9L face or abut the basic rotor unit 7 and then cooperates therewith to generate the electromotive force, while the magnetic fields, fluxes, and waves (if any) of or around outer surfaces of the basic stator units 9R, 9L are wasted. In contrary, the outer counter rotor units 22U of the EMC system 10 of FIGS. 1B and 1C enclose therein the outer surfaces of such basic stator units 42R, 42L and then interacts with the magnetic fields, fluxes, and waves of or around such surfaces. Accordingly, the EMC system of this embodiment and in general may generate greater electromotive force than its prior art counter part, given the same basic stator units.

Another advantage of the EMC electric motor system of the present invention relates to a size of such a system. More particularly, such an EMC system is not generally mandated to have a bigger size solely due to the presence of various inner and/or outer counter rotor and/or stator units movably or stationarily disposed in various locations therearound. As briefly described in conjunction with the embodiment of FIGS. 1B and 1C, such outer counter rotor units 22U are arranged to form the magnetic poles of the polarities allowing such outer counter rotor units 22U to cooperate with the basic stator units 42R, 42L to generate the electromotive force. Accordingly, the EMC system 10 of FIGS. 1B and 1C is expected to generate greater force than its prior art counterpart which only includes therein the basic rotor and stator units 22N, 42R, 42L, at the cost of a greater size or volume primarily because of the additional outer counter rotor units 22U. Conversely, the EMC system may be fabricated to define a size and/or a volume which are comparable to its conventional counterpart with the same, similar or comparable capacity of generating the electromotive force, despite incorporating therein various inner and/or outer counter units. An example which compares the prior art motor 5 of FIG. 1A and the EMC motor system of FIGS. 1B and 1C best explains this feature. If the inner basic rotor unit 22N and outer counter rotor units 22U of the EMC system 10 are viewed to have a total span which may be identical or comparable to a span of the electromagnet 7 of the prior art motor 5, the basic stator units 42R, 42L of the EMC system 10 are to be smaller than those of the prior art motor 5. For the EMC motor system 10 to match the force which is comparable to that by the prior art motor 5, the basic stator units 42R, 42L of the EMC system 10 are to maintain its capability of generating the magnetic fields, fluxes, and waves of which amplitudes or magnitudes match those generated by the permanent magnets 9R, 9L of the prior art motor 5. In other words, as long as the smaller basic stator units 42R, 42L of the EMC system 10 generate therearound such static magnetic fields and/or fluxes which are comparable to those by the magnets 9R, 9L of the prior art motor 5, the EMC electric motor system 10 of the present invention may also generate the comparable electromotive force, while minimizing the irradiation of the harmful waves to its user.

It is appreciated that two dotted portions included in right and left ends of FIG. 1C represent a pair of outer counter stator units which may be incorporated outside the basic stator units 42R, 42L in such an arrangement that the outer counter rotor units 22U may angularly rotate about the center axis of the system 10 between the inner basic stator units 42R, 42L and the outer counter stator unit 42U. It is also appreciated that the EMC electric motor systems of FIGS. 1B and 1C may be used wherever conventional DC motors are employed, while minimizing the irradiation of the harmful waves.

Figure 1D:
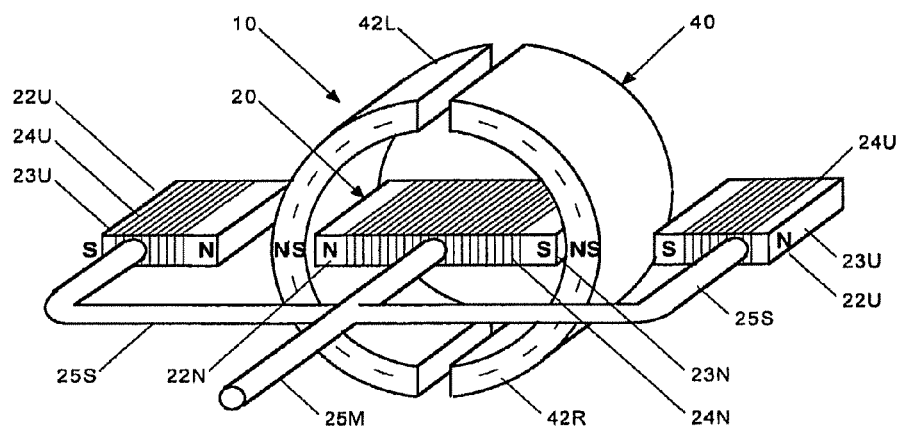
FIG. 1D is a schematic perspective view of an exemplary electric motor system including a pair of counter rotor units disposed outside and close to another basic stator unit according to the present invention.

In another exemplary embodiment of this aspect of the present invention, an EMC electric motor system includes at least one counter rotor unit which may be movably disposed outside a basic stator unit and may further be arranged to minimize the irradiation of such harmful waves from one or more wave sources of the EMC system. FIG. 1D is a schematic perspective view of an exemplary electric motor system including a pair of counter rotor units disposed outside and close to another basic stator unit according to the present invention, where such a system 10 includes a frame (not included in the figure), a rotor member 20, and a stator member 40. The rotor member 20 is generally similar to that of FIGS. 1B and 1C, and includes a single inner basic rotor unit (i.e., a basic rotor unit) 22N and a pair of outer counter rotor units (i.e., counter rotor units) 22U which are mechanically coupled to a main shaft 25M of the inner basic rotor unit 22N through their side shafts 25S. In addition, the counter rotor units 22U are disposed in the opposing arrangement to horizontally face each pole of the inner basic rotor unit 22N with their inner magnetic poles of the like polarities at a preset distance. The stator member 40, however, is different from that of FIGS. 1B and 1C. In one respect, the stator member 40 includes a left C-shaped permanent magnet 42L (i.e., a left basic stator unit) and a right C-shaped permanent magnet (i.e., a right basic stator unit) 42R which is not magnetically coupled to the left magnet 42L. In another respect, each of the permanent magnets or basic stator units 42R, 42L is arranged to define opposite magnetic poles on its inner and outer surfaces as exemplified in the figure, contrary to those of the system of FIGS. 1B and 1C where each of the left and right basic stator units defines a single pole thereon.

By employing a different magnetic arrangement between the magnetic poles of the rotor and stator units, the EMC system 10 of FIG. 1D may behave a bit different from its counterpart of FIGS. 1B and 1C. As described above, the outer counter rotor units 22U are arranged to oppose each pole of the basic stator units 42R, 42L with its like pole and to maintain such an opposing arrangement during their angular rotation about the center axis of the system 10, thereby suppressing the harmful waves and/or canceling the desired portion of the harmful waves. It is appreciated, however, that the poles of the outer counter rotor units 22N which are arranged to oppose the like poles of the basic rotor unit 22N are also opposed by the like magnetic poles which are formed on the outer surfaces of the basic stator units 42R, 42L as well. A mismatch between such poles may then adversely affect the force-generating capability of the system 10, may degrade an efficiency of the system 10, may require the system 10 to incorporate a bigger and heavier inner basic rotor unit and/or basic stator units, and the like. In order to alleviate such a disaster, the outer counter rotor units 22N may be movably disposed away from the outer surfaces of the basic stator units 42R, 42L at another distance which is greater than that of the system of FIGS. 1B and 1C. Accordingly, such outer counter rotor units 22N not only minimize the irradiation of the harmful waves from the basic stator units 42R, 42L but also minimize the adverse effects on the force-generating capacity caused by the above mismatch between the poles. Similar to that of FIGS. 1B and 1C, the EMC electric motor system 10 of FIG. 1D may be able to replace conventional DC motors while minimizing the irradiation of the harmful waves. Other configurational and/or operational characteristics of the EMC system 10 of FIG. 1D are generally similar or identical to those of the systems of FIGS. 1B and 1C.

Figure 1E:
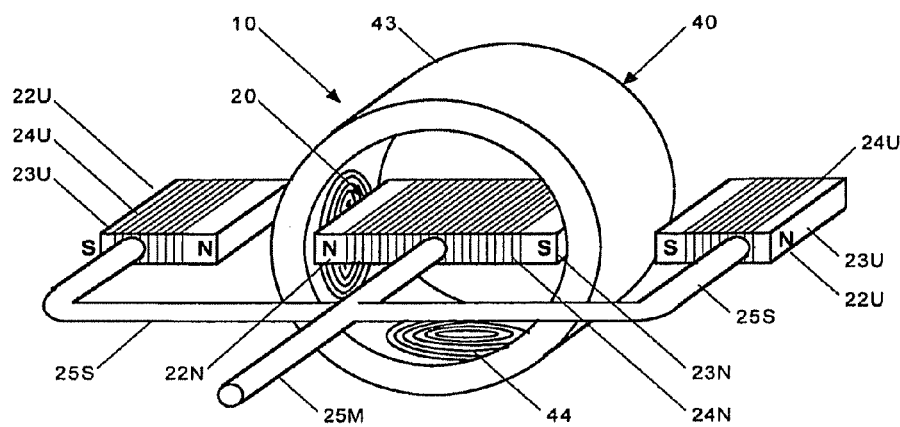
FIG. 1E is a schematic perspective view of an exemplary electric motor system including a pair of counter rotor units disposed outside and farther away from another basic stator unit according to the present invention.

In another exemplary embodiment of this aspect of the present invention, an EMC electric motor system includes at least one counter rotor unit which may be movably disposed outside a basic stator unit and may further be arranged to minimize the irradiation of such harmful waves from one or more wave sources of the EMC system. FIG. 1E is a schematic perspective view of an exemplary electric motor system including a pair of counter rotor units disposed outside and farther away from another basic stator unit according to the present invention, where such a system 10 includes a frame (not included in the figure), a rotor member 20, and a stator member 40. The rotor member 20 is generally similar to that of FIGS. 1B to 1D, and includes a single inner basic rotor unit (i.e., a basic rotor unit) 22N and a pair of outer counter rotor units (i.e., counter rotor units) 22U which are mechanically coupled to a main shaft 25M of the inner basic rotor unit 22N through each of their side shafts 25S. The counter rotor units 22U are further disposed in the opposing arrangement to horizontally face each pole of the inner basic rotor unit 22N with their inner magnetic poles of the like polarities at a preset distance. The stator member 40, however, is substantially different from those described in FIGS. 1B to 1D. In one respect, the stator member 40 defines a hollow and cylindrical stator body 45 which does not function as a permanent magnet. Rather, multiple electromagnets (i.e., basic stator units) 44 are incorporated on an inner surface of the stator body 45 in a preset number and also based on a preset arrangement in order to generate the requisite magnetic fields, fluxes, and waves for generating the electromotive force as the electric current flows therein. By controlling amplitudes and/or directions of the currents supplied thereto, both the inner basic rotor unit 22N and outer counter rotor units 22U angularly rotate about the center axis of the system 10 and converts the electrical energy into force, while such outer counter rotor units 22U minimize the irradiation of the harmful waves from the basic rotor unit 22N by emitting the counter waves for canceling a desired portion of such harmful waves thereby and/or by suppressing the harmful waves closer to the wave source such as the basic rotor unit 22N.

It is appreciated that the EMC system 10 of this embodiment may behave similar to either of the systems of FIGS. 1B and 1C and the system of FIG. 1D. For example, when the electromagnets of the basic stator units 44 are arranged to generate the dynamic magnetic fields along radial directions and to form the magnetic poles in the same directions similar to the permanent magnets shown in FIG. 1D, such outer counter rotor units 22U may preferably be spaced away from the basic stator units 44 at a greater distance so as to minimize the adverse effects on the force-generating capacity of the system 10 caused by the mismatch between such poles of the outer counter rotor units 22N and those of the basic stator units 44. In the alternative, when the electromagnets of the basic stator units 44 may be arranged to generate the dynamic fields along axial directions and to form axially extending magnetic poles along the stator body 45, the outer counter rotor units 22U may then be disposed closer to the basic stator units 44 in order to cooperate therewith and to add a preset portion to the electromotive force generated by such a system 10. It is appreciated that the EMC electric motor system 10 of FIG. 1E may be able to replace conventional universal motors while minimizing the irradiation of the harmful waves. Other configurational and/or operational characteristics of the EMC system 10 of FIG. 1E are generally similar or identical to those of the systems of FIGS. 1B to 1D.

Figure 1F:
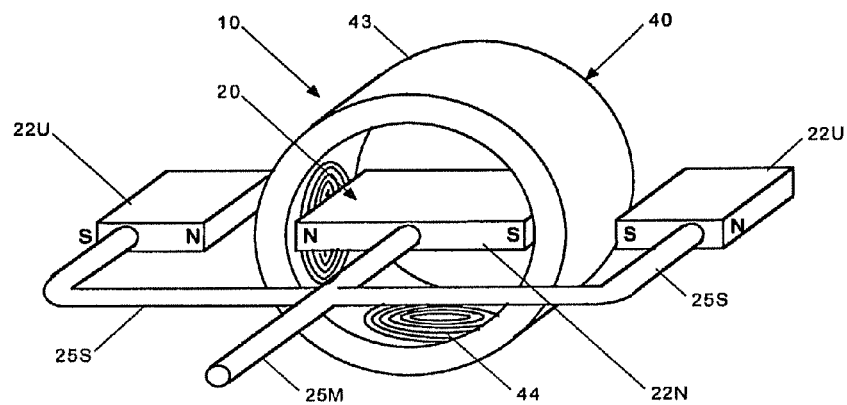
FIG. 1F is a schematic perspective view of an exemplary electric motor system including a pair of counter rotor units disposed outside another basic stator unit according to the present invention.

In another exemplary embodiment of this aspect of the present invention, an EMC electric motor system includes at least one counter rotor unit which may be movably disposed outside a basic stator unit and may further be arranged to minimize the irradiation of such harmful waves from one or more wave sources of the EMC system. FIG. 1F represents a schematic perspective view of an exemplary electric motor system including a pair of counter rotor units disposed outside another basic stator unit according to the present invention, where the system 10 includes a frame (not included in the figure), a rotor member 20, and a stator member 40. The stator member 40 is typically similar to that of FIG. 1E and includes multiple electromagnets 44 which are supported by and incorporated in a stator body 43, thereby generating the dynamic magnetic fields, fluxes, and waves in various directions. Contrary to those of FIGS. 1B to 1E, the rotor member 20 includes a center permanent magnet (i.e., an inner basic rotor unit) 22N as well as a pair of end permanent magnets (i.e., outer counter rotor units) 22U which are mechanically coupled to the main shaft 25M of the center magnet 22N by their side shafts 25S. In addition, the end magnets 22U are disposed in the above opposing arrangement for horizontally facing each pole of the center magnet 22N by their inner magnetic poles having the like polarities at a preset distance. By controlling amplitudes and/or directions of the currents supplied thereto, both the center and end magnets 22N, 22U angularly rotate around the center axis of the system 10 and converts the electrical energy into force, while such end magnets 22U minimize the irradiation of the harmful waves from the center magnet 22N by emitting the counter waves to cancel a desired portion of such harmful waves thereby and/or by suppressing such harmful waves closer toward the wave source such as the center magnet 22N.

It is appreciated that the EMC system 10 of this embodiment may operate similar to the systems of FIGS. 1B and 1C or to the system of FIG. 1D as well. For example, when the electromagnets of the basic stator units 44 are arranged to generate the dynamic magnetic fields along radial directions and to form the magnetic poles in the same directions similar to the permanent magnets shown in FIG. 1D, such end magnets 22U may be spaced away from the basic stator units 44 at a greater distance so as to minimize the adverse effects on the force-generating capacity of the system 10 caused by the mismatch as described above. In the alternative, when the electromagnets of the basic stator units 44 may be arranged to generate the dynamic fields in axial directions and to form axially extending poles along the stator body 45, the end magnets 22U may be disposed closer to the basic stator units 44 to cooperate therewith and to add such a preset portion to the force generated by the system 10. It is to be understood that the EMC electric motor system 10 of FIG. 1F may be able to replace conventional synchronous AC motors as well as conventional stepper motors while minimizing the irradiation of the harmful waves therefrom. Other configurational and/or operational characteristics of the EMC system 10 of FIG. 1F are generally similar or identical to those of the systems of FIGS. 1B to 1E.

In another aspect of the present invention, another EMC electric motor system of the present invention may minimize the irradiation of such harmful waves by including at least one counter stator unit stationarily disposed outside the basic stator unit.

Figure 1G:
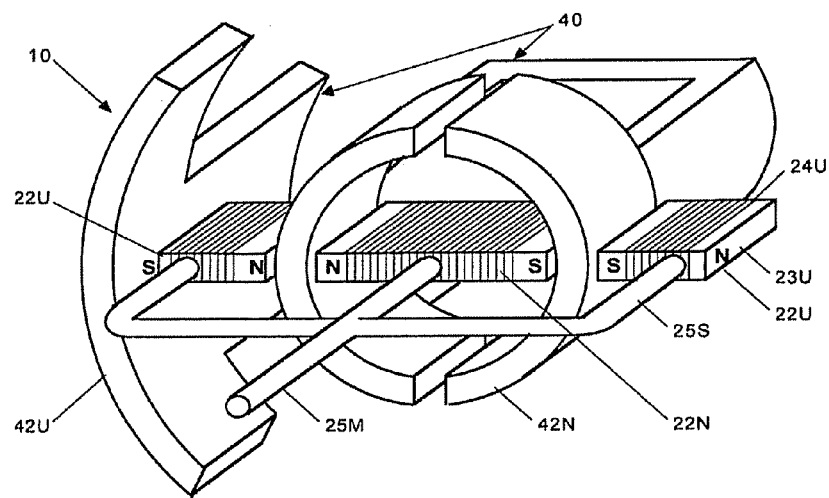
FIG. 1G is a schematic perspective view of the exemplary electric motor system shown in FIG. 1B which also includes a counter stator unit according to the present invention.

In one exemplary embodiment of such an aspect of this invention, another EMC electric motor system includes at least one counter rotor unit which is movably disposed between a basic stator unit and a counter stator unit and which is arranged to minimize the irradiation of the harmful waves from one or more wave sources of the EMC system. FIG. 1G shows a schematic perspective view of the exemplary electric motor system of FIG. 1B which also includes a counter stator unit according to the present invention, where the system 10 includes a frame (not included in the figure), a rotor member 20, and a stator member 40. Such a rotor member 20 is generally similar to that of FIGS. 1B to 1E, and includes a single inner basic rotor unit (i.e., a basic rotor unit) 22N as well as a pair of outer counter rotor units (i.e., counter rotor units) 22U which mechanically couple with a main shaft 25M of the inner basic rotor unit 22N through their side shafts 25S. The counter rotor units 22U are further disposed in the opposing arrangement to horizontally face each pole of the inner basic rotor unit 22N by their inner like poles at a preset distance. In contrary, the stator member 40 includes a pair of inner basic stator units 42N as well as at least one outer counter stator unit 42U. The basic stator units 42N are similar to those of FIG. 1B or 1C, whereas such an outer counter stator unit 42U may be provided in various numbers, may have various shapes and/or sizes, and may be disposed in various arrangements with respect to the inner basic stator units 42N, inner basic rotor units 22N, and/or outer counter rotor units 22U, where other details of various counter stator units will be provided below. It is appreciated that the EMC electric motor system 10 of FIG. 1G may also be able to replace conventional DC motors while minimizing the irradiation of the harmful waves and that the counter stator unit 42U of the same figure may be incorporated into other EMC systems described hereinabove and to be described hereinafter. Other configurational and/or operational characteristics of the EMC system 10 of FIG. 1G are generally similar or identical to those of the systems of FIGS. 1B to 1F.

In another aspect of the present invention, an EMC electric motor system of this invention may also minimize the irradiation of the harmful waves by including at least one counter rotor unit movably disposed inside the basic stator unit.

Figure 1H:
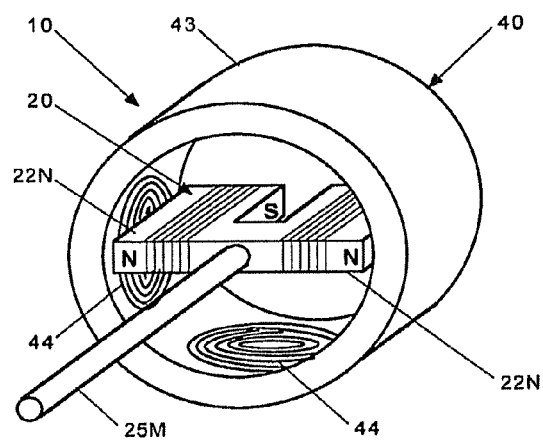
FIG. 1H is a schematic perspective view of an exemplary electric motor system including a pair of rotor units disposed inside a basic stator unit according to the present invention.

In one exemplary embodiment of such an aspect of this invention, another EMC electric motor system includes at least one counter rotor unit which may be movably disposed inside a basic stator unit and may further be arranged to minimize the irradiation of such harmful waves from one or more wave sources of the EMC system. FIG. 1H is a schematic perspective view of an exemplary electric motor system including a pair of rotor units disposed inside a basic stator unit according to the present invention. Such a system 10 includes a frame (not included in the figure), a rotor member 20, as well as a stator member 40, where the stator member 40 is typically similar to those of FIGS. 1E and 1F and includes multiple electromagnets (i.e., basic stator units) 44 which are supported by and incorporated in various locations of a stator body 43. In contrary, the rotor member 20 includes a pair of inner rotor units 22N each of which is movably disposed inside the stator body 43 in an off-center position. That is, such inner rotor units 22N are disposed symmetrically with respect to the center line of the system 10 while defining a gap therebetween, where such a gap may be a physical indentation as included in the figure or may simply be an area of a rotor body which does not include any coil of wire. The inner rotor units 22N are also arranged in order to form like magnetic poles on their inner ends as well as on their outer ends, where exemplary pole distribution is included in the figure.

The rotor member 20 of this embodiment is strikingly different from various rotors of the prior art motors and is also markedly different from those of the EMC systems disclosed in FIGS. 1B to 1G as well. In one respect, no inner rotor units 22N are disposed along the center line of the system 10 and, as a matter of fact, all of the inner rotor units 22N are arranged off from such a center line at an equal distance and in a symmetric arrangement. In this respect, each and all of such inner rotor units 22N may be deemed as counter units, for such off-centered inner counter rotor units are not found in the prior art motors. In another respect, the electromagnets of the inner rotor units 22N are fabricated to form a pair of like poles on their inner opposing ends as well as to form another pair of like poles on their outer opposing ends. The embodiment of FIG. 1H describes an instant when the inner rotor units 22N form the N poles on their outer ends and the S poles on their inner ends. It then logically follows that the basic stator units 44 which face or abut such outer poles of the inner counter rotor units 22N are also arranged to define the poles of the same polarity, for other pole distribution may not generate any electromotive force. Other operational characteristics of the EMC system 10 of this embodiment will be disclosed below in conjunction with other EMC systems shown in FIGS. 1I and 1J. In addition, other configurational and/or operational characteristics of the EMC system 10 of FIG. 1H are generally similar or identical to those of the systems of FIGS. 1B to 1G.

As manifest from FIG. 1H, both of the inner counter rotor units 22N are supported by the stator body 45. In this respect, such a rotor member 20 may be deemed to form an unitary article onto which a pair of electromagnets 22N are formed by winding conductive wire therealong. However, it is to be understood that the unitary article distinctly reveals a distribution of multiple pairs of opposite magnetic poles therealong such as, e.g., a first pair of the N and S poles along its right half and a second pair of the N and S poles along its other half. Accordingly, this will be deemed to suggest within the scope of the present invention that such an unitary article includes multiple units therealong.

Although distinctly different from those of FIGS. 1B to 1G, the EMC electric motor system which includes at least one inner counter rotor unit inside its basic stator unit offers numerous benefits over its prior art counterparts, where such benefits are similar or identical to those described in conjunction with FIGS. 1B to 1G. For example, the EMC system includes at least one inner counter rotor unit which is to be disposed in the head-to-head or opposing arrangement with at least one wave source of the system such as the inner basic rotor unit. In the alternative, the EMC system instead includes at least one inner counter rotor unit which is to be disposed in such a head-to-head or opposing arrangement with at least another inner counter rotor unit. In either arrangement, such inner counter rotor unit is to maintain such an arrangement regardless of directions of the electric current supplied thereto. More particularly, the inner counter rotor unit is specifically arranged to orient at least one of its poles to at least one like pole of another inner basic or counter unit which is to be opposed by the counter unit. In the embodiment of FIG. 1H, one inner counter rotor unit 22N is disposed in the opposing arrangement with another inner counter rotor unit 22N while defining the like poles on their opposing ends, where both of such units 22N may be the wave source. Such inner counter rotor units 22U are arranged in such a manner to maintain the like polarity regardless of the current directions and, accordingly, such poles of the inner counter rotor units 22N always oppose the abutting poles, thereby suppressing the harmful waves closer to another unit 22N, suppressing the harmful waves from escaping away from another unit 22N, and/or canceling the desired portion of such harmful waves by emitting the counter waves along with such harmful waves. Despite this distinct advantage, the EMC system 10 of FIG. 1H may not be very effective in minimizing the irradiation of the harmful waves, for at least a portion, if not a significant one, of the harmful waves irradiated by the outer ends of such units 22N may reach and propagate through the stator body 43 toward the user. In order to alleviate such a leak, the EMC system may be incorporated with one or more outer counter rotor units which may be able to cancel and/or suppress the leaking harmful waves irradiated through the outer ends of such inner counter rotor units.

Figure 1I:
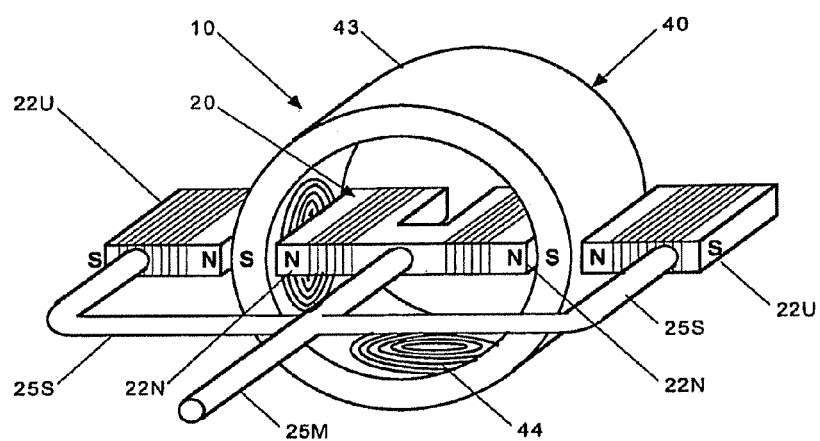
FIG. 1I is a schematic perspective view of the exemplary electric motor system depicted in FIG. 1H which also includes a pair of counter rotor units disposed outside the basic stator unit according to the present invention.

In another exemplary embodiment of this aspect of the invention, an EMC electric motor system includes at least one inner counter rotor unit which may be movably disposed inside a basic stator unit and at least one outer counter rotor unit for minimizing the irradiation of such harmful waves from one or more wave sources of the EMC system. FIG. 1I is a schematic perspective view of the exemplary electric motor system depicted in FIG. 1H which includes a pair of counter rotor units disposed outside a basic stator unit according to the present invention, where such a system 10 includes a frame (not included in the figure), a rotor member 20, and a stator member 40. The stator member 40 is generally similar to those of FIGS. 1E, 1F, and 1H, and includes multiple electromagnets (i.e., basic stator units) supported by and incorporated into the stator body 43. To the contrary, the rotor member 20 includes a pair of inner counter rotor units 22N as well as another pair of outer counter rotor units 22U. Such inner basic rotor units 22N are generally identical to those of FIG. 1H, whereas the outer counter rotor units 22U define dimensions smaller than those of the inner counter rotor units 22N and are disposed outside the stator member 40. The outer counter rotor units 22U are also in an arrangement such that one pole of each of the outer counter rotor units 22U horizontally faces one pole of each of the inner counter rotor units 22N at a preset distance. To maintain this arrangement, such outer counter rotor units 22U are mechanically coupled to the inner counter rotor units 22N by side shafts 25S which are fixedly coupled to the main shaft 25M for the inner counter rotor units 22N. Through this coupling, the outer counter rotor units 22U may rotate with the inner basic rotor units 22N about the center axis of the system 10. In addition, the outer counter rotor units 22U are oriented so as to oppose each pole of the outer ends of the inner counter rotor units 22N by at least one pole thereof of the like polarity such that all exposed poles of the inner counter rotor units 22N are opposed by the like poles of the outer counter rotor units 22U.

Figure 1J:
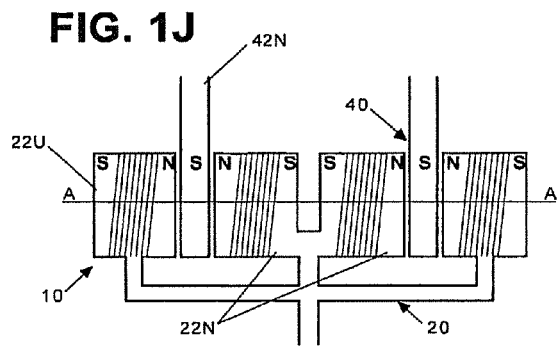
FIG. 1J is a schematic top view of the exemplary electric motor system of FIG. 1I and includes multiple panels illustrating operational characteristics of the system according to the present invention.
Figure 1J:
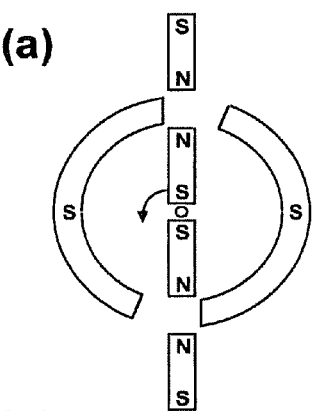
Figure 1J:
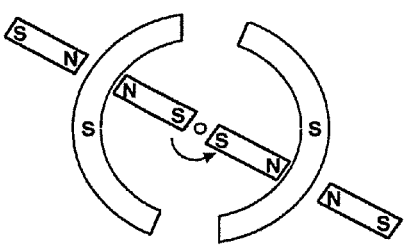
Figure 1J:
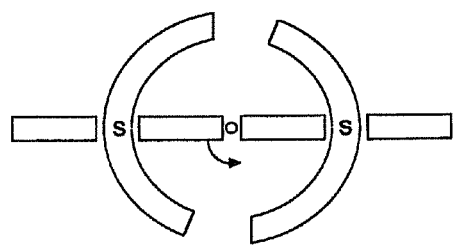
Figure 1J:
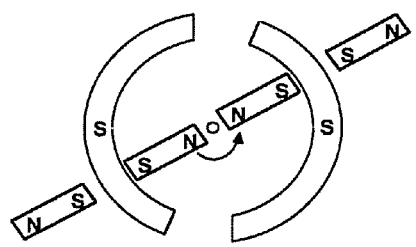
Figure 1J:
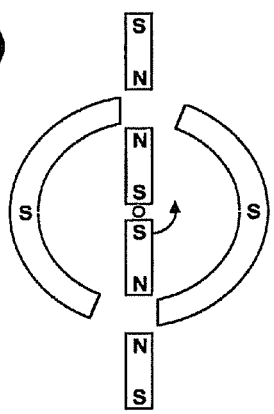

Operational characteristics of the EMC electric motor system 10 will be disclosed in reference to FIG. 1J which is a schematic top view of the exemplary system of FIG. 1I and which also includes multiple panels illustrating operational characteristics of the system according to the present invention. While FIG. 1J is a schematic top view of the system 10 of FIG. 1I, panels (a) to (e) of FIG. 1J represent schematic cross-sectional views of the system 10 obtained along the line AA. It is appreciated that actual disposition of the system 10 of FIGS. 1B and 1J corresponds to that exemplified in the panel (c). It is to be understood that the EMC system 10 of FIG. 1J is slightly modified from that shown in FIG. 1I, in that the system shown in FIG. 1J employs the basic stator member of FIG. 1B which includes a pair of C-shaped permanent magnets (i.e., inner basic stator units) 42N each defining a different polarity for proper operation of the system 10 depicted in the figure.

Still referring to FIG. 1J, the first panel (a) describes the inner counter rotor units 22N which is in the middle of its counterclockwise rotation and disposed right inside gaps formed between the inner basic stator units 42N. In this state, the electric current is supplied to the inner counter rotor units 22N in such directions to form the N poles on their outer ends as described in the figure. Due to magnetic attraction between outer poles of the inner counter rotor units 22N and those of the basic stator units 42N, the inner counter units 22N continue to rotate along the same counterclockwise angular direction inside the basic stator units 42N while converting the magnetic interactions to the electromotive force and delivering such force through its main shaft 25M. The outer counter rotor units 22U which fixedly couple with the inner counter rotor units 22N also angularly rotate outside and about the basic stator units 42N along with the inner counter rotor units 22N. It is noted that the outer counter rotor units 22U are arranged to define the N poles on their inner ends as described in the figure. Because such poles experience the same attraction from the basic stator units 42N, the outer counter rotor units 22U also actively generate another electromotive force, thereby adding a preset portion to the force generated by the inner counter rotor units 22N.

Both of such inner and outer counter rotor units 22N, 22U continue to rotate inside and outside the basic stator units 42N, respectively, as described in the panel (b). When the rotor units 22N, 22U reach midpoints of the basic stator units 42N as depicted in the panel (c), the system temporarily cuts off the current supply. Due to their inertia, however, such counter rotor units 22N, 22U continue their angular rotation along the counterclockwise direction. Immediately thereafter, the system resumes the current supply to the inner and outer counter rotor units 22N, 22U but in opposite directions. Thus, the rotor units 22N, 22U form the S poles on their outer ends which are exactly opposite to those shown in the panels (a) and (b). Due to magnetic repulsion between such like poles of such rotor and stator units, both the inner and outer counter rotor units 22N, 22U continue to rotate in the counterclockwise angular direction, respectively, inside and outside such basic stator units 42N, while converting such magnetic interactions caused by the electric current into such electromotive force and then delivering such force through its main shaft 25M. As is the cases in the panels (a) and (b), such outer counter rotor units 22U experience the same repulsive force exerted by the basic stator units 42N and actively generates another electromotive force, thereby adding another preset portion to the force generated by the inner counter rotor units 22N. When the rotor units 22N, 22U revolve 180.degree. and reach the gaps between the basic stator units 42N, both of the inner and outer counter rotor units 22N, 22U define the magnetic poles identical to those of the panels (a) and (b), thereby repeating the above steps.

Similar to those of FIGS. 1B to 1G, such EMC electric motor systems exemplified in FIGS. 1I and 1J offer numerous benefits over their prior art counterparts. First of all, such an EMC system includes at least one counter unit which is disposed in the opposing arrangement with at least another counter unit and which is to maintain such an opposing arrangement whether the counter unit is to operate as a stationary counter stator unit or as a mobile counter rotor unit. More particularly, a first counter unit is preferably arranged to orient at least one of its poles which is the like pole of a second counter unit to be opposed by the first counter unit. In the embodiment of FIGS. 1I and 1J, such outer counter rotor units 22U are disposed in the opposing arrangement with the wave source such as the inner counter rotor units 22N by forming the like poles on the inner ends. The outer counter rotor units 22U are also arranged to ensure their inner poles to be the like pole of the inner counter rotor units 22N regardless of the current directions. Accordingly, such poles of the outer counter rotor units 22U always oppose the abutting poles of the inner counter rotor units 22N, thereby suppressing the harmful waves closer to their wave source, suppressing the harmful waves from escaping away from their source, and/or canceling the desired portion of the harmful waves by emitting and propagating counter waves along with such harmful waves, as described above. Secondly, such an EMC system can utilize residual force-generating capability of the system which cannot be harnessed by the prior art electric motors. In this embodiment, the system 10 includes the counter unit which is to oppose at least one additional magnetic pole of at least one basic unit and/or to abut at least one additional surface of the basic unit, and utilizes the magnetic fields and/or fluxes generated by or around the additional pole and/or side of the basic unit, thereby enhancing the force-generating capacity of the system. In the embodiment of FIGS. 1I and 1J, e.g., the outer counter rotor units 22U enclose the outer surfaces of the basic stator units 42N and then interacts with the magnetic fields, fluxes, and waves of or around such surfaces. Accordingly, the EMC system may generate greater electromotive force than its prior art counterpart given the same basic stator units. Thirdly, such an EMC system is not generally mandated to have a bigger size solely due to the presence of various inner and/or outer counter rotor and/or stator units movably or stationarily disposed in various locations thereof. In this embodiment, such outer counter rotor units 22U are arranged to form the magnetic poles of the polarities allowing such outer counter rotor units 22U to cooperate with the basic stator units 42N to generate the force. Accordingly, the EMC system 10 is expected to generate greater force than its prior art counterpart which only has the basic rotor and stator units, at the cost of a greater size or volume primarily because of the additional outer counter rotor units 22U. Conversely, such an EMC system 10 may be fabricated to have a size and/or a volume which are comparable to its conventional counterpart having the same or comparable capacity of generating the electromotive force, despite incorporating therein various inner and/or outer counter units. Other configurational and/or operational characteristics of the EMC system 10 of FIGS. 1I and 1J are generally similar or identical to those of the systems of FIGS. 1B to 1H.

In another aspect of the present invention, an EMC electric motor system may also minimize the irradiation of the harmful waves by including an odd number of multiple rotor units in various locations inside and/or outside one or more basic stator units, where at least one of the rotor units may then be a basic rotor unit.

In one exemplary embodiment of such an aspect of this invention, another EMC electric motor system may include an inner basic rotor unit inside a basic stator unit and a pair of outer counter rotor units outside the basic stator unit while minimizing the irradiation of such harmful waves from one or more wave sources of the system. FIGS. 2A to 2E show schematic top views of exemplary electric motor systems each including an odd number of rotor units according to the present invention. In one example of FIG. 2A, an EMC system 10 is typically similar to those of FIGS. 1B and 1C.

Figure 2A:
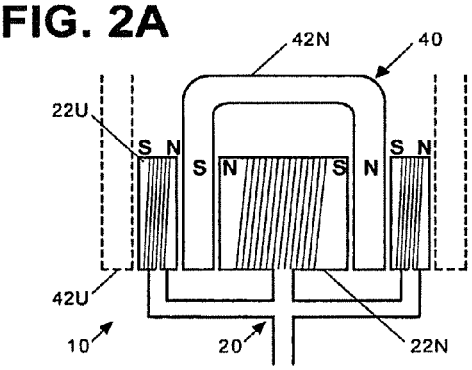
FIGS. 2A to 2F are schematic top views of exemplary electric motor systems each including an odd number of rotor units according to the present invention.
Figure 2D:
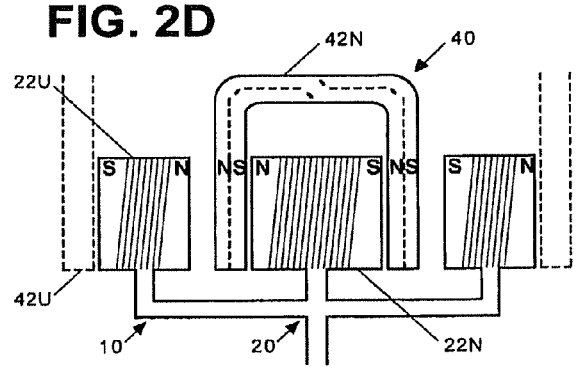
Figure 2B:
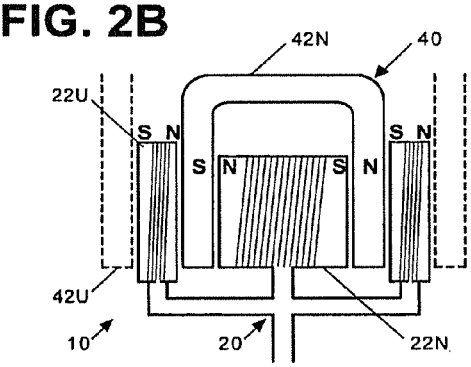
Figure 2E:
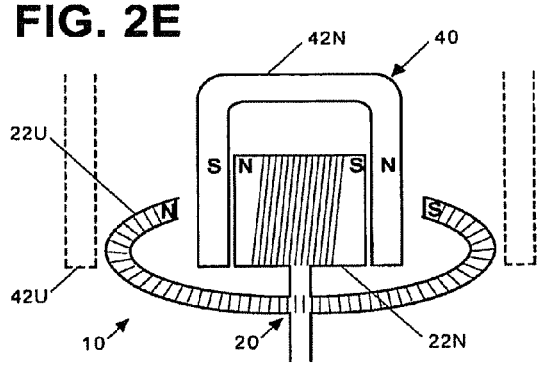
Figure 2C:
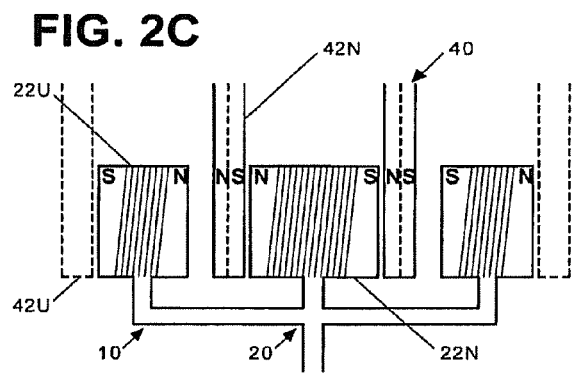

However, the outer counter rotor units 22U have lower profiles or less thicknesses in the radial direction than those of FIGS. 1B and 1C, while maintaining identical or comparable lengths in the axial direction. Such outer rotor units 22U may allow construction of a more compact system as long as a similar or comparable number of turns of wire may be wound around the outer counter rotor units 22N to generate similar or comparable magnetic fields, fluxes, and waves. In another example of FIG. 2B, an EMC system 10 is similar to that of FIG. 2A, except that the outer counter rotor units 22U define greater lengths along the axial direction. Such an embodiment guarantees the outer counter rotor units 22U to enclose an entire (or at least a substantial) portion of the inner basic rotor unit 22N therein in the axial direction, thereby further minimizing the irradiation of the harmful waves by the wave sources. It is appreciated in such examples that the inner basic stator unit 42 defines the horseshoe shape and forms opposite poles in their ends. In addition, an EMC system 10 exemplified in FIG. 2C is similar to that shown in FIG. 1D, and another EMC system 10 exemplified in FIG. 2D is similar to that of FIG. 2C, except that the basic stator unit 42N defines an unitary arrangement for defining opposite poles on its ends. As described above, the systems 10 of FIGS. 2C and 2D may form the magnetic mismatching between the magnetic poles of the outer surfaces of the basic stator units 42N and those of the inner ends of such outer counter rotor units 22U. Accordingly, the outer counter rotor units 22U may be disposed at a preset distance from the basic stator units. In another example of FIG. 2E, an EMC system 10 includes an inner basic stator unit 22N and basic stator unit 42N both similar to those of FIGS. 1B and 1C. However, such a system 10 includes an outer counter rotor unit 22U defining a preset curvilinear contour along which a conductive wire is wound to form an electromagnet defining the similar contour. Providing such outer counter rotor units 22U may provide flexibility in forming the magnetic poles in desired locations in and around the system 10 and may also offer additional magnetic guards due to magnetic fields, fluxes or waves present in and/or generated by such a curved contour thereof. Accordingly, the outer counter rotor units 22U may be arranged to define a preset curvilinear contour when such may be preferable. It is appreciated that each EMC system 10 of FIGS. 2A to 2E may include various outer counter stator units as described by dotted lines, where details of such units are to be disclosed in conjunction with FIGS. 3A through 3L. Other configurational and/or operational characteristics of the EMC systems 10 of FIGS. 2A to 2E are generally similar or identical to those of the systems of FIGS. 1B to 1J.

Figure 2F:
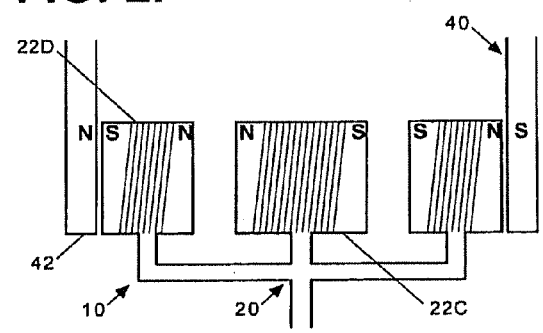
Figure 2G:
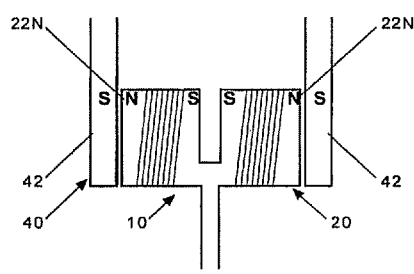
FIGS. 2G to 2L are schematic top view of exemplary electric motor systems each including an even number of rotor units according to the present invention.
Figure 2J:
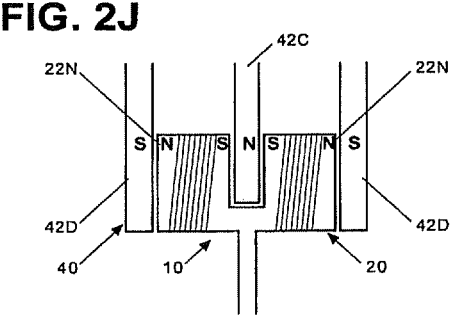
Figure 2H:
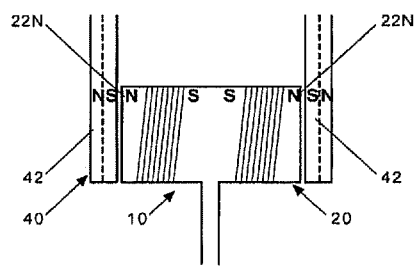

In another exemplary embodiment of this aspect of the invention, an EMC electric motor system may have an odd number of inner rotor units inside a basic stator unit without any outer counter rotor units while minimizing the irradiation of such harmful waves from one or more wave sources thereof. FIG. 2F shows a schematic top view of an exemplary electric motor systems including an odd number of inner rotor units according to the present invention, where an EMC system 10 includes a frame (not included in the figure), a rotor member 20, and a stator member 40. Such a rotor member 20 includes three rotor units, i.e., a center rotor unit 22C and a pair of end rotor units 22D similar to those shown in FIGS. 2C and 2D, while the stator member 40 includes a pair of basic stator units 42. However, all three rotor units 22C, 22D are movably disposed inside the basic stator units 42 such that the center rotor unit 22C serves as a basic rotor unit, while the end rotor units 22D serve as inner counter rotor units. Such a rotor member 20 defines an N pole on its right end (i.e., on a right end of the right inner counter rotor unit 22D) and a S pole on its left end (i.e., on a left end of the left inner counter rotor unit 22D) similar to the prior art DC motor. However, each magnetic pole of the basic rotor unit 22C is to be opposed by the like magnetic pole of the adjacent inner end counter rotor units 22D. Therefore, such inner counter rotor units 22D may minimize the irradiation of the harmful waves by the basic rotor unit 22C. Although not included in the figure, additional outer counter units may be included outside such a basic stator unit 42 so as to minimize the dispersion and penetration of the harmful waves through the basic stator unit 42. Other configurational and/or operational characteristics of the EMC system 10 of FIG. 2F are generally similar or identical to those of the systems of FIGS. 1B to 1J and FIGS. 2A to 2E.

In another aspect of the present invention, an EMC electric motor system may also minimize the irradiation of the harmful waves by including an even number of similar or different multiple rotor units in various locations inside and/or outside one or more basic stator units.

In one exemplary embodiment of this aspect of the invention, an exemplary EMC electric motor system may have an even number of inner rotor units inside the basic stator unit while minimizing the irradiation of such harmful waves from one or more wave sources of the system. FIGS. 2G to 2J are schematic top views of exemplary electric motor systems each including an odd number of rotor units according to the present invention. In one example of FIG. 2G, an EMC system 10 is typically similar to that of FIG. 1H, and includes a pair of inner counter rotor units 22U disposed inside basic stator units 42 and also magnetically opposing each other for minimizing the irradiation of the harmful waves. It is to be understood, however, that such a system 10 may include a single basic stator unit 42 or multiple basic stator units 42 which are provided in an angular arrangement about a center axis of the system 10. In another example of FIG. 2H, another EMC system 10 is typically similar to that of FIG. 2G, except that each of a pair of basic stator units 42 may define magnetic poles along the radial direction similar to those of FIGS. 1D and 2D. It is appreciated that the inner counter rotor units 22U may be formed by winding conductive wire around a rotor body which, however, does not define any intervening gap or indentation. In another example of FIG. 2I, an EMC system 10 is similar to that of FIG. 2H, except that a stator member 40 includes a single C-shaped basic stator unit 42N which may form opposite poles on each of its opposing ends, where the stator member 40 is similar to that of FIG. 2D. It is appreciated that the stator unit 42 may be viewed as a single unit because it defines an uniform pole distribution therealong or, in the alternative, may be viewed as a pair of stator units mechanically coupled to each other by a hypothetical center unit. In another example of FIG. 2J, an EMC system 10 is similar to that of FIG. 2G, except that an additional stator unit (or center stator unit) 42C is disposed in a gap defined between the inner counter rotor units 22N. In this embodiment, the remaining stator units may then be viewed as a pair of outer stator units or end stator units 42D. Other configurational and/or operational characteristics of the EMC system 10 of FIGS. 2G to 2J are generally similar or identical to those of the systems of FIGS. 1B to 1J and FIGS. 2A to 2E.

Figure 2K:
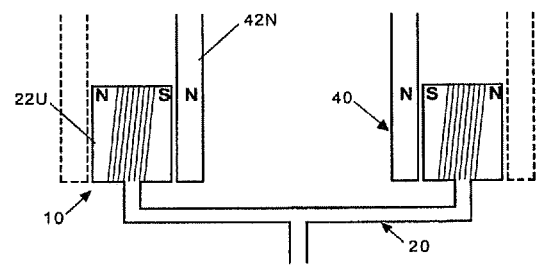
Figure 2I:
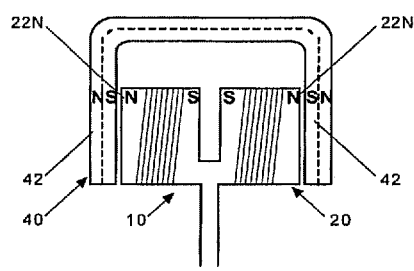
Figure 2L:
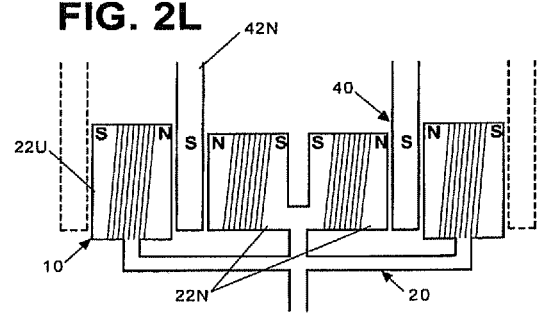

In another exemplary embodiment of this aspect of the invention, an EMC electric motor system may have an even number (including zero) of inner rotor units inside the basic stator unit and another even number of outer rotor units while minimizing the irradiation of the harmful waves by one or more wave sources of the system. FIGS. 2K and 2L show schematic top view of exemplary electric motor systems each of which includes an even number of rotor units according to the present invention. In one example of FIG. 2K, an EMC system 10 includes a pair of basic stator units 42N and a pair of outer counter rotor units 22U which are movably incorporated about outer surfaces of the basic stator units 42N. Similar to the above examples, the outer counter rotor units 22U face each other by opposing an inner pole of one counter rotor unit by a like inner pole of the other counter unit, thereby minimizing the irradiation of the harmful waves. However, such an arrangement may have a limited effect on such minimization, for the outer poles of both counter rotor units 22N are exposed and unguarded. Thus, a pair of outer counter stator units (represented by dotted lines) may be concentrically disposed around the counter rotor units 22U and suppress the harmful waves irradiated thereby from escaping away from and propagating to the user, where this embodiment is shown in FIG. 2L. Other configurational and/or operational characteristics of the EMC system 10 of FIGS. 2K and 2L may be generally similar or identical to those of the systems of FIGS. 1B to 1J and FIGS. 2A to 2J.

In another aspect of the present invention, an EMC electric motor system may also minimize the irradiation of the harmful waves by incorporating multiple stator units of permanent magnets in various arrangements. FIGS. 3A to 3L describe some exemplary embodiments of such EMC systems including multiple counter and/or basic stator units according to the present invention. It is appreciated in all of such figures that various rotor members for generating the electromotive force with such stator units are omitted for simplicity of illustration. Conversely, any of the aforementioned rotor units may then be used in conjunction with various sets of multiple stator units as long as the resulting EMC system may generate the electromotive force while minimizing the irradiation of the harmful waves.

In one exemplary embodiment of this aspect of the invention, an exemplary EMC electric motor system may include multiple stator units of permanent magnets disposed along a radial direction while defining at least one gap formed into a center of such a system while minimizing the irradiation of the harmful waves from one or more wave sources of the system. FIGS. 3A to 3D represent schematic perspective views of exemplary electric motor systems with at least one counter stator unit each of which includes at least one permanent magnet according to the present invention. In one example of FIG. 3A, an EMC system 10 has a stator member 40 consisting of multiple sets of stator units, where a first set includes a pair of C-shaped inner stator units 42N, while a second set includes another pair of larger C-shaped outer stator units 42N. In this embodiment, various rotor units may be disposed inside the inner stator units 42N, between the inner and outer stator units 42N, 42U, outside the outer stator units 42U, and the like. Therefore, whether a specific stator unit serves as a basic stator unit or a counter stator unit may depend upon the disposition of such basic and/or counter rotor units. In addition, the right and left stator units of each set may be spaced apart at a preset distance, thereby defining a gap 45 therebetween. In this embodiment, the first and second sets of the stator units 42N, 42U are provided in an arrangement of aligning the gaps defined between each set, thereby allowing the gap 45 to extend into a center of the system 10. In addition, the first and second sets of the stator units 42N, 42U are shaped and/or sized to form such gaps defining the same or similar dimensions. In another example of FIG. 3B, an EMC system 10 is similar to that shown in FIG. 3A. However, the first and second sets of the stator units 42N, 42U are shaped and sized to increase the size of the gap 45 in a direction moving away from the center of the system 10. As manifest in the figure, such a gap 45 between the outer stator units 42U is wider than that between the inner stator unit 42N.

Figure 3A:
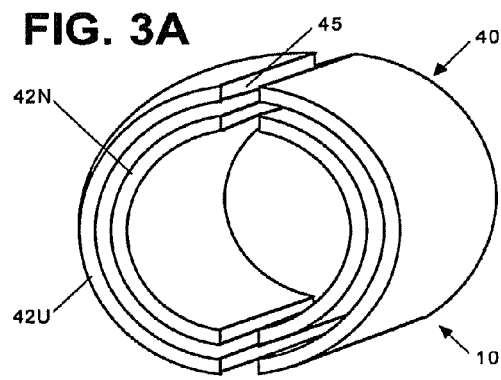
FIGS. 3A to 3F are schematic perspective views of exemplary electric motor systems with at least one counter stator unit each of which includes therein at least one permanent magnet according to the present invention.
Figure 3D:
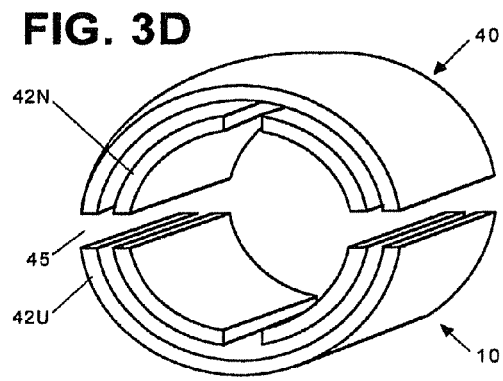
Figure 3B:
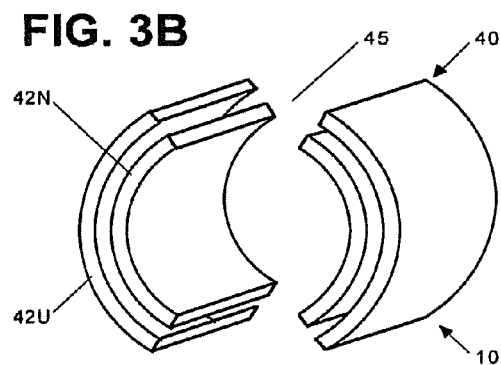

It is noted in FIGS. 3A and 3B that either arrangement allows the outer stator units 42U to enclose therein the inner stator units 42N but that the arrangement of FIG. 3B is aligned such that the size of the gap 45 may be proportional to a line which connects the center of the system 10 and an edge of each stator unit. In another example of FIG. 3C, an EMC system 10 is similar to that of FIG. 3B, except that the stator units 42N, 42U of each set may be mechanically or magnetically connected to each other, thereby forming a mechanically unitary article or mechanically and magnetically unitary article, respectively, where this arrangement has been disclosed in FIGS. 1B and 1G. In another example of FIG. 3D, an EMC system 10 similarly includes a stator member 40 consisting of multiple sets of stator units, where a first inner set includes four quarter-circled inner stator units 42N, while a second set includes a pair of larger C-shaped outer stator units 42N. Therefore, the first set of stator units 42N forms four gaps 45, while the second set of stator units 42U defines two gaps 45. In this embodiment, the first and second sets of the stator units 42N, 42U are provided in an arrangement of aligning each outer stator unit 42U with a pair of inner stator units 42N, thereby allowing the gap 45 to extend into a center of the system 10. It is appreciated that this embodiment illustrates one example of the aforementioned "global minimizing" and that those embodiments of FIGS. 3A to 3C exemplify an example of the above "local minimizing," on the assumption that the inner stator units 42N are to serve as the wave sources of such a system 10. Other configurational and/or operational characteristics of the EMC system 10 of FIGS. 3A to 3D may be generally similar or identical to those of the systems of FIGS. 1B to 1J and FIGS. 2A to 2L.

Figure 3E:
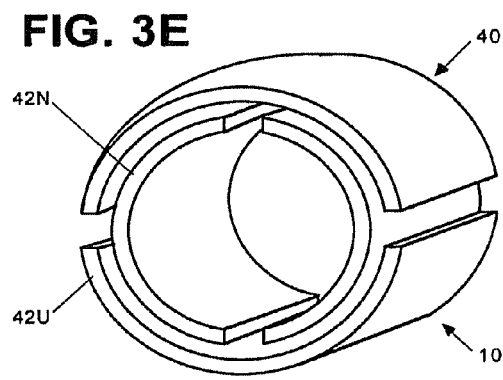
Figure 3C:
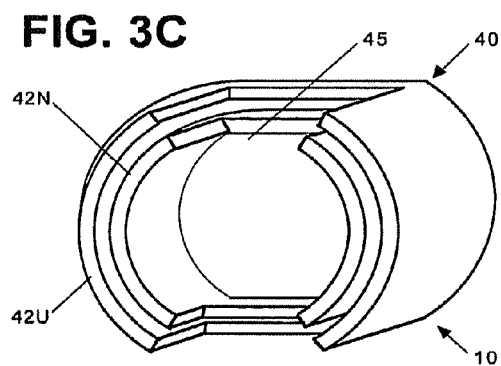
Figure 3F:
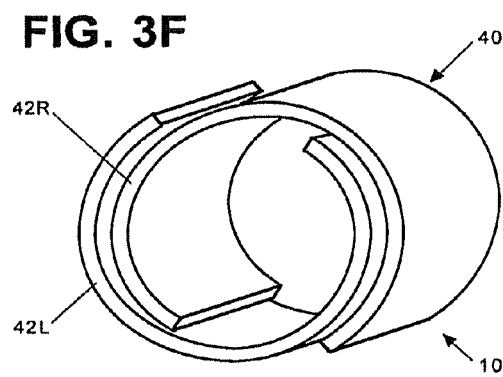
Figure 3G:
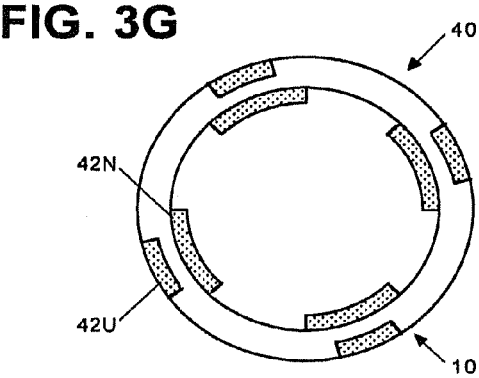
FIGS. 3G to 3J are schematic perspective views of exemplary electric motor systems with at least one counter stator unit each of which includes therein at least one electromagnet according to the present invention.
Figure 3J:
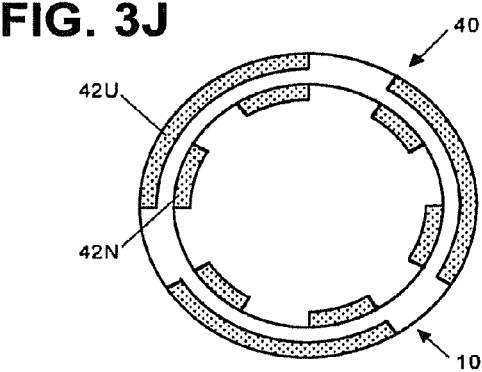
Figure 3H:
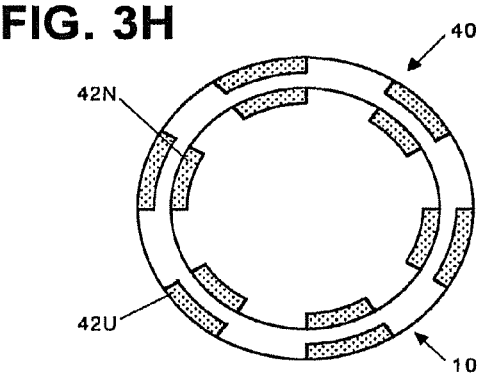

In another exemplary embodiment of this aspect of the invention, an EMC electric motor system may include multiple stator units of permanent magnets disposed along a radial direction as well as in a concentric arrangement for not defining any gap into a center of such a system while minimizing the irradiation of the harmful waves from one or more wave sources of the system. FIGS. 3E and 3F are schematic perspective views of exemplary electric motor systems each including at least one counter stator unit of at least one permanent magnet according to the present invention. In an example of FIG. 3E, an EMC system 10 is generally similar to that of FIG. 3*a*, and includes the first and second sets of the stator units 42N, 42U. However, the second set of outer stator units 42U is rotated about the first set of inner stator units 42N by about 45.degree., thereby preventing formation of any gaps therebetween. It is appreciated that this arrangement without any gap may be beneficial in preventing leakage of such harmful waves therethrough. In another example of FIG. 3F, an EMC system 10 includes a right stator unit 42R and a left stator unit 42L each of which defines a shape of an annular cylinder and forms a gap extending along the axial direction. Such stator units 42R, 42L are then intertwined so that both units 42R, 42L are arranged to overlap each other on right and left ends of the system 10 but that only one of the units 42R; 42L is arranged to covers a top portion and a bottom portion of such a system 10. Other configurational and/or operational characteristics of the EMC system 10 of FIGS. 3E and 3F may be typically similar or identical to those of the systems of FIGS. 1B to 1J. FIGS. 2A to 2L, and FIGS. 3A to 3D.

In another exemplary embodiment of this aspect of the invention, an EMC electric motor system may include multiple stator units of electromagnets disposed along radial and angular directions while minimizing the irradiation of the harmful waves from one or more wave sources of the system. FIGS. 3G to 3J are schematic perspective views of exemplary electric motor systems each including at least one counter stator unit including therein at least one electromagnet according to the present invention. In one example of FIG. 3G, an EMC system 10 includes a pair of stator bodies (as exemplified in FIGS. 1F, 1H, and 1I) which are disposed in a radial and/or concentric arrangement. Onto an inner surface of each of the stator body are provided four stator units 42N, 42U each of which includes at least one electromagnet therein. Therefore, the stator member 40 may include four inner stator units 42N on the inner stator body and four more outer stator units 42U on the outer stator body. In this embodiment, various rotor units may be disposed inside the inner stator body, between the inner and outer stator bodies, outside the outer stator body, and the like. Accordingly, whether a specific stator unit serves as a basic stator unit or a counter stator unit may depend upon the detailed disposition of such basic and/or counter rotor units. In addition, the stator units on each stator body may be spaced apart in an uniform distance or at varying distances. In this embodiment, each stator unit 42N, 42U is provided in every 90.degree. and in a symmetric arrangement. In addition, the inner and outer stator units 42N, 42U are aligned with each other so that each inner stator unit 42N is to be magnetically opposed by each outer stator unit 42U. In another example of FIG. 3H, an EMC system 10 is typically similar to that of FIG. 3G. Contrary to the outer stator units of FIG. 3G which have smaller dimensions than the inner stator units, the outer stator units 42U of FIG. 3H define greater dimensions than the inner stator units 42N, thereby completely enclosing therein such inner stator units 42N. It is to be understood in FIGS. 3H and 3H that each inner stator unit 42N is aligned with and opposed by each outer stator unit 42U, which embodies another pattern of the "local minimizing" described above. In another example of FIG. 3I, another EMC system 10 is similar to that of FIG. 3H, except that the outer stator units 42U are disposed above gaps formed between two adjacent inner stator units 42N. Similar to those shown in FIGS. 3E and 3F, this embodiment may be beneficial in preventing the harmful waves from escaping from and propagating toward the user. In another example of FIG. 3J, an EMC system 10 is also similar to that of FIG. 3H. However, the outer stator body is provided with only two outer stator units 42U each of which may then enclose therein two inner stator units 42N, which is reminiscent of another "global minimizing" as described above. Other configurational and/or operational characteristics of the EMC system 10 of FIGS. 3G to 3J are generally similar or identical to those of the systems of FIGS. 1B to 1J. FIGS. 2A to 2L, and FIGS. 3A to 3F.

Figure 3K:
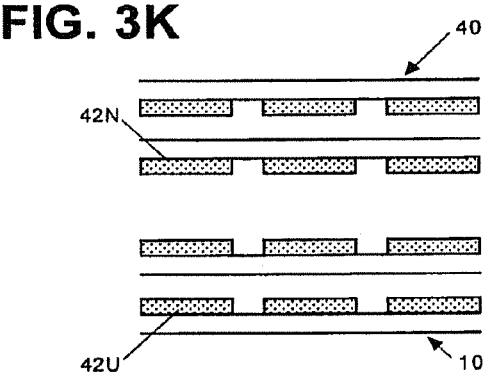
FIGS. 3K and 3L are schematic cross-sectional views of exemplary electric motor systems with at least one counter stator unit each of which includes therein at least one electromagnet according to the present invention.
Figure 3I:
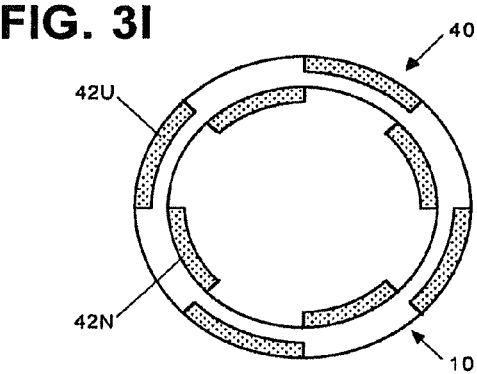
Figure 3L:
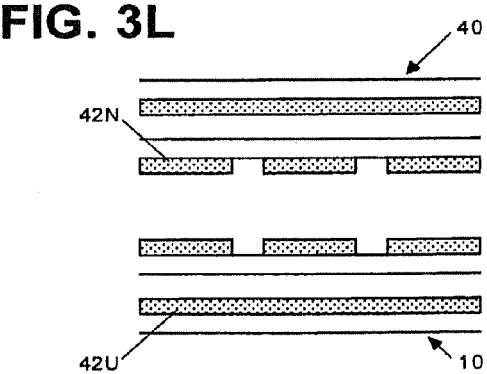

In another exemplary embodiment of this aspect of the invention, an EMC electric motor system may include multiple stator units of electromagnets disposed along a axial direction and defining a gap therebetween while minimizing the irradiation of the harmful waves from one or more wave sources of the system. FIGS. 3K and 3L show schematic cross-sectional views of exemplary electric motor systems with at least one counter stator unit each including at least one electromagnet according to the present invention. In one example of FIG. 3K, an EMC system 10 also includes a first inner stator body and a second outer stator body, where each of such bodies has a shape of an extended strip. On an inner surface of each stator body are provided multiple stator units 42N, 42U each including at least one electromagnet. As a result, the system 10 includes therein a first set of stator units which is provided on an inner upper stator body and an inner lower stator body and includes thereon six inner stator units 42N, and a second set of stator units which is provided on an outer upper stator body and an inner outer stator body and includes therein another six outer stator units 42U. A rotor unit is then movably disposed between the inner stator units 42N provided upon the upper and lower stator body and translated sequentially by successively supplying the electric current to the inner stator units 42N of the first set. In this embodiment, the outer stator units 42U are aligned with such inner stator units 42N for minimizing the irradiation of the harmful waves by the inner stator units 42N, where such an arrangement describes another example of the "local minimizing." In another example of FIG. 3L, an EMC system 10 is similar to that of FIG. 3K, except that the second set of stator units includes fewer units than that of FIG. 3K. More specifically, each outer stator unit 42U is arranged to enclose three or more inner stator units 42N therein, thereby performing the "global minimizing" as described herein. It is appreciated that the systems of FIGS. 3K and 3L may readily be incorporated into prior art stepping motors for translating the rotor units along a preset track. Further configurational and/or operational characteristics of the EMC system 10 of FIGS. 3K and 3L may be generally similar or identical to those of the systems of FIGS. 1B to 1J. FIGS. 2A to 2L, and FIGS. 3A to 3J.

Configurational and/or operational variations and/or modifications of the above embodiments of the exemplary EMC electric motor systems, their rotor and/or stator members, and/or their basic and/or counter units described in FIGS. 1B to 3L also fall within the scope of this invention.

As described above, various rotor units, whether such may be the basic or counter units, are to generate angular rotation while producing the electromotive force. Accordingly, each pole or, more specifically, each outer pole of such basic rotor units is preferably opposed by the like pole of one or more counter units for properly canceling and/or suppressing the harmful waves irradiated thereby.

Such counter rotor units may be provided in various numbers. When the system employs the "local minimizing mechanism," an exact number of the counter rotor units is decided by the number of the poles of the basic rotor units to be opposed thereby. Accordingly, the local minimizing mechanism generally requires an even number of counter rotor units. Alternatively, when the system employs the "global minimizing mechanism," each counter rotor unit may be arranged to oppose more than one pole of the basic rotor unit. Accordingly, the exact number of the counter rotor units may range from one to any number, depending upon the number of poles of the basic rotor units to be opposed as well as upon an extent of such global minimizing mechanism.

As exemplified in various embodiments, the counter rotor units are preferably disposed near or outside the pole of the basic rotor unit to be opposed thereby. In other words, the disposition of such counter rotor units are primarily determined by the locations of such basic rotor units. When the rotor member includes multiple counter rotor units, however, the counter rotor units may also be disposed in various arrangements. In general, such counter rotor units are aligned in radial directions and, when desirable or necessary, in angular directions or concentrically as well. Such counter rotor units may also be disposed in or near the gap defined between two or more basic rotor units in order to prevent the harmful waves from escaping therethrough. It is appreciated, accordingly, that such counter rotor units may be provided in other arrangements as far as such counter rotor units may efficiently oppose the poles of the basic rotor units irradiating the harmful waves.

The counter rotor units may have various shapes and/or sizes and may be provided in various arrangements. In order to guarantee proper suppressing and/or canceling of the harmful waves, the counter rotor units are preferably arranged to define the shapes and/or sizes conforming to those of the wave sources. Thus, when the wave source is a revolving permanent magnet, the counter rotor unit may also be made of another permanent magnet defining the similar shape and size and including similar materials, although different magnets may also be used as far as such a counter rotor unit may match various magnetic properties of such a wave source. When the wave source is a stationary or revolving electromagnet, such a counter rotor unit may be made as another electromagnet capable of matching the magnetic fields, fluxes, and/or waves of the wave source. It is appreciated, however, that the magnetic properties of the counter rotor units may be manipulated by various design criteria such as, e.g., a number of turns of the coil wire per a unit length, inclusion of a ferromagnetic and/or paramagnetic insert, and the like. When the system has a compact structure and does not provide an enough space therefor, the counter rotor units may define the shapes and/or sizes not conforming to those of the wave sources. It is appreciated that the wave source with a permanent magnet may be opposed by the counter rotor unit with the electromagnet and conversely that the wave source with the electromagnet may be opposed by the counter rotor unit with the permanent magnet. In order to ensure proper canceling and/or suppressing operations, however, it is preferred to match the types between the counter rotor unit and the wave source.

When the counter rotor units include the electromagnets, such may be electrically connected in various modes to ensure their proper operations thereof. For example, such counter rotor units may be electrically coupled to other electromagnets included in the waves sources in a series mode, in a parallel mode or in a hybrid mode. Such electrical couplings ensure that the currents flowing through the basic and counter rotor units may have the same phase characteristics, thereby facilitating proper cancellation of the harmful waves by the counter waves, ensuring proper suppression of the harmful waves, and the like. When desirable or unavoidable, the counter rotor units may be provided with the electric current which is independent of the electric current supplied to the wave source. In such a case, the current supplied to the counter rotor unit is preferably approximated to the current supplied to the wave source.

As described herein, the counter rotor unit is made of and/or include the permanent magnet or electromagnet. In general, such a counter rotor unit may preferably include either of such depending upon whether the wave source includes the permanent magnet or electromagnet. When desirable, the counter rotor unit may be arranged to have the same or similar compositions as the wave source as well. When the rotor member includes multiple counter rotor units, each of such units may be made of and/or include the same or similar materials as well. Situations, however, may arise when one or more counter rotor units may serve to minimize the irradiation of the harmful waves, while the rest of the counter rotor units may serve to cooperate with the basic rotor and/or stator units to generate a portion of the electromotive force. In such a case, different counter rotor units serving different goals may be made of and/or include different materials as necessary.

Such counter rotor units may be provided in various shapes and/or sizes. Particularly, when the rotor member includes inner and outer (or center and end) counter rotor units, all of such counter rotor units may have the same or similar shapes, sizes, and/or pole distributions. In the alternative, the inner (or center) counter rotor units may be provided with the shapes, sizes, and/or pole distributions which may be different from those of the outer (or end) counter rotor units. In addition, some of such inner or outer (or center or end) counter rotor units may instead define the shapes, sizes, and/or pole distributions which may be different from the rest of the inner or outer (or center or end) counter rotor units. Similarly, the rotor member may include multiple counter rotor units, where some of such units may be mainly intended to suppress or cancel the harmful waves, while the rest of such units may be primarily intended to cooperate with the basic units and to add the portion to the electromotive force. In this case, the counter rotor units to minimize the harmful waves may be provided with the shapes, sizes, and/or pole distributions which may be different from those for generating such electromotive force. In addition, some of such counter rotor units for minimizing the harmful waves (or for adding the portion tot the electromotive force) may define the shapes, sizes, and/or pole distributions which may be different from those of the rest of such units.

The shapes, sizes, and/or arrangements of the counter rotor units may also be determined by another factor such as stability. Because the counter rotor units are to rotate with the basic rotor units, the number of such counter rotor units, weights thereof, and/or arrangements thereof may have to be carefully manipulated to ensure stable rotation of the rotor member as a whole. Therefore, such counter rotor units may preferably be arranged to guarantee that a center of an overall weight of the rotor member coincides along the center line of the system.

Similar to the counter rotor units, the counter stator units may be provided in various numbers as well. When the system employs the "local minimizing mechanism," an exact number of the counter stator units is determined by the number of the poles of the basic stator units to be opposed thereby. Therefore, the local minimizing mechanism generally requires an even number of counter stator units. Alternatively, when the system employs the "global minimizing mechanism," each counter stator unit may be arranged to oppose more than one pole of the basic stator unit. Therefore, the exact number of the counter stator units may range from one to any number, depending upon the number of poles of the basic stator units to be opposed as well as upon an extent of such global minimizing mechanism.

As described in various embodiments, the counter stator units are preferably disposed near or outside the pole of the basic stator unit to be opposed thereby. In other words, the disposition of the counter stator units are primarily decided by the locations of such basic stator units. When the stator member includes multiple counter stator units, however, the counter stator units may also be disposed in various arrangements. In general, the counter stator units are aligned in radial directions and, when desirable or necessary, in angular directions or concentrically as well. Such counter stator units may also be disposed in or near the gap defined between two or more basic stator units so as to prevent the harmful waves from escaping therethrough. It is appreciated, accordingly, that the counter stator units may be provided in other arrangements as far as the counter stator units may efficiently oppose the poles of the basic stator units irradiating the harmful waves.

The counter stator units may define various shapes and sizes and may be provided in various arrangements. In order to guarantee proper suppressing and/or canceling of the harmful waves, the counter stator units are preferably arranged to define the shapes and/or sizes conforming to those of the wave sources. Thus, when the wave source is a revolving permanent magnet, the counter stator unit may also be made of another permanent magnet defining the similar shape and size and including similar materials, although different magnets may be utilized as far as such a counter stator unit may match various magnetic properties of such a wave source. When the wave source is a stationary or revolving electromagnet, such a counter stator unit may be made as another electromagnet capable of matching the magnetic fields, fluxes, and/or waves of the wave source. It is appreciated, however, that the magnetic properties of the counter stator units may be manipulated by various design criteria such as, e.g., a number of turns of the coil wire per a unit length, inclusion of a ferromagnetic and/or paramagnetic insert, and the like. When the system has a compact structure and does not provide an enough space therefor, the counter stator units may define the shapes and/or sizes not conforming to those of the wave sources. It is appreciated that the wave source with a permanent magnet may be opposed by the counter stator unit with the electromagnet and conversely that the wave source with the electromagnet may be opposed by the counter stator unit with the permanent magnet. In order to ensure proper canceling and/or suppressing operations, however, it is preferred to match the types between the counter stator unit and the wave source.

When the counter stator units have the electromagnets, such may be electrically connected in various modes to ensure their proper operations thereof. For example, such counter stator units may be electrically coupled to other electromagnets included in the waves sources in a series mode, in a parallel mode or in a hybrid mode. Such electrical couplings ensure that the currents flowing in such basic and counter stator units may define the same phase characteristics, thereby facilitating proper cancellation of the harmful waves by the counter waves, ensuring proper suppression of the harmful waves, and the like. When desirable or unavoidable, the counter stator units may be supplied with the electric current which is independent of the electric current supplied to the wave source. In such a case, the current supplied to the counter stator unit is preferably approximated to the current supplied to the wave source.

As described herein, the counter stator unit is made of and/or include the permanent magnet or electromagnet. In general, such a counter stator unit may preferably include either of such depending upon whether the wave source includes the permanent magnet or electromagnet. When desirable, the counter stator unit may be arranged to have the same or similar compositions as the wave source as well. When the stator member includes multiple counter stator units, each unit may then be made of and/or include the same or similar materials as well. Situations, however, may arise when one or more counter stator units may serve to minimize the irradiation of the harmful waves, while the rest of the counter stator units may serve to cooperate with the basic stator and/or rotor units to generate a portion of the electromotive force. In this case, different counter stator units serving different goals may be made of and/or include different materials as necessary.

Such counter stator units may be provided in various shapes and/or sizes. Particularly, when the stator member includes inner and outer (or center and end) counter stator units, all of the counter stator units may have the same or similar shapes, sizes, and/or pole distributions. Alternatively, such inner (or center) counter stator units may be provided with the shapes, sizes, and/or pole distributions which may be different from those of the outer (or end) counter stator units. In addition, some of the inner or outer (or center or end) counter stator units may instead have the shapes, sizes, and/or pole distributions which are different from the rest of such inner or outer (or center or end) counter stator units. Similarly, the stator member may include multiple counter stator units, where some of such units may be mainly intended to suppress or cancel the harmful waves, while the rest of such units may be primarily intended to cooperate with the basic units and to add the portion to the electromotive force. In this case, the counter stator units to minimize the harmful waves may be provided with the shapes, sizes, and/or pole distributions which may be different from those for generating such electromotive force. In addition, some of such counter stator units for minimizing the harmful waves (or for adding the portion tot the electromotive force) may define the shapes, sizes, and/or pole distributions which may be different from those of the rest of such units.

It is appreciated herein that the basic rotor units of the EMC systems of this invention invariably need the counter rotor units, for such basic rotor units are bound to angularly rotate and, accordingly, irradiate the harmful waves whether such basic rotor units include therein permanent magnet and/or electromagnets. Although the basic stator unit is not to rotate or translate, such a stator unit including at least one electromagnet therein also irradiates the harmful waves only when supplied with the AC current and needs to be opposed by at least one counter stator unit. When the basic stator unit only includes a permanent magnet, however, such an unit may not serve as the source of such harmful waves and need not be opposed by any counter stator unit. It may be prudent, however, to provide the counter stator unit in order to minimize the irradiation of the harmful waves dispersing and leaking through the basic stator unit.

The EMC systems of this invention may include various counter units defining various shapes and/or sizes. Because each of such counter units is to oppose a specific basic unit(s), such shapes and sizes are primarily determined by corresponding shapes and sizes of the basic units. However, a few heuristics may be applied in designing such counter units. A first empirical rule may be that the outer counter unit may be magnetically weaker than the inner counter unit. It is well known in the field that intensities of the electromagnetic waves decrease with a square of a distance between a target and a source. Therefore, a weaker outer counter unit may be able to emit the counter waves which may cancel the desired portion of the harmful waves irradiated by the source such as the inner basic rotor and/or stator units which is disposed farther away from the target. A second empirical rule may be that a wider counter unit may be better than a narrower counter unit, regardless of the strengths of such counter units. The goal of the counter unit is to cancel and/or suppress the harmful waves by emitting the counter waves and/or skewing the magnetic fluxes and waves of the harmful waves. Accordingly, it is more prudent to enclose at least substantial or entire portion of the exposed surface of the wave source than leaving it exposed. This arrangement will also be beneficial in utilizing such magnetic fluxes and/or waves for generating the electromotive force as described above.

Although not exemplified in the above figures, the electromagnets of various counter units may include at least one insert therethrough so as to increase the magnetic strength thereof. For example, a cylindrical insert which may be made of and/or include ferromagnetic and/or paramagnetic materials may be inserted into the counter units along a preset distance. Such inserts may be a way to obtain a greater magnetic strength without having to supply stronger electric currents to such electromagnets. Conventional electromagnets more frequently than not employ such inserts and, therefore, details of such inserts which are well known in the art are omitted herein.

Unless otherwise specified, various features of one embodiment of one aspect of the present invention may apply interchangeably to other embodiments of the same aspect of this invention and/or to embodiments of one or more of different aspects of the present invention. Therefore, various EMC systems may be constructed by selecting one or more basic rotor and/or stator units described herein and then by choosing one or more counter rotor and/or stator units described herein, thereby forming such systems capable of generating the electromotive force while minimizing the irradiation of such harmful waves, as long as the selected basic units can generate such force and the chosen counter units can effectively cancel and/or suppress the harmful waves irradiated by such basic units. More particularly, various inner counter rotor units may be disposed outside the basic stator unit and used as the outer counter rotor units or vice versa, various center rotor units may be moved to various end positions of the systems and used as the end counter rotor units or vice versa, various inner counter stator units may be interposed with the outer counter stator units or vice versa, and so on, as long as the resulting units may properly generate the electromotive force as well as minimize the irradiation of the harmful waves by the aforementioned canceling and/or suppressing mechanisms. In addition, the permanent magnet of a specific counter unit may be replaced by the electromagnet or vice versa, as long as such a refurbished counter unit may properly minimize the irradiation of such harmful waves. Moreover, any of the foregoing configurations and/or arrangements disclosed for the counter rotor (or stator) units may be applied to design the counter stator (or rotor) units as long as such modifications may not temper the force-generating and/or wave-minimizing operations. Any design considerations provided for the basic and/or counter rotor units may be applied to design the basic and/or counter stator units or vice versa.

As described hereinabove, various systems, methods, and/or processes of this invention may be applied to any conventional electric motors in order to convert such prior art motors into such EMC electric motor systems of this invention. For example, an EMC DC motor systems may be constructed by including one or more counter units for canceling and/or suppressing the harmful waves irradiated by the electromagnets of its basic rotor units and/or permanent magnets of its stator units. An EMC universal motor systems may be provided by including one or more counter units for canceling and/or suppressing the harmful waves irradiated by the electromagnets of its basic rotor units and/or other electromagnets of its basic stator units. A single-phase or three-phase synchronous EMCAC motor systems may be fabricated by including one or more counter units for canceling and/or suppressing the harmful waves irradiated by the permanent magnets of its basic rotor units and/or electromagnets of its basic stator units. A single-phase or three-phase induction EMC AC motor system may also be constructed by incorporating one or more counter units for canceling and/or suppressing the harmful waves irradiated by the electric conductors of its basic rotor units and/or electromagnets of its basic stators. Similarly, an EMC stepping motors may be made by incorporating one or more counter units for canceling and/or suppressing the harmful waves irradiated by the permanent magnets of its basic rotor units and/or electromagnets of its basic stator units. An EMC linear motor may also be formed by incorporating one or more counter units capable of canceling and/or suppressing the harmful waves irradiated by the permanent magnets or electromagnets of its basic rotor units and/or electromagnets of its stator units. Other advanced AC motors based upon inverter or converter technology such as, e.g., switch reluctance motors and brushless DC motor, as well as other motors such as, e.g., torque motors, servo motors, coreless DC motors, and printed circuit motors may also be modified to provide such EMC systems. As long as one or more of the aforementioned counter rotor and/or stator units are incorporated into desirable locations of such motor systems, at least a substantial portion of such harmful waves can be canceled by the counter waves emitted by the counter units or can instead be suppressed toward the sources thereof. It is emphasized herein that the underlying principles of the "opposing arrangements" for the EMC systems of this invention may also be applied in many different scales including a micro-dimension as well as a nano-dimension. Accordingly, various micro-scale motors and nano-scale motors may be opposed by comparable micro-scale and nano-scale counter units, respectively, for minimizing the irradiation of the harmful waves.

By including various counter rotor and/or stator units thereinto, the EMC system of the present invention may include many pairs of such rotor and/or stator units in each of which the counter and rotor units are brought into a close proximity and the like magnetic poles oppose each other. When the pair may consist of two electromagnets (one for the counter unit while the other for the basic unit), the amplitudes of the repulsive and attractive forces therebetween become proportional to a product of the amplitudes of the electric currents supplied thereto. Therefore, care should be taken to design the EMC system with the counter units which may cooperate with the basic units and contribute to the force-generating steps of such a system. Such an arrangement may also offer the benefit of making the EMC system defining dimensions comparable to those of the conventional counterparts.

As described above, various EMC systems of this invention have been intended to minimize the irradiation of the harmful waves toward the users of such systems, thereby decreasing possibility of causing health hazards to such users. The EMC systems of this invention may instead be applied to minimize an amount of such harmful waves for minimizing electromagnetic interference in various electric and/or electronic devices which employ conventional motors of various dimensions including the micro-scale and nano-scale motors.

Any of the above EMC systems may also incorporate one or more electric shields as well as magnetic shields in order to absorb and then to optionally terminate the electric waves and magnetic waves of the harmful waves. It is appreciated that such shields may be used in conjunction with the counter units of this invention or in the alternative, such shields may be used alone (i.e., without any counter units) to minimize the irradiation of the harmful waves. Details of such electric and magnetic shields have been extensively disclosed in the co-pending Applications and, therefore, will be omitted herein for avoiding redundancy and verbosity.

The EMC electric motor systems of the present invention may be used in a variety of operating conditions decided by detailed dispositions of the permanent magnets and/or electromagnets, detailed disposition of the electric conductors, detailed types of electric energy supplied to the electromagnets, and the like, where details of such have been disclosed above. By the same token, the EMC systems of the present invention may be operated under various objectives which have also been described hereinabove. For example, the basic and/or counter units participating in the force-generating steps may be effectively manipulated by controlling the amplitudes and/or directions of the electric voltages applied thereto, thereby producing different forces in response thereto. In another example, various counter rotor and/or stator units participating in minimizing the irradiation of the harmful waves may be manipulated by controlling such amplitudes and/or directions of the electric currents supplied thereto, thereby providing different extents in canceling and/or suppressing the harmful waves. In yet another example, the EMC system may include a control member which monitors various operating conditions of the force-generating and/or wave-minimizing units and then manipulates operations of such units, thereby adaptively minimizing the irradiation of the harmful waves depending upon the amounts of the harmful waves irradiated by various sources of such systems.

The EMC electric motor systems of the present invention may also be applied to other electric devices which are not originally intended to generate the electromotive force from the electric energy. For example, various counter units described in conjunction with the EMC systems may be employed in conventional generators in order to minimize irradiation of the harmful electromagnetic waves while such generators convert mechanical energy applied thereto into electrical energy in the form of, e.g., AC or DC voltage, AC or DC current, and so on. Therefore, various electromagnetically-countered DC generators, electromagnetically-countered AC generators, electromagnetically-countered alternators or other related generators may generate such electric energy while minimizing the irradiation of such harmful waves.

It is to be understood that, while various aspects and embodiments of the present invention have been described in conjunction with the detailed description thereof, the foregoing description is intended to illustrate and not to limit the scope of the invention, which is defined by the scope of the appended claims. Other embodiments, aspects, advantages, and modifications are within the scope of the following claims.

What is claimed is:

1. An electromagnetically countered electric motor system including at least one basic rotor unit and at least one basic stator unit, wherein said basic rotor unit is configured to be rotatably disposed with respect to said basic stator unit, wherein said basic units are configured to generate first dynamic magnetic fields therearound when first electric energy is supplied to at least one of said basic units in a first direction, and wherein said basic rotor unit is configured to rotate due to said first magnetic fields while producing first electromotive force and while irradiating from at least one of said base units first electromagnetic waves defining first characteristics, said system comprising:
    at least one counter rotor unit and at least one counter stator unit each of which is disposed in a preset arrangement with respect to each of said basic rotor unit and basic stator unit, respectively,
    wherein said counter rotor unit is configured to be rotatably disposed with respect to said counter stator unit, wherein said counter units are configured to generate second dynamic magnetic fields therearound when second electric energy is supplied to at least one of said counter units in a second direction, and wherein said counter rotor unit is configured to rotate due to said second magnetic fields while emitting from at least one of said counter units second electromagnetic waves defining second characteristics,
    whereby said system is configured to minimize an intensity of said first waves irradiating onto a user of said system by one of suppressing a preset portion of said first waves from propagating toward said user due to at least one of said arrangement, direction, and characteristics and canceling said portion of said first waves with said second waves around said user due to at least one of said arrangement, directions, and characteristics.

2. The system of claim 1, wherein said system is configured to cancel said portion of said first waves by concentrating said portion of said first waves around said system and away from said user.

3. The system of claim 1, wherein said first and second directions are at least substantially similar to each other, wherein said first and second characteristics are at least substantially similar to each other, and wherein said basic rotor unit and counter rotor unit are aligned at least partially side by side, whereby said system is configured to minimize said intensity preferentially by said suppressing.

4. The system of claim 1, wherein said first and second directions are at least substantially similar to each other, wherein said first and second characteristics are at least substantially similar to each other, and wherein said basic rotor unit and counter rotor unit are aligned to at least partially abut each other, whereby said system is configured to minimize said intensity preferentially by said canceling.

5. The system of claim 1, wherein said first and second directions are at least substantially opposite to each other, wherein said first and second characteristics are at least substantially similar to each other, and wherein said basic rotor unit and counter rotor unit are aligned at least partially side by side, whereby said system is configured to minimize said intensity preferentially by said canceling.

6. The system of claim 1, wherein said first and second directions are at least substantially opposite to each other, wherein said first and second characteristics are at least substantially similar to each other, and wherein said basic rotor unit and counter rotor unit are aligned to at least partially abut each other, whereby said system is configured to minimize said intensity preferentially by said suppressing.

7. The system of claim 1, wherein said first and second directions are at least substantially similar to each other, wherein said first and second characteristics are at least substantially opposite to each other, and wherein said basic rotor unit and counter rotor unit are aligned at least partially side by side, whereby said system is configured to minimize said intensity preferentially by said canceling.

8. The system of claim 1, wherein said first and second directions are at least substantially similar to each other, wherein said first and second characteristics are at least substantially opposite to each other, and wherein said basic rotor unit and counter rotor unit are aligned to at least partially abut each other, whereby said system is configured to minimize said intensity preferentially by said suppressing.

9. The system of claim 1, wherein said first and second directions are at least substantially opposite to each other, wherein said first and second characteristics are at least substantially opposite to each other, and wherein said basic rotor unit and counter rotor unit are aligned at least partially side by side, whereby said system is configured to minimize said intensity preferentially by said suppressing.

10. The system of claim 1, wherein said first and second directions are at least substantially opposite to each other, wherein said first and second characteristics are at least substantially opposite to each other, and wherein said basic rotor unit and counter rotor unit are aligned to at least partially abut each other, whereby said system is configured to minimize said intensity preferentially by said canceling.

11. The system of claim 1, wherein said first energy and said second energy are at least substantially similar to each other.

12. The system of claim 1, wherein said rotor units are at least substantially similar to each other.

13. The system of claim 1, wherein said stator units are at least substantially similar to each other.

14. The system of claim 1, wherein said counter rotor unit is further configured to produce second electromotive force.

15. The system of claim 14, wherein said second force is configured to be added to said first force.

16. The system of claim 14, wherein said second force is configured to be independent from said first force.

17. The system of claim 14, wherein said system is configured to minimize said intensity by suppressing a preset portion of said first waves from propagating toward said user due to at least one of said arrangement, directions, and characteristics.

18. The system of claim 14, wherein said system is configured to minimize said intensity by canceling said portion of said first waves with said second waves around said user while concentrating said portion of said first waves around said system and away from said user due to at least one of said arrangement, directions, and characteristics.

19. An electromagnetically countered electric motor system including at least one basic stator unit and at least one basic rotor unit which is configured to rotate with respect to said basic stator unit when first electric energy is supplied to at least one of said basic units while irradiating from at least one of said base units first electromagnetic waves, said system comprising:

at least one counter stator unit and at least one counter rotor unit which is configured to rotate with respect to said counter stator unit when second electric energy is supplied to at least one of said counter units while emitting from at least one of said counter units second electromagnetic waves, wherein said system is configured to minimize an intensity of said first waves irradiating onto a user of said system due to at least one of an arrangement between said basic units and counter units, directions of said first and second energies, and characteristics of said first and second waves.

20. An electromagnetically countered electric motor system comprising:

at least one basic stator unit and at least one basic rotor unit which is configured to rotate with respect to said basic stator unit when first electric energy is supplied to at least one of said basic units while irradiating from at least one of said base units first electromagnetic waves; and at least one counter stator unit and at least one counter rotor unit which is configured to rotate with respect to said counter stator unit when second electric energy is supplied to at least one of said counter units while emitting from at least one of said counter units second electromagnetic waves, wherein said system is configured to minimize an intensity of said first waves irradiating onto a user of said system due to at least one of an arrangement between said basic units and counter units, directions of said first and second energies, and characteristics of said first and second waves.

* * * * *